(12) United States Patent
Bennington et al.

(10) Patent No.: US 11,536,855 B2
(45) Date of Patent: Dec. 27, 2022

(54) PATH PLANNING USING FORECASTS OF OBSCURATION AND MULTIPATH

(71) Applicant: Spirent Communications PLC, Crawley (GB)

(72) Inventors: Jeremy Charles Bennington, Greenwood, IN (US); Raphael Grech, Torquay (GB); Dennis Berres, Farmington Hills, MI (US); Rafal Zbikowski, Paignton (GB); Colin Richard Ford, Carmarthen (GB); Richard West, Paignton (GB); Paul Hansen, Cambridge (GB); Arthur Edward Neeves, Saint Augustine, FL (US); Esther Anyaegbu, Northampton (GB); Adam Gleave, Plymouth (GB); Ronald Toh Ming Wong, Paignton (GB)

(73) Assignee: Spirent Communications PLC, Crawley (GB)

(*) Notice: Subject to any disclaimer, the term of this patent is extended or adjusted under 35 U.S.C. 154(b) by 0 days.

(21) Appl. No.: 17/374,891

(22) Filed: Jul. 13, 2021

(65) Prior Publication Data

US 2022/0018972 A1 Jan. 20, 2022

Related U.S. Application Data

(60) Provisional application No. 63/051,849, filed on Jul. 14, 2020, provisional application No. 63/161,386, filed on Mar. 15, 2021.

(51) Int. Cl.
*G01S 19/42* (2010.01)
*G05D 1/02* (2020.01)
(Continued)

(52) U.S. Cl.
CPC .......... *G01S 19/42* (2013.01); *G01W 1/10* (2013.01); *G05D 1/0088* (2013.01);
(Continued)

(58) Field of Classification Search
CPC . G01S 19/42; G01S 5/02; G01S 19/46; G01S 19/49; G01S 19/41; G01S 5/0257;
(Continued)

(56) References Cited

U.S. PATENT DOCUMENTS 4,284,160 A * 8/1981 De Liban ............... B62D 1/28
  104/299
5,548,814 A * 8/1996 Lorang ................... G01S 5/02
  370/310

(Continued)

FOREIGN PATENT DOCUMENTS

CN 108680937 A 10/2018
EP 3064964 A1 9/2016
(Continued)

OTHER PUBLICATIONS

User Manual—Detailed Guide to Usage of Application, Spirent Communications, dated Jul. 1, 2020, 17 pages.
(Continued)

*Primary Examiner* — Yuri Kan
(74) *Attorney, Agent, or Firm* — Haynes Beffel & Wolfeld, LLP; Ernest J. Beffel, Jr.

(57) ABSTRACT

The technology disclosed teaches a method of path planning using a GNSS Forecast, requesting the GNSS Forecast of signal obscuration on behalf of a vehicle travelling in a region, receiving and using the Forecast to plan a path or route that has GNSS signals available over the path or route that satisfy a predetermined criterium. Also taught are GNSS Forecasts and planned paths or routes for a plurality of flying vehicles used by a flight control system, requesting the
(Continued)

GNSS Forecast of signal obscuration on behalf of a flying autonomous or automated vehicle travelling in a region, receiving and using the Forecast and to plan a path with GNSS signals available over the path that satisfy predetermined criteria including accommodating real-time changes in flight paths, without leaving space, that satisfies the predetermined criteria. Also taught is certifying performance of GNSS receivers used on a flying vessel.

19 Claims, 26 Drawing Sheets
(1 of 26 Drawing Sheet(s) Filed in Color)

(51) Int. Cl.
- G05D 1/00 (2006.01)
- G01W 1/10 (2006.01)
- G05D 1/10 (2006.01)
- G01W 1/00 (2006.01)

(52) U.S. Cl.
CPC ........... *G05D 1/0212* (2013.01); *G05D 1/101* (2013.01); *G01W 2001/003* (2013.01)

(58) Field of Classification Search
CPC ......... G01S 19/243; G01S 19/29; B62D 1/28; G01C 21/24; G01C 21/34; H04W 4/02; G08G 5/0021; G08G 1/095; G08G 1/123; H03J 1/0008; G04G 3/02; G05D 1/02; G05D 1/00; G05D 1/10; G01W 1/10; G01W 1/00

See application file for complete search history.

(56) References Cited

U.S. PATENT DOCUMENTS

| | | | |
|---|---|---|---|
| 5,761,486 | A | 6/1998 | Watanabe et al. |
| 6,191,708 | B1* | 2/2001 | Davidson ............... G08G 1/123 |
| | | | 455/500 |
| 6,208,841 | B1 | 3/2001 | Wallace et al. |
| 6,560,459 | B1 | 5/2003 | Wong |
| 6,571,082 | B1 | 5/2003 | Rahman et al. |
| 6,636,721 | B2 | 10/2003 | Threadgill et al. |
| 7,224,941 | B2 | 5/2007 | Liu |
| 7,324,588 | B2 | 1/2008 | Green et al. |
| 7,349,670 | B2 | 3/2008 | Mlinarsky et al. |
| 7,395,060 | B2 | 7/2008 | Liu |
| 7,398,056 | B1 | 7/2008 | Ebert et al. |
| 7,508,868 | B2 | 3/2009 | Chang |
| 7,539,489 | B1 | 5/2009 | Alexander |
| 7,555,420 | B2 | 6/2009 | Wang et al. |
| 7,606,165 | B2 | 10/2009 | Qiu et al. |
| 7,646,338 | B2 | 1/2010 | Monnerat |
| 7,693,082 | B2 | 4/2010 | Wright |
| 7,809,404 | B2 | 10/2010 | Daniels et al. |
| 8,150,675 | B1 | 4/2012 | Ortmanns et al. |
| 8,213,957 | B2 | 7/2012 | Bull et al. |
| 8,223,068 | B2 | 7/2012 | Allan et al. |
| 8,364,090 | B2 | 1/2013 | Ramasamy et al. |
| 9,008,964 | B2 | 4/2015 | Mansour |
| 9,519,063 | B2 | 12/2016 | Davis et al. |
| 9,945,956 | B2 | 4/2018 | Chhokra et al. |
| 11,131,774 | B2 | 9/2021 | Miya et al. |
| 11,150,353 | B2* | 10/2021 | Nishi ........................ G04G 3/02 |
| 2001/0004380 | A1* | 6/2001 | Mannermaa ............ G01S 19/29 |
| | | | 375/150 |
| 2001/0033627 | A1* | 10/2001 | Syrjarinne ............ G01S 19/243 |
| | | | 375/354 |
| 2002/0066055 | A1 | 5/2002 | Kim |
| 2002/0102992 | A1 | 8/2002 | Koorapaty et al. |
| 2003/0061018 | A1 | 3/2003 | Snyder |
| 2003/0236089 | A1 | 12/2003 | Beyme et al. |
| 2005/0004787 | A1 | 1/2005 | Kubischta et al. |
| 2005/0085223 | A1 | 4/2005 | Liu |
| 2006/0040616 | A1 | 2/2006 | Wheatley |
| 2006/0046658 | A1 | 3/2006 | Cruz et al. |
| 2006/0072466 | A1 | 4/2006 | Wang et al. |
| 2006/0209866 | A1 | 9/2006 | Steenkiste et al. |
| 2006/0223522 | A1 | 10/2006 | Guo et al. |
| 2006/0229018 | A1 | 10/2006 | Mlinarsky et al. |
| 2006/0229019 | A1 | 10/2006 | Mlinarsky |
| 2006/0229020 | A1 | 10/2006 | Mlinarsky et al. |
| 2006/0233111 | A1 | 10/2006 | Wright |
| 2006/0239198 | A1 | 10/2006 | Mlinarsky et al. |
| 2006/0252419 | A1 | 11/2006 | Liu |
| 2006/0264178 | A1 | 11/2006 | Noble et al. |
| 2007/0010940 | A1* | 1/2007 | Tan ........................ G01S 5/0257 |
| | | | 701/469 |
| 2007/0019769 | A1 | 1/2007 | Green et al. |
| 2007/0257838 | A1 | 11/2007 | Cheng |
| 2008/0056340 | A1 | 3/2008 | Foegelle |
| 2008/0239972 | A1 | 10/2008 | Omar |
| 2008/0287140 | A1 | 11/2008 | Lee et al. |
| 2009/0047925 | A1 | 2/2009 | Rahman |
| 2009/0094492 | A1 | 4/2009 | Music et al. |
| 2009/0305702 | A1 | 12/2009 | Toppinen et al. |
| 2010/0019937 | A1* | 1/2010 | Mori ........................ G08G 1/095 |
| | | | 340/936 |
| 2010/0066599 | A1 | 3/2010 | Liu et al. |
| 2010/0233969 | A1 | 9/2010 | Frolik et al. |
| 2010/0273504 | A1 | 10/2010 | Bull et al. |
| 2010/0304686 | A1 | 12/2010 | Kennedy et al. |
| 2011/0199255 | A1 | 8/2011 | Murray et al. |
| 2011/0217937 | A1 | 9/2011 | Cook |
| 2011/0230143 | A1 | 9/2011 | Lundstrom et al. |
| 2011/0234455 | A1 | 9/2011 | Rosenfeld et al. |
| 2011/0257923 | A1 | 10/2011 | Boulton |
| 2011/0263215 | A1 | 10/2011 | Asplund et al. |
| 2011/0306306 | A1 | 12/2011 | Reed |
| 2012/0209519 | A1 | 8/2012 | Basnayake |
| 2012/0282946 | A1 | 11/2012 | Wigren |
| 2012/0309323 | A1 | 12/2012 | Guo et al. |
| 2013/0021912 | A1 | 1/2013 | Finlow-Bates et al. |
| 2013/0106655 | A1 | 5/2013 | Pujante Cuadrupani |
| 2013/0154879 | A1 | 6/2013 | Ramakrishnan et al. |
| 2013/0162466 | A1* | 6/2013 | Mcdanell ............... H03J 1/0008 |
| | | | 342/352 |
| 2013/0217418 | A1 | 8/2013 | Maurin et al. |
| 2014/0024318 | A1 | 1/2014 | Sevindik et al. |
| 2014/0336923 | A1* | 11/2014 | Hwang ................... G01C 21/34 |
| | | | 701/423 |
| 2014/0343765 | A1* | 11/2014 | Suiter ................... G08G 5/0021 |
| | | | 701/18 |
| 2015/0065165 | A1 | 3/2015 | Zhang et al. |
| 2015/0226857 | A1 | 8/2015 | Davies |
| 2015/0301190 | A1* | 10/2015 | Osipov ..................... G01S 19/41 |
| | | | 342/357.26 |
| 2016/0097861 | A1* | 4/2016 | Li ............................ H04W 4/02 |
| | | | 342/357.3 |
| 2016/0146944 | A1 | 5/2016 | Geren et al. |
| 2016/0280401 | A1* | 9/2016 | Driscoll ................. G01C 21/24 |
| 2016/0282473 | A1* | 9/2016 | Driscoll ................. G01S 19/49 |
| 2017/0059715 | A1 | 3/2017 | Wietfeldt et al. |
| 2018/0292839 | A1* | 10/2018 | Wei ........................ G01S 19/46 |
| 2018/0372877 | A1 | 12/2018 | Syrjarinne |
| 2019/0094379 | A1* | 3/2019 | Chhokra ................. G01S 19/42 |

FOREIGN PATENT DOCUMENTS

| | | | | |
|---|---|---|---|---|
| GB | 2492547 | A | 1/2013 | |
| WO | WO-9903009 | A2 * | 1/1999 | ......... G02B 21/0012 |
| WO | 2010093999 | A2 | 8/2010 | |
| WO | 2011046455 | A1 | 4/2011 | |

OTHER PUBLICATIONS

PNT—Assurance System Architecture, Navigation Assurance Forecast, Spirent, dated Jun. 2020, 7 pages.

(56) References Cited

OTHER PUBLICATIONS

Autonomous emergency manoeuvering and movement monitoring for road and transport security, TransSec, dated Jul. 31, 2018, 33 pages.
Recommendation ITU-R P.1407-7, Multipath propagation and parameterization of its characteristics, Radiocommunication Sector of International Telecommunication Union, dated Aug. 2019, 31 pages.
Recommendation ITU-R P.681-11, Propagation data required for the design systems in the land mobile-satellite service, Radiocommunication Sector of International Telecommunication Union, dated Aug. 2019, 63 pages.
Radisic et al., The Effect of Terrain Mask on RAIM Availability, Journal of Navigation, dated Jan. 2010, 15 pages.
Gadgil, Ring Buffers, Kalyani Gadgil's blog, dated Feb. 4, 2019, 5 pages. Retrieved on Jun. 18, 2020. Retrieved from the internet [URL: https://kalyanigadgil.wordpress.com/2019/02/04/ring-buffers/ ].
Hsu et al., NLOS Correction/Exclusion for GNSS Measurement Using RAIM and City Building Models, Sensors, published Jul. 17, 2015, 21 pages.
GNSS Planning Website, Trimble, dated Jul. 27, 2018, 5 pages.
Spirent, Realistic Multipath and Obscuration Simulation—Simulating the Impact of the Local Environment on GNSS Signals, Spirent Sim3D, dated Jan. 2020, 4 pages.
Spirent, SimGEN Software Suite for Spirent GNSS Constellation Simulation Systems, dated May 2020, 45 pages.
GNSS Mission Planning, Navmatix, 4 pages. Retrieved on Jun. 17, 2020. Retrieved from the internet [URL: http://gnssmissionplanning.com/ ].
Recommendation ITU-R P.2145-2, Model Parameters for the physical-statisical wideband model, Radiocommunication Sector of International Telecommunication Union, dated Sep. 2017, 101 pages.
Rakipi et. al., Integrity Monitoring in Navigation Systems: Fault Detection and Exclusion RAIM Algorithm Implementation, Journal of Computer Communications, published May 28, 2018, 9 pages.
Technical Standard Order, Traffic Awareness Beacon System (TABS), Federal Aviation Administration—Department of Transportation, dated Oct. 10, 2014, 48 pages.
Berres et al., GNSS Receiver Performance Assessment in Varied Multipath Environments with Real-World Simulation System, Association for Unmanned Vehicle Systems International (AUVSI) Proceedings, dated 2020, 17 pages.
Diggelen, End Game for Urban GNSS: Google's Use of 3D Building Models, Inside Gnss (IG), dated Mar. 21, 2021, 16 pages. Retrieved on Jul. 6, 2021. Retrieved from the internet [URL: https://insidegnss.com/end-game-for-urban-gnss-googles-use-of-3d-building-models/].
NovAtel Inc., An Introduction to GNSS—Chapter 5—Resolving Errors—Real-Time Kinematic, Second Edition, published 2015, 2 pages.
Section 2—Area Navigation (RNAV) and Required Navigation Performance (RNP), Federal Aviation Administration, 8 pages. Retrieved on Oct. 22, 2021. Retrieved from the internet [URL: https://tfmlearning.faa.gov/publications/atpubs/AIM/Chap1/aim0102.html#RCtM?129mweb].
Synopsys, The 6 Levels of Vehicle Autonomy, dated 2021, 7 pages. Retrieved on Oct. 22, 2021. Retrieved from the internet [URL: https://www.synopsys.com/automotive/autonomous-driving-levels.html ].
Stanford, Ray Tracing Alternatives, dated 1997-98, 2 pages. Retrieved on Jun. 15, 2021. Retrieved from the internet [URL: https://cs.stanford.edu/people/eroberts/courses/soco/projects/1997-98/ray-tracing/alternatives.html ].
Li et al., A Tightly Coupled Positioning Solution for Land Vehicles in Urban Canyons, Hindawi, Journal of Sensors, dated 2017, 11 pages.
OneSky SDSP Services, OneSky Systems Inc., 7 pages. Retrieved on Oct. 22, 2021. Retrieved from the internet [URL: https://saas.onesky.xyz/SDSP/Documentation/Navigation ].
PCT/US2021/041664—Partial Search Report dated Nov. 4, 2021, 18 pages.
Nakaaki et al., "Development of a Precision Index and a Precision Forecast System for RTK-GNSS", 2019 IEEE Vehicular Networking Conference (VNC), 3-5-1 Johoku, Hamamatsu, Shizuoka 432-8011, Japan, Dec. 4, 2019, pp. 1-7.
Suh et al., "Evaluation of Satellite-Based Navigation Services in Complex Urban Environments Using a Three-Dimensional GIS", IEICE Transaction on Communication, Communications Society, Tokyo, JP, vol. E90B, No. 7, Jul. 1, 2007, pp. 1816-1825.
Causa et al., "Multi-UAV Path Planning for Autonomous Missions in Mixed GNSS Coverage Scenarios", Sensors, vol. 18, No. 12, Nov. 29, 2018, 27 pages.
Spirent, "Enabling reliable GNSS performance for autonomous urban driving", a Spirent Ebook, Oct. 5, 2021, 12 pages.
Parkinson et al., "Global Positioning System: Theory and Applications", vol. 1, vol. 163 Progress in Astronautics and Aeronautics, Published by the American Institute of Aeronautics and Astronautics, Inc., Washington, DC, 1996, 44 pages.
Geohash, Wikipedia - Geohash 2008 public domain, 7 pages, retrieved on Dec. 22, 2010. Retrieved from the internet[URL: http://en.wikipedia.org/wiki/Geohash ].
Anonymous, Algorithm for Finding Nearby Points? - Stack Overflow, 3 pages, retreieved on Dec. 22, 2010. Retrieved from the internet [URL: http://stackoverflow.com/questions/838344/algorithm-for-finding-nearby-points ].
Butler,Playing Nice—LBS and Hybrid location technologies, EETImes, dated Dec. 8, 2009, 4 pages. Retrieved on Dec. 22, 2010. Retrieved from the internet [URL: https://www.eetimes.com/General/DisplayPrintViewContent? contentitemId=4016855 ].
Kojo, Seawind: a Wireless Network Emulator, Proceedings of 11th GI/ITG Conference of Measuring, Modelling and Evaluation of Computer and Communication Systems, 2001, 16 pages.
CiteSeerX—Seawind: a Wireless Network Emulator Summary, dated 2001, 2 pages, retrieved on Feb. 20, 2014. Retrieved from the internet [URL: http://citeseerx.ist.psu.edu/viewdoc/summary?doi=10.1 1.25.3281].
INS—Integrated Navigation Systems, GNSS Product Design, GNSS Solutions. Retrieved on Sep. 21, 2012. Retrieved from the internet [URL: http://inavsystems.com/index_files?Page607.htm ].
Global Positioning System. Wikipedia, the Free Encyclopedia, last modified on Nov. 6, 2012, retrieved on Nov. 9, 2012. Retrieved from the internet <http://en.wikipedia.org/w/index.php2 title=Global_Positioning_System&oildid=521739076>.
Synchros Interactive, Proximity Searching with GeoHash, dated Aug. 2, 2010, 4 pages. Retrieved on Dec. 22, 2010. Retrieved from the internet [URL: http://www.synchrosinteractive.com/blog/1-software/38-geohash ].
Eppstein, Geometry in Action, Cartography and Geographic Information Systems, 6 pages, retrieved on Dec. 9, 2010. Retrieved from the internet [URL: http://www.ics.uci.edu/~eppstein/gina/carto.html ].
Gupta R, How to Use GNSS Simulators to Test RTK Positioning Systems, Spirent.com, Feb. 1, 2016, 6 pages downloaded from https://spirent.com/blogs/how-to-use-gnss-simulators-to-test-RTK).
Obst et al. "Urban Multipath Detection and Mitigation with Dynamic 3D Maps for Reliable Land Vehicle Localization", Proceedings of IEEE Ion Plans 2012, /Ion Plans, Apr. 26, 2012 (Apr. 26, 2012), pp. 685-691.
Zhang et al. "A New Path Planning Algorithm Using a GNSS Localization Error Map for UAVs in an Urban Area", Journal of Intelligent, vol. 94, No. 1, Aug. 3, 2018 (Aug. 3, 2018), pp. 219-235.
PCT/US2021/041664—Internatioal Search Report & Written Opinion dated Mar. 31, 2022, 34 pages.
GB2110163.9—Partial Search Report dated Apr. 6, 2022, 2 page.
GB2110164.7—Search Report dated Apr. 6, 2022, 2 pages.
GB2110165.4—Search Report dated Apr. 4, 2022, 1 pages.

* cited by examiner

```
message ForecastBatch { 305
    ForecastMetadata metadata = 1;
    oneof data {
        ForecastLOS los = 2;
        ForecastAzEl az_el = 3;
        ForecastDOP pdop_all = 4; // PDOP calculation made using all los satellites from all GNSS
    }
} message ForecastMetadata { 321
    ForecastType type = 1;
    GPSTimeRange forecast_period = 2; // Start and End of this forecast
    Quad2D area = 3; // 2D Area of this forecast
    double agl_height_m = 4; // AGL height for all points in forecast
    HeightRange agl_height_range = 5; // Min/Max above ground height (0 == ground)
    HeightRange wgs84_height_range = 6; // Min/Max ellipsoidal (WGS84) height
    double grid_resolution_m = 7; // Horizontal grid resolution
    double time_resolution_s = 8; // Time resolution of forecasted period in seconds
} message ForecastAzEl { 351
    repeated SatelliteAzElForecast az_el = 1;
} message ForecastLOS { 361
    repeated PointForecastLOS los = 1;
} message ForecastDOP { 371
    repeated PointForecastDOP dop = 1;
} message PointForecastLOS { 381
    Point3DWGS84 point_wgs84 = 1;
    repeated SatelliteLOSForecast los = 2;
} message PointForecastDOP { 391
    Point3DWGS84 point_wgs84 = 1;
    repeated DOPForecast dop = 2;
} message SatelliteAzElForecast { 358
    Satellite satellite = 1;
    repeated SatelliteAzEl coordinates = 2;
} message SatelliteLOSForecast { 387
    Satellite satellite = 1;
    repeated LOSForecast measurement = 2;
} enum DOPResult { 398
    IDEAL = 0;       // DOP value in range 0-1
    EXCELLENT = 1;   // DOP value in range 1-2
    GOOD = 2;        // DOP value in range 2-5
    MODERATE = 3;    // DOP value in range 5-10
    FAIR = 4;        // DOP value in range 10-20
    POOR = 5;        // DOP value in range 20+
    NO_DOP = 6;      // No DOP value - fewer than four satellites visible
}
```

FIG. 3F

PATH PLANNING USING FORECASTS OF OBSCURATION AND MULTIPATH

PRIORITY

This application is related to and claims priority to U.S. Provisional Patent Application No. 63/051,849 entitled "Architecture for Providing Forecasts of GNSS Obscuration and Multipath," filed 14 Jul. 2020. The provisional application is incorporated by reference for all purposes.

This application is also related to and claims priority to U.S. Provisional Patent Application No. 63/161,386 entitled "Architecture for Providing Forecasts of GNSS Obscuration and Multipath," filed 15 Mar. 2021. The provisional application is incorporated by reference for all purposes.

INCORPORATIONS

The following materials are incorporated by reference for all purposes as if fully set forth herein:
Contemporaneously filed U.S. application Ser. No. 17/374,885, titled "Architecture for Providing Forecasts of GNSS Obscuration and Multipath," filed 13 Jul. 2021, now U.S. Pat. No. 11,287,531, issued 29 Mar. 2022; and
Contemporaneously filed U.S. application Ser. No. 17/374,882, titled "Improving Accuracy of a GNSS Receiver That Has a Non-Directional Antenna," filed 13 Jul. 2021; and
Recommandation ITU-R P.681-11 (August 2019), Propagation data required for the design systems in the land mobile-satellite service; and
Report ITU-R P.2145-2, (September 2017), Model parameters for the physical-statistical wideband model in Recommendation ITU-R P.681; and
Recommendation ITU-R P.1407-7, (August 2019), Multipath propagation and parameterization of its characteristics; and
GB Application No. 1111305.7, titled Recording, Storage and Playback of GNSS Signals, filed 4 Jul. 2011, now GB Patent No. 2492547, issued 7 Nov. 2018; and
U.S. application Ser. No. 13/786,020, titled System and Method for Testing Real World A-GNSS Performance Of A Device, filed 5 Mar. 2013, now U.S. Pat. No. 9,519,063, issued 13 Dec. 2016; and
Federal Aviation Administration (FAA) Technical Standard Order (TSO)-C199 for Traffic Awareness Beacon System (TABS)

FIELD OF THE TECHNOLOGY DISCLOSED

The technology disclosed relates to data processing, vehicles, navigation and relative location. The technology disclosed provides for electrical computers, digital data processing systems, and data processing processes for transferring data between a plurality of computers or processes wherein the computers or processes employ the data before or after transferring and the employing affects the transfer of data therebetween.

In particular, the technology disclosed relates to path planning and route planning for rolling autonomous or automated vehicles and for flying autonomous or automated vehicles using a GNSS Forecast that specifies satellite obscurations based on position, time, environmental data and maps. Also disclosed is use by a flight control system with GNSS Forecasts and planned paths for flying vehicles to plan a path or route that has GNSS signals available over the path, and to accommodate real-time changes in flight paths without leaving space.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Connected Autonomous Vehicles (CAV) and vehicles with Advanced Driver-Assisted Systems (ADAS) require reliable GPS sensor information. In one example, an autonomous vehicle needs to have reliable positioning information for safety. The absence of good GPS signal coverage can cause malfunctions in the decision-making logic of an automated or self-driving car, causing it to navigate incorrectly and potentially collide with traffic. In another example, for an Unmanned Aerial System (UAS/drone) being used for package delivery or survey relies upon consistent highly accurate GPS positioning. The result of encountering an area of poor GPS coverage can be the failure of a package delivery, non-compliance with Remote Identification requirements, non-conformance to the approved operational airspace, or even increased risk of collision with other aircraft.

Simulations can be performed before equipment is used in a live setting, in order to minimize risks involved in component or system failure. Testing for receiver equipment exists and is widely used in the industry. Simulation and testing in a design environment ensures that the system has a known performance given a range of signal qualities and types. Modeling and simulation of a signal environment specific to an area of operation is less prevalent.

An opportunity arises for providing dilution of precision (DOP) forecasts for GNSS navigation for routing of vehicles or alerting humans in vehicles, distributing forecasts with more information than a device can estimate from its sensing of the environment that it is in. Moreover, the forecast is done in advance of a vehicle being in the environment and hence can be used for planning and improving integrity. The disclosed technology can improve both real time and route planning for both terrestrial and airborne vehicles, providing improved information about the reliability of the signals being processed by GNSS receivers, and providing the predictions over an Internet cloud architecture to millions of users.

SUMMARY

The technology disclosed addresses path planning using a GNSS Forecast. This includes requesting the GNSS Forecast of signal obscuration on behalf of a vehicle travelling in a region, receiving the requested GNSS Forecast, and using the GNSS Forecast to plan a path or route that has GNSS signals available over the path or route that satisfy a predetermined criterium. Also addressed is using a flight control system with GNSS Forecasts and planned paths or routes for a plurality of flying vehicles, requesting and receiving the GNSS Forecast of signal obscuration on behalf of a flying autonomous or automated vehicle travelling in a region, and using the GNSS Forecast to plan a path or route that has GNSS signals available over the path or route that satisfy predetermined criteria including accommodating real-time changes in flight paths, without leaving space, that satisfies the predetermined criteria, whereby at least some real-time changes in flight paths that would not compromise a diverted flying vehicle's ability meet the requirements of flight control in an airspace.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

FIG. 3F describes an example forecast file for a given area (tile) over a time period.

FIG. 14 depicts a route along West Ohio Street in the urban center of Indianapolis that shows where the receiver thinks it is, at 12 minutes before the mid-point time of the drive, encoded with PDOP value bands.

FIG. 15 depicts 3D GNSS Forecast visualization heat map results for West Ohio Street, Indianapolis, at four different altitude planes.

FIG. 16 depicts floating planes of signal strength for visualizing signal coverage over time, showing a lateral view of 3D GNSS Forecast visualization results for West Ohio Street, Indianapolis, at four different altitude planes.

INCORPORATION BY REFERENCE OF FILE SUBMITTED ELECTRONICALLY WITH APPLICATION

Figure 1:
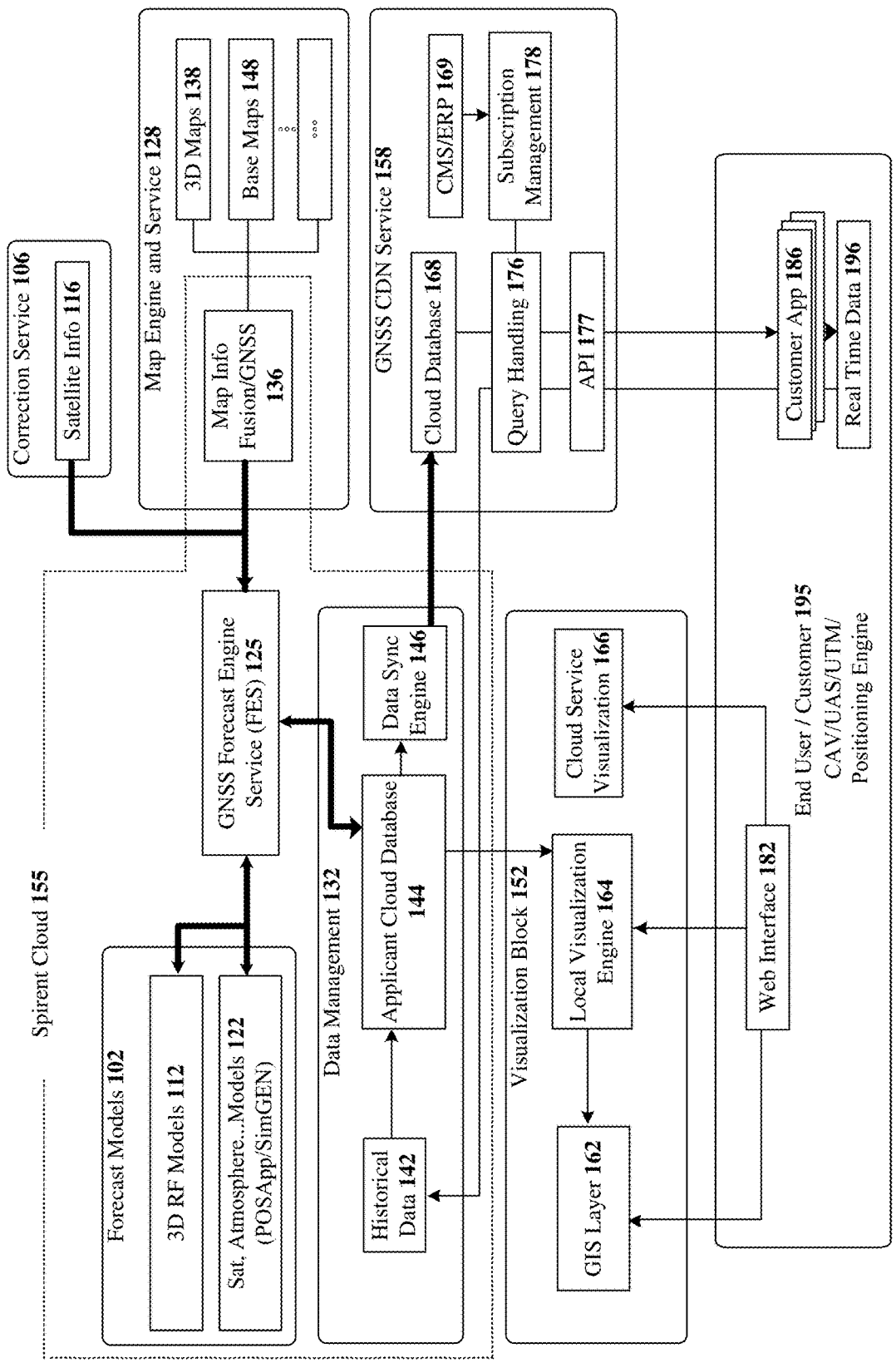
FIG. 1 shows example architecture for path planning for rolling autonomous or automated vehicles and for flying autonomous or automated vehicles using a GNSS Forecast, according to one embodiment of the disclosed technology.

The following file is submitted with this application as Appendix A and is incorporated by reference.

| File name | Creation date | Size |
|---|---|---|
| Simulation-Based Trial Implementation | 5 May 2021 | 831 KB |

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Autonomous or assisted navigation often depends on positioning information from satellite constellations, from GPS, in the United States, and GNSS, more generically. There are many known problems with GNSS positioning, related to obscured signals and multi-pathing. Estimates of the reliability GNSS positioning are important to autonomous vehicles, both ground vehicles and flying vehicles.

Urban and suburban areas present one class of problems. Tall buildings both obscure signals, blocking the line of sight to satellites, and cause multi-pathing. A GNSS receiver in an urban canyon can see only a narrow slice of the sky. It still receives signals from many satellites, reflected off buildings and flat surfaces. However, the distance traveled changes when signals are reflected, as opposed to signals received on a line of sight. GNSS receivers strive for accuracy within 3 feet. This accuracy is difficult to obtain for a reflected signal that travels 100 feet further than a line-of-sight signal would.

Even rural areas are subject to obscure signals and multi-pathing. Trees, for instance, partially obscure satellite signals. Hilly or mountainous countryside surfaces can induce multi-pathing. These effects are less dramatic in rural areas than in urban canyons.

Conditions between the satellite and receiver can partially obscure and disrupt signals. These conditions include both weather in the atmosphere and energizing of the ionosphere by solar disturbances.

One approach to signal reliability has been crowd sourcing of receiver estimates of locations from actual vehicles. The problem is that receivers sometimes are biased towards being overly confident about their position estimate. Moreover, the satellites are constantly orbiting around the earth and while a receiver may experience a good signal at one location and time, it may not in the future.

In one example, Uber uses a client-server architecture that utilizes 3D maps and performs sophisticated probabilistic computations on GPS data. Statistical modeling in a probabilistic framework, for checking whether the ray joining the location to the satellite is blocked for a possible location for the receiver, can utilize crowd-sourced 3D maps. The probability distribution model of the SNR under LOS and shadowed condition is usable for determining the likelihood of the SNR measured for the satellite, and this can be duplicated over a grid of possible locations to obtain a likelihood surface—or heat map—of possible receiver locations, based on satellite signal strengths, for probabilistic shadow matching. The heat map from probabilistic shadow matching has very many local maxima and the GNSS fix can have large outliers, driving the use of filters to approximate arbitrary distributions, at the expense of high complexity. The accuracy is also limited by the quality of the crowd-sourced 3D maps.

Limitations introduced by the use of statistical models motivate the disclosed technology for forecast assured navigation (FAN) for providing dilution of precision (DOP) forecasts and/or degree of confidence forecasts for GNSS navigation for routing of vehicles or alerting humans in vehicles, using simulation for generating prediction of GPS/GNSS signals based on time, position, environmental data and maps. The disclosed GNSS Forecast heat maps are usable to determine integrity and performance along a route and for nearby areas.

Acronyms

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, many of them are listed here:

| | |
|---|---|
| ADAS | Advanced Driver-Assisted System |
| AGL | Above Ground Level |
| API | Application Programming Interface |
| ASIL | Automotive Safety Integrity Level |
| AWS | Amazon Web Services |
| BVLOS | Beyond Visual Line of Sight |
| CAV | Connected Autonomous Vehicles - self-driving cars and autonomous drones |
| CMS | Content Management System |
| CDN | Content Delivery Network |
| CDNG | CDN Gateway |
| DAV | Detect and Avoid |
| DCM | Digital City Map |
| DEM | Digital Elevation Model |
| DSM | Digital Surface Model - earth's surface and objects on it |
| DOP | Dilution of Precision |
| DTM | Digital Terrain Model |
| ERP | Enterprise Resource Planning |
| eVTOL | Electric Vertical Takeoff and Landing |
| F2CDNS | Forecast to CDN Service |
| FAN | Forecast Assured Navigation |
| FBX | Autodesk FilmBox Format (3D Data Interchange) |
| FCaaS | Flight Check as a Service |
| FC | Forecast Controller |
| FCBS | Forecast Call-back Service |
| FES | Forecast Engine Service |
| FO | Forecast Orchestrator |
| FPS | Forecast Processing Store |
| FWS | Forecast Worker Service |
| GIS | Geographical Information System |
| GNSS | Global Navigation Satellite System |
| GPS | Global Positioning System |
| GPU | Graphics Processing Unit |
| gRPC | Open-source Remote Procedure Call |
| HAV | Hybrid Air Vehicles |
| IaaS | Integrity as a Service |
| JSON | JavaScript Object Notation |
| LES | Logging and Event Service |
| LOS | Line of Sight |
| MCS | Map Curation Service |
| MPP | Map Processing Pipeline |
| NLOS | Non-Line of Sight |
| NTP | Network Time Protocol |
| ODD | Operational Design Domain |
| OPR | Orbit Prediction Runner |
| OPS | Orbit Prediction Service |
| OSR | Observation Space Representation |
| P2CDNS | Public to CDN Service |

| | -continued |
|---|---|
| PDOP | Position Dilution of Precision |
| PNT | Position, Navigation and Time |
| POC | Proof of Concept |
| PosApp | Positioning Application - Proprietary Spirent software application for multi-channel satellite navigation (GNSS) simulation systems |
| PPP | Precise Point Positioning |
| RAIM | Receiver Autonomous Integrity Monitoring |
| RDVS | RINEX Downloader & Validator Service |
| REST | Representational State Transfer |
| RINEX | Receiver Independent Exchange Format |
| RM | Road Map |
| RNAV | Area Navigation |
| RNP | Required Navigation Performance |
| RPC | Remote Procedure Call |
| RTK | Real-Time Kinematic |
| SCS | Schedule Curation Service |
| SDSP | Supplemental Data Service Provider |
| SHP | Shape File - commercial standard for representing geospatial vector data |
| SimGEN | Mode of PosApp: full scenario environment development capability; extended data input/output options, user actions and commands; advanced remote control |
| SLA | Service Level Agreement |
| SQL | Structured Query Language |
| SS | Scheduler Service |
| SSR | State Space Representation |
| TDOA | Time Difference of Arrival - multilateralization for geolocation of RF emitters |
| TRANSSEC | Transmission Security |
| TSE | Total System Error |
| TTA | Time to Alarm |
| UA | Unmanned Aircraft |
| UAAA | Urban Advance Air Mobility |
| UAS | Unmanned Aerial System |
| UAV | Unmanned Aerial Vehicles |
| USS | Unmanned Service Supplier |
| UTM | Universal Transverse Mercator coordinate system |
| UTMP | Unmanned Traffic Management Program |
| VMPS | Vendor Map Processing Service |
| VOP | Valid Observable Points |
| WAAS | Wide Area Augmentation System |
| WGS84 | U.S. DoD global reference system for geospatial information for GPS |

The Forecast Assured Navigation (FAN) technology disclosed herein addresses the need of GNSS receivers, measurement engines, positioning engines, consumer devices, telecommunication equipment, navigation systems, avionics, and vehicles' "clients" that use GNSS as a source of position, navigation and timing to know where and when GNSS signals will be available, impaired, or not available. Clients can exist in a laboratory environment for test and validation, in a planning system before operation of a system, or in a live environment where the client is in an operational vehicle. Existing integrity and augmentation techniques consider many variables, such as the atmosphere, satellite errors and orbits, to improve the performance and reliability of the client. The local environment, such as buildings, are not known to the client and are one of the primary unaddressed sources of errors due to loss of the signal due to obscuration or interference of the signal due to partial obscuration of the signal and multipath. When the client is given a prediction of GNSS obscurations and multipath, the client can either plan to avoid areas or use the prediction to improve performance of the client.

Autonomous vehicles can benefit from improved information about the reliability of the signals being processed by GNSS receivers. This information is useful both in real time and for route planning. The process of generating a prediction of GPS/GNSS signals based on time, position, environmental data, and maps uses various methods to determine satellite obscurations based on position, time, environmental data, and maps. Moreover, the process uses various methods to determine satellite signal degradation due to multipath and other interference based on position, time, environmental data and maps.

The disclosed technology for Forecast Assured Navigation (FAN) uses environmental data (maps containing building locations, terrain, vegetation, and other obstacles) to determine GNSS satellite obscurations (line-of-sight, non-line-of-sight, out-of-view) at some time in the past, present, or future and for specific locations, also referred to as a GNSS obscuration forecast.

The disclosed technology also uses environmental data (maps containing building locations, terrain, vegetation, and other obstacles) to determine GNSS satellite multipath at some time in the future and for specific locations, referred to as a GNSS multipath forecast.

The disclosed technology applies statistical multipath models to 3D maps that represent a real environment. Existing models detailed in ITU-R P681-11, P.2145-2, and P.1407-7 are designed to model multipath for satellite communications, not GNSS. The disclosed technology can extend these and other models for use in GNSS despite the fact that they do not use as many satellites or the same exact frequencies. Moreover, existing models use self-generated maps that are synthetically created to represent different types of environments such as urban, suburban, rural and other types of environments. The disclosed technology uses the same algorithms, but instead of self-generated maps uses 3D maps that represent a real environment to generate a prediction of GNSS satellite multipath signals.

The disclosed Forecast Assured Navigation (FAN) technology features an obscuration forecast and a multipath forecast, that enable determining in advance where and when GNSS is reliable. FAN is a cloud-based service which provides additional forecast information about the expected GNSS visibility for specific regions around the world, as requested by the end user. This service differs from existing solutions as it also considers the terrain and the built-up environment instead of assuming open sky. SaaS supports receivers, positioning engines and navigation systems to provide better situational awareness of the GNSS signals they are receiving. The additional information is computed by applicant using present satellite orbits, GNSS simulators and high-definition 3D maps to look into the future and provide the intended solution with a much more precise expected satellite signal visibility than would be available otherwise. This technology supports features for autonomous ground-based vehicles for real-time planning and operation, including automated lane control with or without a known path, and for mission planning for future routes.

A system architecture for path planning using a GNSS Forecast is described next.

System Architecture

FIG. 1 shows example system architecture 100 for path planning using a GNSS Forecast. The architecture includes the design and interfaces for gathering satellite data, environmental data, maps and algorithms, and for storing data via data management, distributing on a cloud architecture and interfacing with users. Because FIG. 1 is an architectural diagram, certain details are intentionally omitted to improve clarity of the description. The discussion of FIG. 1 is organized as follows. First, the elements of the figure will be described, followed by their interconnections. Then, the use of the elements in the system will be described in greater detail.

System architecture 100 includes applicant's cloud 155 with GNSS Forecast engine service (FES) 125, map engine and service 128, GNSS CDN service 158, visualization block 152 and end user/customer positioning engine 195. GNSS Forecast engine service (FES) 125 interfaces with the environmental data module and simulation/algorithm module and calculates predictions of GNSS signals for geographically defined areas. The predictions from the GNSS Forecast engine service (FES) 125 are stored and then published to the cloud architecture. Applicant's cloud 155 includes GNSS Forecast engine service (FES) 125 that utilizes data from forecast models 102 in conjunction with satellite information 116 provided by correction service 106. Forecast models 102 include 3D RF models 112 and satellite atmosphere models POSApp and SimGEN 122. GNSS Forecast engine service (FES) 125 receives map info fusion/GNSS 135 via map engine and service 128, and stores and retrieves GNSS Forecasts in Spirent's cloud database 144 as part of data management 132, which also includes historical data 142. Data sync engine 146 provides GNSS Forecasts to cloud database 168 in GNSS CDN service 158, as part of data management 132. Map engine and service 128 also includes 3D maps 138 and base maps 148 among others maps. GNSS CDN service 158 includes query handling 176 via API 177 to customer app 186 in end user/customer positioning engine 195, which also handles real time data 196 from customer positioning engine 195. GNSS CDN service 158 also handles GNSS Forecast subscriptions via subscription management 178 controlled by CMS/ERP 169. Additionally visualization block 152 interfaces with customer positioning engine 195 via web interface 182 via local visualization engine 164, cloud service visualization 166 and GIS layer 162. Local visualization engine 164 displays forecasts stored in applicant cloud database 144 by GNSS Forecast engine service (FES) 125 in one implementation of the system.

The disclosed cloud architecture provides a globally distributed, low latency, high-availability system for clients to request GNSS Forecasts. Clients can request the GNSS predictions for several applications including, but not limited to GNSS receivers, measurement engines, positioning engines, consumer devices, telecommunication equipment, navigation systems, avionics, and vehicles for planning, operation, or validation. The disclosed Forecast Engine Service (FES) inputs a map and satellite orbits, and outputs a forecast of LOS/NLOS plus PDOP for each 1 m² point within the map, in one implementation.

Figure 2:
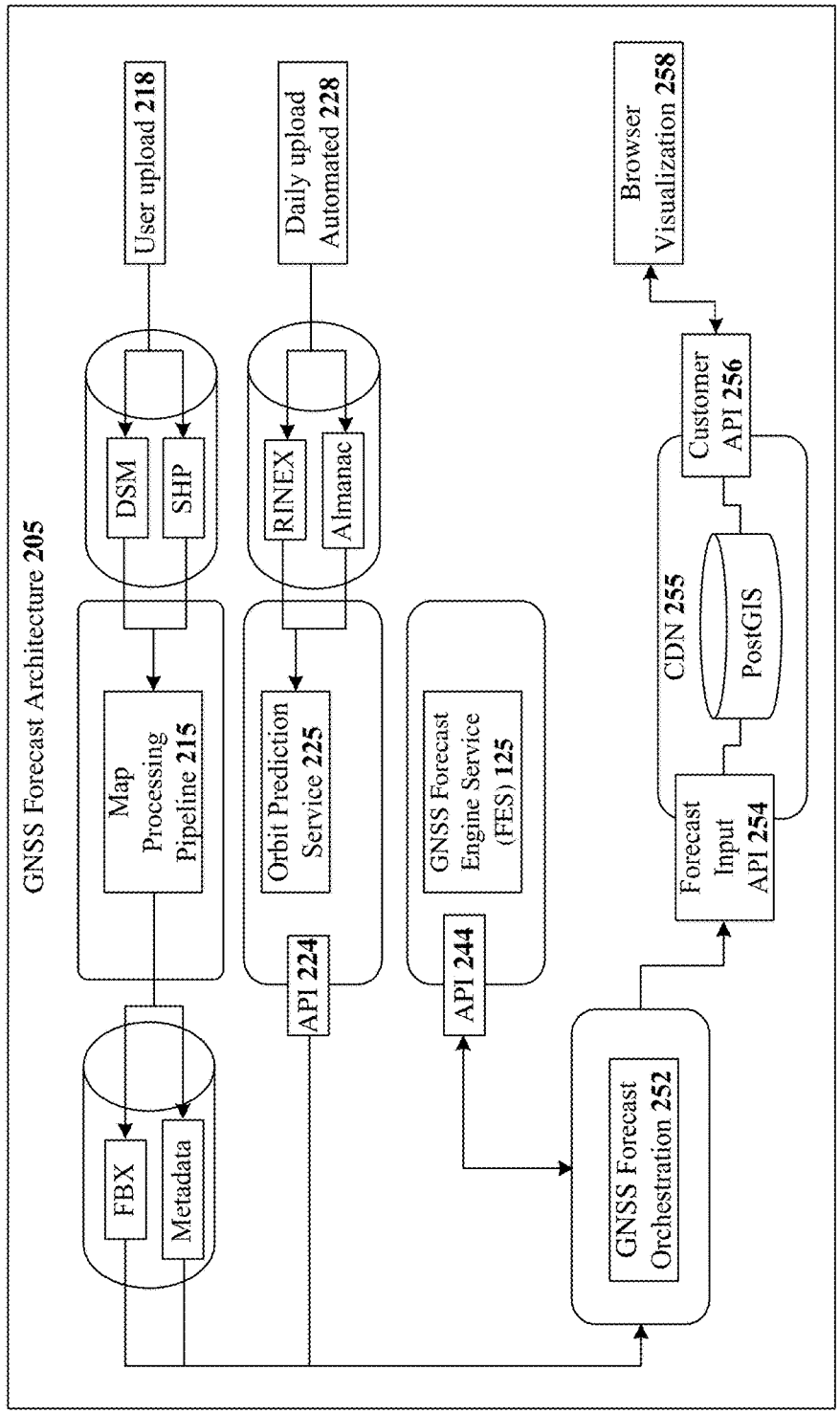
FIG. 2 shows an alternate implementation in which GNSS Forecasts are stored directly from the forecast engine to the CDN.

FIG. 2 shows the block diagram for a system implementation in which GNSS Forecasts are stored directly from the forecast engine to the CDN, an alternative to redundant data management described relative to FIG. 1. The block diagram of GNSS Forecast architecture 205 utilizes multiple modules. User upload 218 provides inputs to map processing pipeline 215 as digital surface model (DSM) of the earth's surface and objects on it, and shapefile (SHP) that represents shapes as geospatial vector data. Map processing pipeline 215 completes the initial map processing and outputs 3D map data in FBX 3D data interchange format (FilmBox), along with at least one metadata file that describes the map data. The FBX is a 3D model mesh suitable for loading into a GPU and the metadata file contains geographic information about the FBX such as where the FBX "tile" is located on the earth's surface and a list of valid observable points (VOPs). FBX tiles can be different sizes. Processing to 1 Km² utilizes VOPs in a grid of cuboids at 1 m intervals, in one implementation. When creating VOPs, the building footprints are typically masked to not include VOPs inside of buildings. An automated daily upload 228 provides to orbit prediction service 225 the GPS almanac data set that every GPS satellite transmits, which includes information about the state of the GPS satellite constellation, as well as coarse data on every satellite in orbit. The orbital position of each satellite is known as the ephemeris data. Automated daily upload 228 provides the raw satellite navigation system data in Receiver Independent Exchange Format (RINEX). Orbit prediction service 225 handles the initial orbit prediction service and sends the orbit prediction data needed by forecast orchestration 252, in the format specified via API 224.

Continuing the description of GNSS Forecast architecture 205, GNSS Forecast engine service (FES) 125 generates GNSS Forecast data, via GPU ray casting on FBX data with metadata, and provides the forecast data to GNSS Forecast orchestration 252 as specified via forecast API 244 via forecast service call back (FSCB). Management of GNSS Forecasts from administrator and customer side can be done over Internet browser services. A mobile interface could be utilized in another implementation. GNSS Forecast engine service (FES) 125 generates GNSS Forecast data for defined cuboids. Each cuboid has unique ID (GUID). Cuboids get uploaded to GNSS Forecast CDN 255 using forecast input API 254 via PostGIS software program that adds support for geographic objects to the PostgreSQL object-relational database, in one implementation. CDN 255 provides the 3D forecast visualization from GNSS Forecast orchestration 252 for display with browser visualization 258, via customer API 256. Forecast API 244 enables GNSS Forecast CDN 255 to communicate, to GNSS Forecast engine service (FES) 125, on-demand requests or other requests for data that CDN 255 was not able to provide to the device, in some embodiments. In summary, GNSS Forecast architecture 205 delivers GNSS Forecasts via content delivery network 255 to a user/customer of the forecasts. When a user makes a request for data, if CDN 255 does not have a specific cuboid in the CDN database, it creates a new entity. If a cuboid with the defined ID is available, the system can add a new time forecast or update an existing one. Cuboids are provided from GNSS Forecast engine service (FES) 125. In case of collision, the previous cuboid, in time, will be replaced. A cuboid can be sliced and modified by GNSS Forecast data processor, if needed. The forecast data can be processed prior to sending to the customer in some implementations.

The disclosed GNSS Forecast engine service (FES) 125 inputs a map and satellite orbits and outputs a forecast of line-of-sight, non-line-of-sight (LOS/NLOS) plus PDOP for each 1 m². FES provides the ability to determine probability, ranking, and scoring of LOS/NLOS, out-of-view GNSS satellites in a GNSS obscuration forecast, using satellite orbit and atmospheric models from Spirent SimGEN/POSApp and treating each satellite as a transmission point in the sky. The disclosed technology uses a surveyed global 3D map with shape files and digital city maps (DCM) which show the dimensions of buildings, terrain, vegetation, and other obstacles to ray-trace between selected points on the map, to determine if each satellite is blocked/obscured by objects in the 3D map that is based on the real world. The disclosed technology uses surveyed maps. Part of the challenge in that is the accuracy/variability of the maps makes this type of calculation more complex. It becomes a probability based on the accuracy of the map, geometries, and point on the map from which you are calculating and then extrapolating to a cuboid of area/space.

Figure 3A:
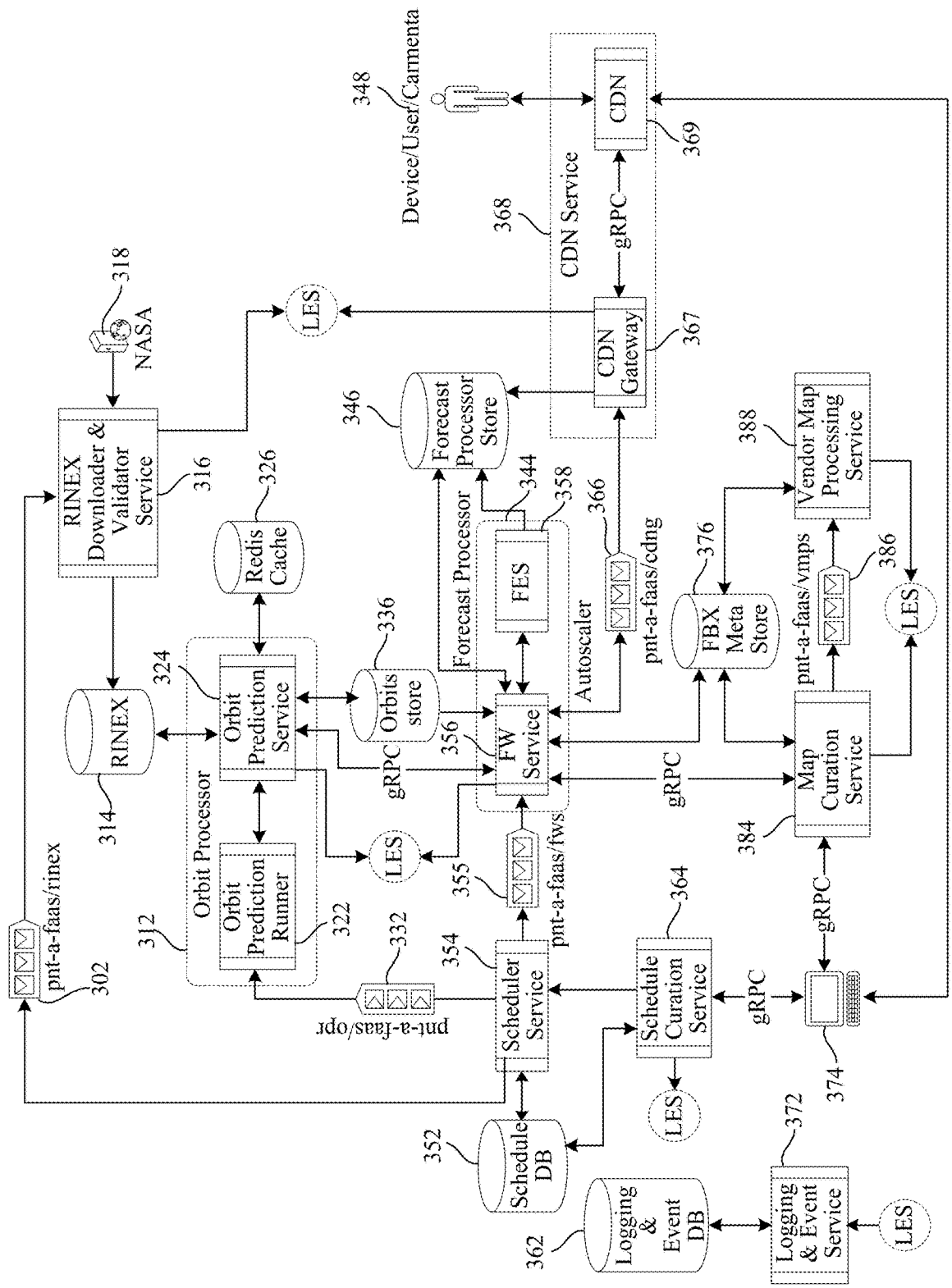
FIG. 3A shows a detailed block diagram of system architecture for path planning using a GNSS Forecast.

FIG. 3A shows a detailed block diagram of system architecture 300 for path planning using a GNSS Forecast, for collecting and recording for playback GNSS signals as a function of location, altitude, and flight envelope and for certifying performance of GNSS receivers used on a flying vessel. The system can be implemented in the cloud or using on-premises capabilities. A cloud implementation can utilize Google Cloud Platform (GCP), Amazon Web Services (AWS), or another platform that provides equivalent capabilities. FIG. 3A shows Google remote procedure calls (gRPC) in the example block diagram. In addition to the gRPC request-response model, services could use a message broker for their asynchronous exchanges. The hosted Amazon MQ for ActiveMQ service, which is compatible with Apache ActiveMQ, so can be deployed in on-premises infrastructure, is utilized in one implementation.

Map curation service (MCS) 384 sends requests for digital terrain model (DTM) and shape files to vendor map processing service (VMPS) 388 via PNT-A-FAAS/VMPS message queue 386. An example MCS 384 service call is listed next.

```
service MapCuration {
  rpc getFBXPath(TileID) returns (FilePath) { }
  rpc getMetadataPath(TileID) returns (FilePath) { }
  rpc getVOPBatchesPath(Ti1eID) returns (FilePaths) { }
...
```

MCS 384 allows upload of new vendor maps and initiates VMPS 388 to convert them to FBX and associated metadata and store them in FBX meta store 376 for retrieval by forecast engine services (FES) 358. An example FES 358 for running a forecast is listed next.

```
syntax = "proto3";
package spirent.pnta;
import "ForecastBatch.proto";
import "google/protobuf/timestamp.proto";
/* FES service to run a forecast. */
service ForecastEngine {
  rpc Forecast(ForecastRequest)
    returns (ForecastResponse) { }
}
message ForecastRequest {
  uint64 job_id = 1;
  string orbit_path = 2;
  string mesh_path = 3;
  string metadata_path = 4;
  string vop_batch_path = 5;
  string output_path = 6;
}
message ForecastResponse {
  google.protobuf.Timestamp processing_time = 1;
}
```

MCS 384 can allow access to the maps that have been uploaded to it through gRPC interface, and allow for upload of vendor data pushed through VMPS 388. VMPS 388 accepts messages from VMPS message queue 386, a pipeline that can process incoming vendor map data and produce FBX tiles along with the tiles' corresponding metadata, including VOP data. An example PNT-A-FAAS/VMPS message is listed next, as an ActiveMQ JSON message as published by the MCS 384 to the VMPS 388.

```
{
"job_id": 1,
"dataset_s": "Blacksburg_test",
"src_dtm": "Blacksburg_sample_1m_Z17N_0_dtm.tif",
"src_bld_shp": "Blacksburg_sample_17N_0_3d_buildings_automated.shp",
"tile_x_m": 1000,
"tile_y_m": 1000,
"tile_buf_m": 200,
"dtm_trans_i": -9999,
"bld_vop_buf_m_f": 0.1,
"fbx_dec_ratio_f": 0.1,
"vop_level_list": "1,2,3,4,5,10,20,30",
"publish_all": False
}
```

An example PNT-A-FAAS/CDNG message is listed next, as an ActiveMQ JSON message as published by the FWS 356 to the CDNG 367. The FES 356 will write the forecast for each timestep to a binary protocol buffers file. These files will reside in the shared Forecast Processor Store 346.

```
{
"job_id": 1,
"path": "forecast_batch0.bin"
}
```

Continuing the description of the block diagram, scheduler curation service 364 can allow the user to curate which forecasts to run at which time. The curation can reside in schedule DB 352 which can be used by scheduler service 354 to push new forecast jobs upon forecast message queue PNT-A-FAAS/FWS 355.

An example PNT-A-FAAS/FWS message is listed next, as an ActiveMQ JSON message as published by the SS 354 to the FWS 356.

```
{
"job_id": 1,
"tile_id": 1,
"start": 1272844800,
"end": 1272844820,
"time_resolution_s": 1,
"level": 1,
"elevation_cutoff_d": 0,
"forecasts": {
  "los": 1,
  "azel": 1,
  "pdop": [
  "all",
  "gps",
  "gps+glonass"
  ],
}
}
```

Scheduler service 354 can also schedule the running of orbit prediction runner 322 to cache a new 24-hour orbit in advance via PNT-A-FAAS/RINEX 302. An example PNT-A-FAAS/RINEX message is listed next, as an ActiveMQ JSON message as published by the SS 354 to the RDVS 316.

```
{
"job_id": 1,
"day_of_year": 255,
"igs_list": ["BREW", "BRUX"]
}
```

RINEX downloader and validator service 316 receives RINEX automatically downloaded from NASA HTTPS server 318. The downloaded RINEX data is the daily full constellation published data for the GPS, GLONASS, Galileo and BeiDou constellations. Downloaded RINEX files can be stored in RINEX 314 so that they are accessible by orbit prediction service (OPS) 324. A verification process can be required after download. If the file fails to be verified another IGS station's RINEX data could be download and verified in its place. However, if none of the IGS files validate then the previous good RINEX file can be used in its place, and this can be noted through logging and event service (LES). Note that IGS stations provide continuous tracking using high accuracy receivers and have data transmission facilities allowing for rapid data transmission to the data centers.

Logging and event service (LES) 372 is a repository that can record the state and history of the forecast system. LES can accept, record and report on both service logging data and real time events. Each service can be automatically collected and pushed into LogStash, with a timestamp, which requires that each service be synchronized through NTP. An ELK stack can be utilized for LES, in one implementation.

Orbit processor 312 includes orbit prediction service (OPS) 324 which predicts forward locations of satellites and caches data in Redis cache 326 and orbit prediction runner (OPR) 322 for caching a new 24-hour orbit in advance. Orbit Prediction Service 324 predicts the orbits for all the satellites within each constellation that has been enabled within the scenario run by PosApp. The supported constellations are outlined in the 'Constellation' Enum within the ForecastBatch.proto. Scheduler service 354 can request orbit predictions via PNT-A-FAAS/OPR 332. An example PNT-A-FAAS/OPR message 332 is listed next, as an ActiveMQ JSON message as published by the SS 354 to the OPR 322.

```
{
"job_id": 1,
"start": 1272844800,
"end": 1272844820,
"time_resolution_s": 1
}
```

The orbit predictions are serialized to orbits store 336, a shared file store, and the path of the orbit prediction file is returned as part of the gRPC message. A full 24-hour prediction for al constellations can be approximately 300 MB of protocol buffer data and take approximately twelve minutes to compute. The cache only stores the file path and hence is not large. OPR 322 is a small ActiveMQ subscriber that listens for new jobs and then calls the gRPC interface to initiate an orbit prediction, in one implementation of the disclosed technology. OPS 324 gRPC/Protobuf format is listed below.

Further continuing the description of the block diagram shown in FIG. 3A, forecast worker service (FWS) 356 accepts a message from FWS message queue 355 and initiates a forecast and then waits for the success or error response from forecast engine service (FES) 358. Listed next is a high level example implementation of FWS 356 to run a forecast, interacting with the FES 358, OPS 324 and MCS 384.

```
syntax = "proto3";
package spirent.pnta;
import "ForecastBatch.proto";
service ForecastWorker {
  rpc Forecast(ForecastWorkerRequest) returns
    (stream ForecastWorkerResult) { }
}
```

```
message ForecastWorkerRequest {
  uint64 job_id = 1;
  uint64 tile_id = 2;
  GPSTime start = 3;
  GPSTime end = 4;
  uint32 time_resolution_s = 5;
}
message ForecastWorkerResult {
  string forecast_path = 1;
}
```

Once the FES forecast is complete, FWS 356 can check FWS message queue 355 and if messages are queued, FWS 356 can initiate another forecast with the new message data. FWS 356 has a one-to-one mapping to FES 358, gathering the data required by FES 358 and interacting with the system, allowing FES 358 to be run locally the same way as it would run within a cloud environment. Computing all satellites within a constellation for every second over a 24-hour period only needs to be completed once a day as the resulting earth-centered, earth-fixed (ECEF) positions can be cached and served to any service requesting the data, with normal CDN latency and delivery time. FES 358 can allow for a simple elevation cut-off since many of the satellites will be NLOS due to the earth but will now be available to FES 358.

GNSS Forecast engine service (FES) 358 is operable in multiple modes. In on-demand mode, the data requested by the user has not been forecasted within the Spirent Cloud and therefore is not in the CDN 369. This mode is referred to as a CDN cache miss. The request prompts creation of a real-time forecast and the data gets sent from GNSS Forecast engine service (FES) 358 to the CDN 369, and the CDN 369 routes the data directly to the user. This type of request has no upfront storage requirement in the CDN, and has a higher latency than other modes described herein. The data generated by an on-demand request gets stored in the CDN 369 and in the applicant's cloud for future requests and is available until the data's useful life expires.

One way to achieve on-demand forecasting is to add a gRPC call to the CDNG 367, that would be called from the CDN 369 with the on-demand customer request. The CDN 369 can first check that the area requested is not currently covered by the stored data and if not covered, then push the request to CDNG 367. On receipt of the request the CDNG 367 could query the MCS 384 for the tiles that the request covers. If the area does not yet have coverage then a "no-coverage" response is returned to the CDN 369. If there is coverage for the requested area then an "OK" is returned to the CDN 369 and the tiles, from, to datetimes are placed on a second "On-Demand" Forecast Message Queue. In turn a Forecast Processor 344 can be spun up or be waiting in a "stand-by" mode to process the request. Once processed, the data can be transferred to the CDN 369 via the CDNG 367 either through the method described above or via a separate priority gRPC CDN call.

In hybrid mode, the data requested by the user has been forecasted already in the Spirent cloud and is available in the Spirent cloud database, but the forecast data is not available in the CDN 369. This mode is referred to as CDN cache miss and applicant cloud cache hit. In hybrid mode, the data will be sent from the Spirent cloud to the CDN 369 and the CDN 369 routes the data directly to the user 348. This type of request has no upfront storage requirement in the CDN 369, does have a storage requirement in the applicant's cloud, and will have moderate latency relative to other modes described herein. The data generated by this request gets stored in the CDN 369, and is available until the data's useful life expires.

In cached mode, the data requested by the user is available in the CDN 369 and is immediately sent to the user; this mode is referred to as a CDN cache hit. This cached mode has the highest storage requirement and the lowest latency relative to the modes described herein. In cached mode, the data gets pushed from the Spirent cloud to the CDN 369. The service area and valid time periods are selected by applicant in advance, based on user demand, SLAs, and cost models. The data is stored on the CDN 369 and is available until the data's useful life expires.

Frequency of data requests, complexity of the requests, forecast time, and latency of the requests are considered for determining what data to cache and which data to provide on demand. Use cases that demand low latency are forecasted on demand. Customer density and time of day of requests affect the frequency of requests. Requested forecast resolution and level of complexity of areas affect the complexity of requests.

CDN service 368 includes CDN gateway (CDNG) 367 and an interface for communication with devices, users and visualization systems 348. CDNG 367 receives messages from the CDNG message queue 366. Each message represents a file to upload to CDN 369. CDNG 367 can read the protocol buffer file from forecast processor service (FPS) 344 and then call the CDN gRPC function to accept the file stream.

Continuing the description of the block diagram shown in FIG. 3A, console window 372 provides a window into the forecasting system. The operator's view of the system can be through a browser-based UI that is driven by the data retrieved from the scheduler curation service 364, map curation service (MCS) 384 and logging and event service (LES) 372. Descriptions of operator console use case examples follow. (1) Upload of vendor map data to MCS 384 to be converted to FBX/VOPs, with notification when conversion is complete. (2) View the full set of 1 Km$^2$ tiles that have been converted, via a query to MCS 384 and then visualize the tiles as overlays on Open Street Maps, or an equivalent rendering interface. This allows for differentiating between the tiles that are already part of the forecast schedule and those that are not, and allows the user to select the tiles they wish to add into the forecast scheduler. (3) Change the forecast schedule kick off time, RINEX download time or orbit prediction time, and view the times relative to each other. (4) Watch the system as it dynamically schedules a forecast. When the system dynamically schedules a forecast, the scheduler queues a 1 Km$^2$ message on the forecast queue which auto-scales out the forecast processors to pop a message off the queue and to run the forecast for the specified tile. As the forecast runs, metrics are flowed back via LES 372. Each time step of forecast is held within forecast processor store (FPS) 346, to then be retrieved by the CDNG 367 to be uploaded to CDN 369. Knowing how full FPS 346 is and, what, and how much data has been transferred to CDN 369 can help administrators keep a cap on costs, and ensure the system is functioning as expected. (5) Notifications of stalled or errored processes, such as logging/event and notification tracing by tile ID. For example, a customer reports a problem with an area which the user of the system can look up and trace back to a particular tile and then search the logs for that tile ID and time etc. for diagnostics. (6) Processing of statistics of time, memory, space that each service is taking up, to allow for better utilization and optimization.

Upon receipt of a query, CDN 369 determines what tiles are needed for the area, and creates a manifest list with the representation file IDs from the included tiles, and sends the manifest list to client, which determines what resolution is needed, and makes file requests for data to CDN file storage. In one example, for 1 km$^2$ area with tile size of 50×50×1 meters, 400 tiles represent the specified query response. The manifest list response is a single JSON (or similar file format) with 400 tiles of metadata and file IDs. In the low spatial/low data selection, the file request and file response is 400 files, with 40,000 points. For high spatial/low data selection the file request and response is for 1600 files, with 1M points. For the high spatial/high data option, the request and response are for 1600 files, with 1M points. In a second example, for a 1 km route with 50 m width, with tile size of 50×50×1 meters, 20 tiles represent the specified query response. The manifest list response is a single JSON (or similar file format) with 20 tiles of metadata and file IDs. In the low spatial/low data selection, the file request and file response is 20 files, with 1,000 points. For high spatial/low data selection the file request and response is for 80 files, with 50 k points. For the high spatial/high data option, the request and response are for 80 files, with 50 k points. In conclusion, GIS DB and CDN file storage architecture yields fast DB search and initial API response to client, and keeps DB small and if tiles are not changing can be indexed once. The client determines what resolutions to request, and may not need to ask twice when going from area to path search. New representations can be added in another embodiment, without changing the DB. Also client can stream files. Data files can be created and stored directly from FES 358 in the GPU, for some implementations. Computation/aliasing of different resolutions get computed efficiently in the GPU.

FIG. 3F, along with the listing below, describe an example forecast file for a given area (tile) over a time expressed in GPS time i.e. seconds since 1980-01-06T00:00:00+00:00 for a particular type, with ForecastBatch 305 describing metadata, ForecastMetadata 321 specifying the forecast parameters, message ForecastAzEl 351 describing azimuth and elevation, ForecastLOS setting line of site details, ForecastDOP 371 for dilution of precision, PointForecastLOS 381 for the point forecast line of sight, and PointForecastDOP 391 for the point forecast line of sight. The forecast file further describes SatelliteAzElForecast 358, SatelliteLOSForecast 387 and DOPResult 398, along with the details described in the list below.

```
message DOPForecast {
   GPSTime valid_from = 1;
   DOPResult dop = 2;
}
enum ForecastType {
   LOS = 0;
   AZ_EL = 1;
   PDOP_ALL = 2;
}
enum Constellation {
   GPS = 0;
   GALILEO = 1;
   GLONASS = 2;
   BEIDOU = 3;
   WAAS = 4;
   EGNOS = 5;
   MSAS = 6;
   QZSS = 7;
   GAGAN = 8;
   SDCM = 9;
}
```

```
message Satellite {
  Constellation constellation = 1;
  uint32 svid = 2; // Mostly PRN but slot ID for GLONASS
}
message AzimuthElevation {
  float azimuth_deg = 1;
  float elevation_deg = 2;
}
message Point3DWGS84 {
  Point2D position = 1;
  double height_m = 2;
}
message Point2D {
  double latitude_deg = 1;
  double longitude_deg = 2;
}
message Quad2D {
  Point2D nw_corner = 1;
  Point2D ne_corner = 2;
  Point2D se_corner = 3;
  Point2D sw_corner = 4;
}
message HeightRange {
  double min_m = 1;
  double max_m = 2;
}
message SatelliteAzEl {
  GPSTime valid_from = 1;
  AzimuthElevation coordinate = 2;
}
message LOSForecast {
  GPSTimeRange los_period = 1; // From/To time
    when signal is LOS
}
message GPSTimeRange {
  GPSTime from = 1;
  GPSTime to = 2;
}
message GPSTime {
  uint64 seconds = 1;
}
```

Forecast engine service (FES) 358 can compute line of sight (LOS), azimuth and elevation and position dilution of precision (PDOP). LOS will be recorded for every satellite at every VOP. PDOP can be recorded for every VOP when the there is a change in LOS or every two minutes. Azimuth and elevation can be recorded on a forecast basis for every satellite when their values change. The term "temporal compression" describes this approach. To make it easier for a client to request data, the height element in their request is assumed to be zero for local ground level and then meters above that. The height used by FES 358 is with reference to the WGS84 ellipsoid. Since local ground can vary from meter to meter a concept of "level" is required for grouping. The zero level is considered as ground and hence FES 358 is required to indicate the level for which the current dataset is being generated.

Dataflow for forecast engine service 358 can be described in six steps. In step one, vendor map is uploaded to map curation service 384, and conversion to FBX metadata starts. At step two, map administrator selects 1 Km² tiles to add to the forecast scheduler database. At step three, forecast schedule, RINEX download and orbit prediction times are schedule to execute. At step four, forecast service autoscales processor engines to perform GNSS prediction computes. At step five, computed forecast data is moved from cache to CDN, ready for availability to customers. At step six, system analytics and processing events are monitored to trace customer feedback and optimize the forecast engine services platform.

Figure 3B:
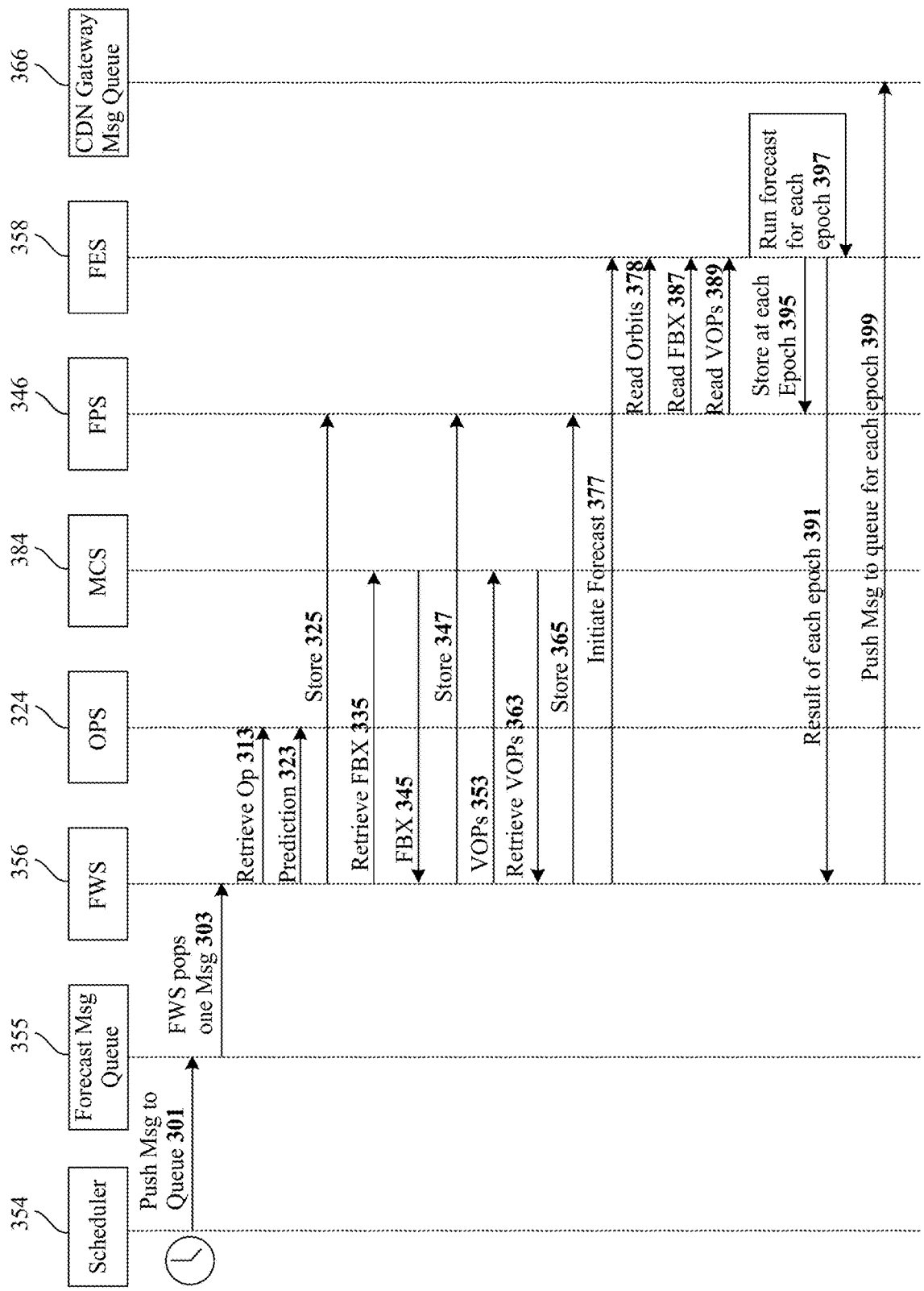
FIG. 3B shows a message flow for interactions of forecast worker service (FWS) 356 with other services.

FIG. 3B shows a message flow for interactions of forecast worker service (FWS) 356 with other services. To initiates a forecast, scheduler 354 pushes messages 301 to forecast message queue 355. FWS 356 pops one message 303 and retrieves orbit prediction 313 from OPS 324 as prediction 323, and stores the orbit prediction in FPS 346. Then FWS 356 retrieves FBX 335 from MCS 384 as FBX 345, and stores the FBX 347 in FPS 346. Then FWS 356 retrieves VOPs 353 from MCS 384 as VOPs 363, and stores them in FPS 346. Then FWS 356 initiates forecast 377 from FES 358. FPS 346 reads orbits 378, FBX 387 and VOPs 389 into FES 358. Then FES 358 runs a forecast for each epoch 397 and stores the forecast at each epoch 395 in FPS 346. FES 358 also returns the result of each epoch 391 to FWS 356 that pushes the results via CDNG message queue for each epoch 399. Once the FES forecast is complete, FWS 356 can check FWS message queue 355 and if messages are queued, FWS 356 can initiate another forecast with the new message data.

Since all satellites, not just those in view according to PosApp, are passed to FES 358 for processing, FES 358 can cull satellites below a given elevation cut off point. A default of zero degrees is utilized in one implementation. Orbit Prediction Service (OPS) 324 predicts the orbits for all the satellites within each constellation that has been enabled within the scenario run by PosApp. The supported constellations are outlined in the 'Constellation' Enum within the ForecastBatch.proto, which is described in the Forecast Assured Navigation (FAN) APIs section below. Times are in GPS time i.e. seconds since 1980-01-6T00:00:00+00:00. OPS 324 gRPC/Protobuf format is listed next.

```
syntax = "proto3";
package spirent.pnta;
import "ForecastBatch.proto";
service OrbitPredictionService {
  rpc Predict(OrbitPredictionRequest)
    returns (OrbitPredictionResult) { }
}
message OrbitPredictionRequest {
  uint64 job_id = 1; //Job ID trace
  GPSTime start = 2;
  GPSTime end = 3;
  uint32 resolution_s = 4; // If not defined then assumed to be 1 second
}
message OrbitPredictionResult {
  uint64 job_id = 1; // Job ID trace
  string path = 2; // Path to prediction file, relative to mount
}
message OrbitPrediction {
  GPSTime valid_from = 1;
  GPSTime valid_to = 2;
  uint32 time_resolution_s = 3;
  repeated Timed SatellitePosition series = 4;
}
message Timed SatellitePosition {
  GPSTime timestamp = 1; // Time of applicability of position
  repeated SatellitePosition satellite = 2;
}
message ECEFPosition {
  double x = 1; // Metres
  double y = 2; // Metres
  double z = 3; // Metres
}
message SatellitePosition {
  Satellite satellite = 1; // Constellation and SVID
  ECEFPosition position = 2;
}
```

Scheduler curation service 364 allows a user to set up jobs to run every day and allows those jobs to accept templated message parameters, so that the services are call with the correct arguments. Forecasts are tile based and are required to run for a given prediction duration from a start date-time.

At least once daily, scheduler curation service 364 runs for a given duration from a start date-time. OPR 322 subscriber listens for new jobs and then calls the gRPC interface to initiate an orbit prediction. Orbit prediction service (OPS) 324 accesses downloaded RINEX files stored in RINEX 314. If the requested forecast is not in the orbit cache, then OPS 324 retrieves the closest RINEX files for the given date, and predicts orbits, and send the orbit prediction to OPR 322. OPS 324 also sends the prediction to orbit cache for retrieval by other services, in one implementation.

APIs for Forecast Assured Navigation (FAN)

APIs for requesting and retrieving forecast points and forecast areas are disclosed for retrieving a forecast for a set of points at ground level, for 2D, and at any height relative to the ground for 3D, via the WGS84 standard U.S. DoD global reference system for geospatial information. GNSS Forecast arrays include DOP for the satellites.

Forecast ingress API defines the interface protocol between CDNG 367 and CDN 369. The ForecastBatch.proto defines the data format of the ForecastBatch datafiles which are uploaded from FES 358 to CDN 369 via CDNG 367. The proto protocol buffer utilizes a language-neutral, platform-neutral, extensible mechanism for serializing the structured data. The customer facing API endpoints will be served by CDN 369. Communication between CDN 369 and CDNG 367 is based on the gRPC framework, in one implementation with CDN providing a gRPC response to the user/device 348. A user/device 348 may opt to formulate data requests to CDN 369 using HTTP requests, in a different embodiment. A ForecastBatch.proto datafile is a single block of output by FES 358. In one example, this represents an area of 100×100 m2. Map tiles correspond to a 1.2×1.2 km2 area, in one implementation. The size dimensions can be different in different implementations. ForecastBatch.proto parameters are described next.

| <containing message> . <qualified parameter name> | Datatype (Message or other) | Units | Notes |
| --- | --- | --- | --- |
| ForecastBatch | (Overarching message) | — | The ForecastBatch message is the highest-level message that encapsulates all the subsequent messages. |
| ForecastBatch.forecastbatch_metadata | Metadata | — | The Metadata message contains other messages explained in this section and applies to the specific forecast batch. |
| ForecastBatch.per_point | ForecastPerPoint | — | This is the container message for the forecast parameters (DOP and LOS only) applying to each observation point. |
| ForecastBatch.per_batch | ForecastPerBatch | — | This is the container message for the azimuth/elevation forecast parameters applying to the whole ForecastBatch corresponding area (100 m × 100 m in one use case). |
| Metadata.forecast_validity_period | GPSTimeRange | — | Start and End of validity period of forecast batch in GPS time. |
| Metadata.area | Quad2D | — | This area comprises four points that define the horizontal (Lat/Lon) coordinates of the lower and upper faces of the bounding box. |
| Metadata.height_agl | double | meters | The AGL height of the forecast batch is the height above ground level. Note that ground level is always AGL = 0 m. AGL can be a positive or negative number. |
| Metadata.height_agl_range | HeightAGLRange | — | See explanation for HeightAGLRange message. |
| Metadata.height_wgs84_range | HeightWGS84Range | — | See explanation for HeightWGS84Range message. |
| Metadata.point_grid resolution | double | meters | The grid resolution is a positive number, stating the distance between adjacent prediction points. Default value is 1 m. |
| Metadata.forecast_type | ForecastType | — | See explanation for ForecastType message. |
| ForecastPerPoint.point_forecast | PointForecast | — | See explanation for PointForecast message. |
| ForecastPerBatch.satellite_az_el_forecast | SatelliteAzElForecast | — | See explanation for SatelliteAzElForecast message. |
| PointForecast.point | Point3DWGS84 | — | The 3D coordinates of the observation point in WGS84. |

-continued

| <containing message> . <qualified parameter name> | Datatype (Message or other) | Units | Notes |
|---|---|---|---|
| PointForecast.los | SatelliteLOSForecast | — | The container for LOS forecast information for this observation point, see explanation of SatelliteLOSForecast message for more details. |
| PointForecast.dop | DOPForecast | — | The container for PDOP forecast information for this observation point, see explanation of DOPForecast enumeration list for more details. Only PDOP using all available satellites and constellations is provided currently, future releases may include other DOP types, e.g. GDOP, or different constellation combinations e.g. GPS + GLONASS only. |
| SatelliteAzElForecast.satellite | Satellite | — | This parameter contains all the essential information to identify a satellite in the forecast (i.e., SVID, see svid explanation below) and constellation). |
| SatelliteAzElForecast.coordinates | SatelliteAzEl | — | This contains the azimuth/elevation (rounded to the nearest degree) for each satellite in the forecast batch, noting that the Az/El do not change between observation points within the forecast batch, as the size of the corresponding area (100 m × 100 m) has a negligible effect on the satellite azimuth and elevation observed by individual forecast points. |
| GPSTimeRange.from | GPSTime | — | GPSTimeRange provides a range of time values in GPS time. It can be used to define data validity periods, or the applicable period of a user's request and the corresponding manifest file response by the CDN.<br>It should be noted that GPS Time is different to UTC time by the number of leap seconds since the start of GPS Time (midnight of January 6$^{th}$, 1980). At the time of writing, UTC Time lags 18 seconds relative to GPS Time. |
| GPSTimeRange.to | GPSTime | — | |
| Quad2D.nw_corner | Point2D | — | These four points define the horizontal coordinates of the of the lower and upper surfaces of the cuboid. |
| Quad2D.ne_corner | Point2D | — | |
| Quad2D.sw_corner | Point2D | — | |
| Quad2D.sw_corner | Point2D | — | |
| HeightAGLRange.min_height_agl | double | meters | This is the minimum AGL height of the bounding box. |
| HeightAGLRange.max_height_agl | double | meters | This is the maximum AGL height of the bounding box. |
| HeightWGS84Range.min_height_wgs84 | double | meters | This is the minimum WGS84 height of the bounding box. |
| HeightWGS84Range.max_height_wgs84 | double | meters | This is the maximum WGS84 height of the bounding box. |

-continued

| <containing message> . <qualified parameter name> | Datatype (Message or other) | Units | Notes |
|---|---|---|---|
| ForecastType | enum | unitless | Enumeration of values: "DOP", "LOS", "AZ_EL". This element is also provided to future-proof the ForecastBatch proto file. This is the type of the Forecast data provided in each ForecastBatch "DOP" provides information for "LOS" and "AZ_EL" too, in some implementations.. |
| Point3DWGS84.position | Point2D | — | Point3DWGS84providesthe 3D coordinates of a single Forecast observation point in WGS84. |
| Point3DWGS84.height_wgs84 | double | meters | |
| SatelliteLOSForecast.satellite | Satellite | — | The SatelliteLOSForecast message provides information about when a satellite is LOS as a series of repeated periods (whose start and end are in GPS time). It follows that a given satellite is NLOS in-between those periods. |
| SatelliteLOSForecast.measurement | LOSForecast | — | |
| DOPForecast.valid_from | GPSTime | — | This is the GPS time that the PDOP forecast is valid from. Note that the PDOP has no expiry time, but it is revoked instead by a new PDOP forecast. |
| DOPForecast.dop_result | DOPResult | — | See explanation for DOPResult message. |
| Satellite.constellation | Constellation | — | See explanation for Constellation enumeration list. |
| Satellite.svid | uint32 | unitless | PRN for all constellations except for GLONASS where it represents the satellite's slot number. |
| SatelliteAzEl.valid_from | GPSTime | — | The start of validity of the satellite azimuth/elevation of the forecast batch in GPS time. |
| SatelliteAzEl.coordinate | AzimuthElevation | — | The satellite azimuth/elevation of the forecast batch in GPS time. |
| LOSForecast.los_forecast_validity | GPSTimeRange | — | This is a single GPS time range that shows when a satellite is visible. |
| GPSTime.seconds | uint64 | seconds | GPS Time is the number of seconds since the stall of GPS Time (January 6$^{th}$, 1980). Example: a value of 1,857,945,600 corresponds to midnight of Sunday, 21 Nov. 2038. |
| Point2D.latitude | double | degrees | Latitude in decimal degrees relative to WGS84. |
| Point2D.longitude | double | degrees | Longitude in decimal degrees relative to WGS84. |
| Constellation | enum | — | Enumeration of GNSS/SBAS constellations: "GPS"; "GALILEO"; "GLONASS"; "BEIDOU"; "WAAS"; "EGNOS"; "MSAS"; "QZSS"; "GAGAN"; and "SDCM". |
| DOPResult | enum | — | Enumeration of PDOP value classes: "IDEAL" [0-1); "EXCELLENT" [1-2); "GOOD" [2-5); "MODERATE" [5-10); "FAIR" [10-20); "POOR" [20+); "NO_DOP". e.g., "IDEAL" corresponds to a PDOP from 0 to 1 (not inclusive) . A "NO_DOP" value means that less than four |

-continued

| <containing message> . <qualified parameter name> | Datatype (Message or other) | Units | Notes |
|---|---|---|---|
| | | | satellites were available at the time of PDOP calculation. Note that at the time of writing, PDOP is calculated when there is a change in the set of LOS satellites, due satellite(s) rising/setting, or two minutes after the last PDOP calculation, even if there have been no changes in the LOS set of satellites since the last PDOP calculation. |
| AzimuthElevation.azimuth | float | degrees | Azimuth of a satellite w.r.t. ForecastBatch centroid local horizon (North at 0° and positive anti-clockwise). Range from 0° (inclusive) to 360° (exclusive), rounded to the nearest 1°. |
| AzimuthElevation.elevation | float | degrees | Elevation of a satellite w.r.t. ForecastBatch centroid local horizon. Range from −90° (inclusive) to +90° (inclusive), rounded to the nearest 1°, noting that at the time of writing the FES will exclude from the calculations any satellites with negative elevation. |

Device API defines the interface protocol between a user/device visualization app and CDN 369. The device API is realized by the device API file which defines the serialized binary format of the user/device requests to CDN 369, and the subsequent CDN gRPC response. The DeviceAPI.proto file definitions are wrapped into a navmatix.gnss_forecast. device_api package. Device API is listed next.

```
service Device {
  rpc GetManifestBy3DAGLPolygon(GetManifestBy3DAGLPolygonRequest) returns (Manifest) { }
  rpc GetManifestBy3DWGS84Polygon(GetManifestBy3DWGS84PolygonRequest) returns (Manifest) { }
  rpc GetManifestBy3DAGLPath(GetManifestBy3DAGLPathRequest) returns (Manifest) { }
  rpc GetManifestBy3DWGS84Path(GetManifestBy3DWGS84PathRequest) returns (Manifest) { }
}
service Auth {
  rpc Auth(AuthRequest) returns (AuthResponse) { }
}
message GetManifestBy3DAGLPolygonRequest {
  spirent.pnta.GPSTimeRange request_time_range = 1; // Start and End time of request in GPS time
  double min_height_agl = 2;
  double max_height_agl = 3;
  repeated Point2D points = 4;
  repeated spirent.pnta.ForecastType types = 5; // Types of forecast requested
}
message GetManifestBy3DWGS84PolygonRequest {
  spirent.pnta.GPSTimeRange request_time_range = 1; // Start and End time of request in GPS time
  double min_height_wgs84 = 2;
  double max_height_wgs84 = 3;
  repeated Point2D points = 4;
  repeated spirent.pnta.ForecastType types = 5; // Types of forecast requested
}
```

```
message GetManifestBy3DAGLPathRequest {
  spirent.pnta.GPSTimeRange request_time_range = 1; // Start and End time of request in GPS time
  repeated Point3DAGL points = 2;
  repeated spirent.pnta.ForecastType types = 3; // Types of forecast requested
}
message GetManifestBy3DWGS84PathRequest {
  spirent.pnta.GPSTimeRange request_time_range = 1; // Start and End time of request in GPS time
  repeated spirent.pnta.Point3DWGS84 points = 2;
  repeated spirent.pnta.ForecastType types = 3; // Types of forecast requested
}
message Manifest {
  repeated ManifestItem items = 1;
}
message ManifestItem {
  string url = 1;
  spirent.pnta.ForecastMetadata manifest_item_metadata = 2;
  Compression compression = 3;
  int64 file_size = 4; // In bytes
  string file_hash = 5; // SHA-256 as hex
}
message Point2D {
  double latitude = 1;
  double longitude = 2;
}
message Point3DAGL {
  Point2D position = 1;
  double height_agl = 2;
}
message AuthRequest {
  string api_key = 1;
}
message AuthResponse {
  string auth_token = 1;
}
enum Compression {
  NONE = 0; // No compression
}
```

DeviceAPI.proto imports the message definitions from the ForecastBatch.proto to avoid duplicate messages/datatypes declarations and to facilitate consistency and maintenance of these files, so a customer needs to be provided both DeviceAPI.proto and ForecastBatch.proto files. DeviceAPI.proto file parameters are described next.

| <containing message> . <qualified parameter name> | Datatype (Message or other) | Units | Notes |
| --- | --- | --- | --- |
| Device | (service) | — | The service encapsulates a number of RPC methods to accommodate customer path/polygon and WGS84/AGL height requests as explained in this table. |
| GetManifestBy3DAGLPolygon | (method) | — | Input argument: GetManifestBy3DAGLPolygonRequest Response: Manifest |
| GetManifestBy3DWGS84Polygon | (method) | — | Input argument: GetManifestBy3DWGS84PolygonRequestet Response: Manifest |
| GetManifestBy3DAGLPath | (method) | — | Input argument: GetManifestBy3DAGLPathRequest Response: Manifest |
| GetManifestBy3DWGS84Path | (method) | — | Input argument: GetManifestBy3DWGS84PathRequest Response: Manifest |
| Auth | (service) | — | Input argument: AuthRequest Response:AuthResponse This is the authorisation process request - a user sends an API key (provided by Spirent) to the CDN, and if successful, the CDN returns an authorisation token with expiry date. |
| GetManifestBy3DAGLPolygonRequest. request_time_range | spirent.pnta. GPSTime Range | — | Start and end time of user request (quadrilateral polygon with AGL height) in GPS time. |
| GetManifestBy3DAGLPolygonRequest. min_height_agl | | meters | Minimum AGL height of user-requested quadrilateral polygon. |
| GetManifestBy3DAGLPolygonRequest. max_height_agl | | meters | Maximum AGL height of user-requested quadrilateial polygon. |

| <containing message>.<qualified parameter name> | Datatype (Message or other) | Units | Notes |
|---|---|---|---|
| GetManifestBy3DAGLPolygonRequest.points | Point2D | — | A set of at least four 2D points (Lat/Lon) of user-requested polygon in WGS84. A closed polygon is expected (ie., by repeating the first entered point). |
| GetManifestBy3DWGS84PolygonRequest.request_time_range | spirent.pnta.GPSTimeRange | — | Start and end time of user request (quadrilateral polygon with WGS84 height) in GPS time. |
| GetManifestBy3DWGS84PolygonRequest.min_height_agl | | meters | Minimum WGS84 height of user-requested quadrilateral polygon. |
| GetManifestBy3DWGS84PolygonRequest.max_height_agl | | meters | Maximum WGS84 height of user-requested quadrilateral polygon. |
| GetManifestBy3DWGS84PolygonRequest.points | Point2D | — | A set of at least four 2D points (Lat/Lon) of user-requested polygon in WGS84. A closed polygon is expected (ie., by repeating the first entered point). |
| GetManifestBy3DAGLPathRequest.request_time_range | spirent.pnta.GPSTimeRange | — | Start and end time of user request (path with AGL height) in GPS time. |
| GetManifestBy3DAGLPathRequest.points | Point3DAGL | — | Set of repeated 3D points (Lat/Lon inWGS84, height in AGL) of user-requested path. At least onepoint is expected in the user request. |
| GetManifestBy3DWGS84PathRequest.request_time_range | spirent.pnta.GPSTimeRange | — | Start and end time of user request (path with WGS84 height) in GPS time. |
| GetManifestBy3DWGS84PathRequest.points | spirent.pnta.Point3DWGS84 | — | Set of repeated 2D points (Lat/Lon) of user-requested path in WGS84. At least one points is expected in the user request. |
| Manifest.items | ManifestItem | — | See explanation for ManifestItem datatype. |
| ManifestItem.url | string | — | The URL link containing the manifest item (Forecast Batch) underlying data stored in the CDN. |
| ManifestItem.manifest_item_metadata | spirent.pnta.Metadata | — | |
| ManifestItem.compression | Compression | — | See explanation for Compression enumeration list. |
| ManifestItem.file_size | int64 | bytes | Manifest item file size (accessed via provided ManifestItem.url link) |
| ManifestItem.file_hash | string | — | The ForecastBatch datafile hash, SHA-256 as hex. |
| Point2D.latitude | double | degrees | Latitude in decimal degrees relative to WGS84. |
| Point2D.longitude | double | degrees | Longitude in decimal degrees relative to WGS84. |
| Point3DAGL.position | Point 2D | — | Position in Lat/Lon inWGS84 of a user-requested path See explanations for Point2D and GetManifestBy3DAGLPathRequest messages. |
| Point3DAGL.height_agl | double | meters | AGL height of a user-requested path See explanation for GetManifestBy3DAGLPathRequest message. |
| AuthRequest.api_key | string | — | The authorisation user request API key, provided to the user by Spirent, or generated automatically by the user for a set of devices. |
| AuthResponse.auth_token | string | — | The returned authorisation token to the user by the CDN to enable (time-limited) access. |
| Compression | enum | — | Contains compression formats for the underlying manifest items, so the user knows which decompression method to select. |

Figures 3C, 3D:
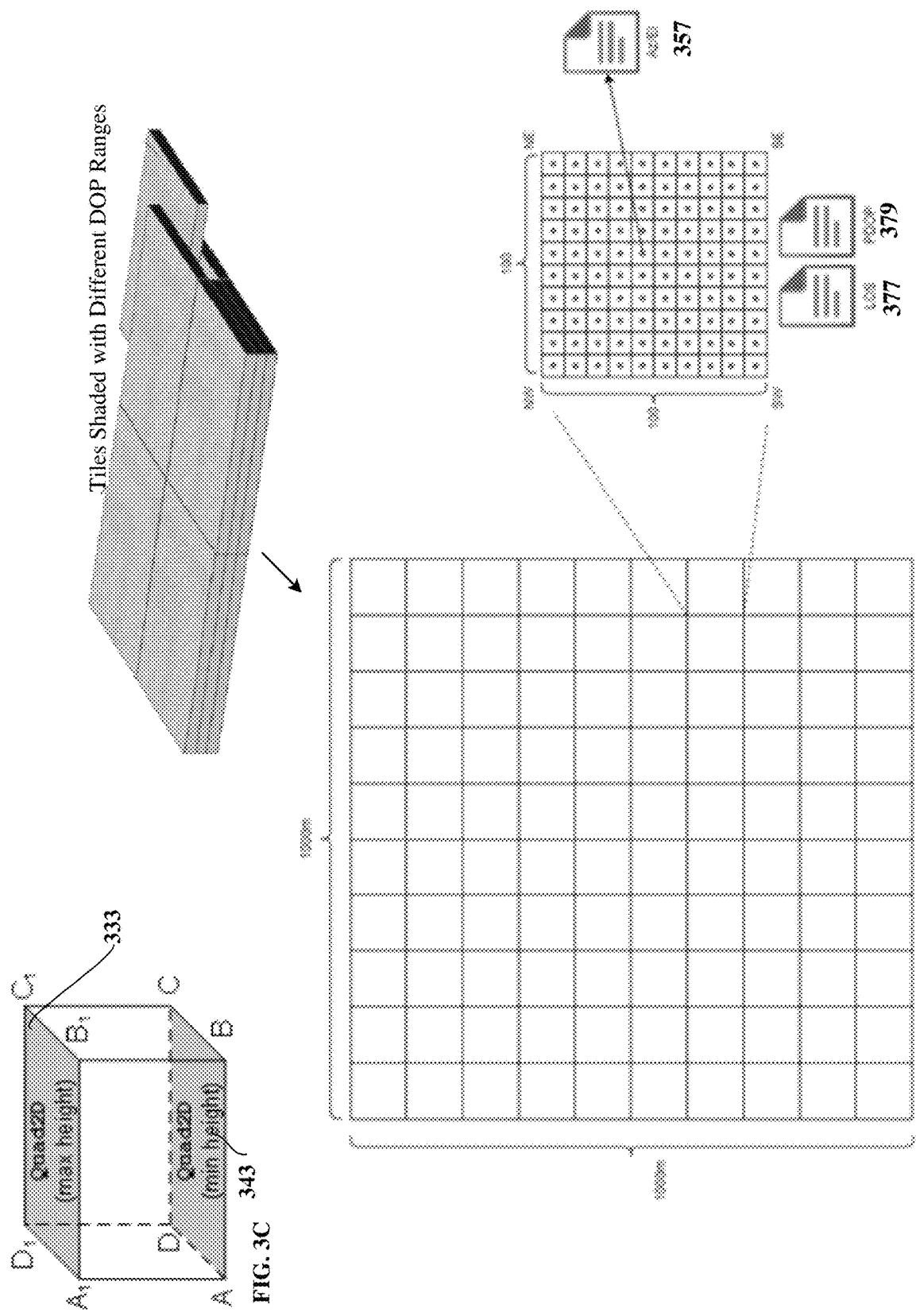
FIG. 3C shows an example bounding box, usable to facilitate the selection of Forecast Batch data that correspond to a particular user point/trajectory/area.
FIG. 3D shows a sketch of a stack of shaded tiles and an example 1 Km² output buffer of FES.

FIG. 3C shows an example bounding box. To facilitate the selection of Forecast Batch data that correspond to a particular user point/trajectory/area, each ForecastBatch.proto contains metadata information about the coordinates of the bounding box corner points. Each bounding box encapsulates the forecast observation points along with their respective validity volumes, and can be used to design spatial 3D queries to identify which ForecastBatch.proto data need to be returned to a user/device 348. The parameters in the ForecastBatch.proto for the definition of the eight corner points of a bounding box are the following: (a) Quad2D, (b) HeightAGLRange, for height representation in AGL, comprising a minimum and maximum AGL height in meters; and (c) HeightWGS84Range, for height representation in WGS84, comprising a minimum and maximum WGS84 height in meters. The top face 333 and the bottom face 343 of the bounding box have the same horizontal latitude and longitude coordinates, defined by Quad2D, and different AGL or WGS84 heights. The bounding box corner points' heights are provided in both AGL and WGS84, as different users may wish to request forecast data by entering heights relative to AGL or WGS84, depending on their specific application requirements. The bounding box corner points coordinates (both in AGL height or WGS84 height), using ForecastBatch.proto file parameters, are listed below.

| Point | (Latitude, Longitude) | AGL height | WGS84 height |
|---|---|---|---|
| A | Quad2D.sw_corner | HeightAGLRange.min_height_agl | HeightWGS84Range.min_height_wgs84 |
| B | Quad2D.se_corner | HeightAGLRange.min_height_agl | HeightWGS84Range.min_height_wgs84 |
| C | Quad2D.ne_corner | HeightAGLRange.min_height_agl | HeightWGS84Range.min_height_wgs84 |
| D | Quad2D.nw_corner | HeightAGLRange.min_height_agl | HeightWGS84Range.min_height_wgs84 |
| $A_1$ | Quad2D.sw_corner | HeightAGLRange.max_height_agl | HeightWGS84Range.max_height_wgs84 |

| Point | (Latitude, Longitude) | AGL height | WGS84 height |
|---|---|---|---|
| $B_1$ | Quad2D.se_corner | HeightAGLRange.max_height_agl | HeightWGS84Range.max_height_wgs84 |
| $C_1$ | Quad2D.ne_corner | HeightAGLRange.max_height_agl | HeightWGS84Range.max_height_wgs84 |
| $D_1$ | Quad2D.nw_corner | HeightAGLRange.max_height_agl | HeightWGS84Range.max_height_wgs84 |

A customer can request a forecast with a single point or a path, in one use case. User/device 348 can request forecast data for a single point or path over a given time period in GPS time, via GetManifestBy3DAGLPathRequest and GetManifestBy3DWGS84PathRequest gRPC calls. The customer can request the forecast data by inputting the path 3D coordinates using WGS84 latitude and longitude, with the height relative to WGS84 or AGL. DeviceAPI.proto includes two path request methods to accommodate both height specification options.

A customer can request a polygon, in another use case. User/device 348 can request forecast data within the volume of a parallelepiped for a given time-period, in GPS time via GetManifestBy3DAGLPolygonRequest and GetManifestBy3DWGS84PolygonRequest gRPC calls. DeviceAPI.proto includes two path request methods to accommodate both WGS84 and AGL height specification options for requesting a polygon. The user enters the horizontal latitude and longitude coordinates in WGS84 to define a polygon, and the min/max height, either in AGL or WGS84, for the requested forecast data. The API expects a closed polygon, so the user/device repeats the first entered point in the request. A user enters the horizontal coordinates of four points along with min/max heights, then the system combines this information to define the volume of an eight-point parallelepiped and return the forecast data within this volume. The upper corner points ($A_1$, $B_1$, $C_1$, $D_1$) represent the user polygon at the user-entered maximum height, and the lower corner points (A, B, C, D) represent the user polygon at the user-entered minimum height.

Due to the large data sizes for GNSS Forecasts, multiple resolutions are utilized. Three dimensions of data resolution are spatial for cuboid size, temporal for forecast period, and data detail/depth for DOP, SV LOS/NLOS, SV geometry, and number of constellations. In the disclosed GIS database, each DB entry contains metadata about the file, including coordinates, valid period and representation file IDs. Each representation file contains N number of forecasted cuboids/points with the data at high or low resolution. Representation files are stored directly from the GPU to CDN. In one example, for tile size of 50×50×1 meters, representation files include the following representations. (1). For informational representation, each file contains 50×50×1 meter. Cuboid is 50×50×1 with some info about the variability in the tile. (2) For low spatial resolution & low data resolution, each file contains 50×50×1 meter. Cuboid size 5×5×1 (aliased by GPU). DOP/SV info only. (3) For high spatial & low data resolution, each file contains 25×25×1 meter. Cuboid size 1×1×1. DOP/SV info only. (4) For high spatial & high data resolution, each file contains 25×25×1 meter. Cuboid size 1×1×1. DOP/SV/Geometry info. Additional representations can include multipath resolution level, and separating GPS from GNSS constellations, in other implementations.

The CDN stores collections of cuboids within tiles. The metadata of the tile can be stored in the DB while the data can be stored in one or more representation files containing multiple versions of the data for that area and time. Upon a user/device request for an area and time the CDN can search for the appropriate tiles in the database. A manifest file can be created and sent containing metadata for the area and time and the representation file(s) location(s)s for all of the appropriate tile(s). The device/user can then read the manifest file and download some or all representation data files from the CDN cache. Files may be compressed and may be decompressed for processing by the CDN or device/user.

Visualizations of GNSS Forecasts can be represented in tiles, with different shadings representing areas with clear sailing, partially impacted areas, and areas with blockages, respectively, in one example implementation. Tiles can be stacked in multiple layers to include height and time. Users can query an area, and receive manifest files that include tile pointers with information about the variability in the tile.

FIG. 3D shows a sketch of a stack of shaded tiles, and shows an example 1 $Km^2$ output buffer of FES 358, with the Azimuth/Elevation 357, LOS 377 and PDOP 379 data for each 100×100 m area. Each FES output file can contain a tiles worth of data for a 24-hour period, in one implementation with each LOS file estimated to be in the range of 50-60 MB in size. For a 1 $Km^2$ area at 1 m resolution for 24 hours the size is approximately 5 GB. For an example, scaled up to 6000 $Km^2$ the size is approximately 30 TB for a given 24 hour period and over 7 days, with 37 levels, the data size is approximately 7.8 PB. The size of forecast data files motivates the need for compression.

Compression of GNSS Forecast data can be segmented into three types of compression: spatial, temporal and mathematic compression. Disclosed compression-related parameters are described for the DeviceAPI.proto files above.

Spatial compression analyzes each cuboid or point in the GNSS point cloud based on location. Spatial compression analyzes the similarities and differences of the data of one cuboid to the cuboids around it, in a way that is similar to the way a video pixel is compressed based on the pixels around it (left, right, above, below, etc.). If the data in the adjacent or nearby cuboids is the same or similar, compression can be applied. A lossless compression searches for identical cuboids, encodes one fully with all the data, and then cuboids with the same data point to the reference cuboid with the full information. A lossy compression method applies a threshold to look for cuboids that have small differences relative to the reference cuboid, determines that the difference is not inconsequential to the user and points those cuboids to the reference cuboid. Another compression method changes the size of the cuboid to cover a larger area instead of using pointers. As an example, if a 1 meter cubed cuboid (1 m×1 m×1 m) has the same or similar data as three adjacent cuboids, the system can change the size of the cuboid to cover the total area with one data set. That is, the size of the cuboid would be changed to 3 m×1 m×1 m).

Temporal compression analyzes each cuboid or point in the GNSS point cloud based on location and time. Temporal compression analyzes the similarities and differences of the data of one (or more) cuboid(s) over time. If the data of one or more cuboids are the same or similar over multiple time periods, compression can be applied. Either lossless or lossy compression can be used. A lossless compression, for instance based on run length encoding, looks for cuboids that do not change over multiple time periods, encodes one fully with all the data and then cuboids with the same data point to the reference cuboid with the full information. A lossy compression method, with banding or quantization, applies a threshold to look for cuboids that have small differences to the reference cuboid, determines that the difference is not inconsequential to the user and point those cuboids to the reference cuboid's time period and data. Another compression method changes the valid time period of a cuboid to cover a longer time instead of using pointers. As an example, if a 1 meter cubed cuboid (1 m×1 m×1 m) valid for one second has the same or similar data to the same cuboids over the next 29 seconds, a single cuboid and data can be stored with a 29 second valid period instead of 1 second valid period.

Spatial and temporal compressions can be combined to compress based on the similarities and differences of cuboids over the forecasted area and time. For example, a cuboid in one location and time can be the same as another cuboid in a different location and time. These cuboids can be compressed as a reference to an original cuboid and how it moves over time, in a way similar to methods used in video compression.

Mathematic compression looks at patterns in the data with or without reference to temporal or spatial information. Similar patterns are mathematically compressed. Hashes compress similar data mathematically. For instance if there is a common combination of data such as satellite positions, visibility, DOP values, etc., these get hashed and compressed.

GNSS Forecast data flows from a cloud-based engine to GNSS CDN to a wireless carrier in one scenario. The data flows from GNSS CDN to USS/AV service in another scenario. In one example for data size analysis, GNSS Forecast engine service (FES) 358 generates approximately 4.1 PB raw data and transfers via Serial AT Attachment (SATA) at 400 Gbps to forecast storage approximately 1 PB primary data, transferrable to GNSS CDN 369, resulting in approximately 100 TB compressed data in a week. For a day's worth of data, at 400 Gbps that is 44.4 minutes. At 10 Gbps that is 29.6 hours. GNSS CDN 369 transfers data to wireless carrier at approximately 1 MB per KM, with bursts along the route. Similarly, GNSS CDN 369 transfers data to USS/AV service at approximately 10 MB compressed data per request. At one Gbps, transmission time per request is approximately one second.

API Use Cases

For various use cases, forecast engine service APIs cover multiple scenarios described next. In one scenario, a user does not know their route and they are not moving. In this situation, a large area gets searched. For aviation, the area may be 1 KM to 10 KM, at one or more altitudes, in one example. For vehicles, the area may be 5 KM to 30 KM, at a single altitude, and can be larger. A timeframe gets considered, such as 0 h-48 h into the future, a single start time, or a 2-hour time period. Forecast predictions include DOP and #sat (LOS, NLOS, NA) for determining the "good" areas. In some designs, the ability to zoom in and out is included as a service via the user interface. The goal is to determine an improved route based on navigation performance, leading to its use in a second scenario.

In a second scenario, the user knows their route and wants to know with high-fidelity, whether the route is assured, for route planning. For aviation, the user additionally needs to learn the positioning error of a UAS flight path/volume for planning or surveillance. Once the route is identified, the customer can download the complete route or can stream the route, for the identified time period. DOP and #sat (LOS, NLOS, NA) can be utilized to determine whether the route is good, for a navigation system, planning, and for USS. If the route is deemed to be not "good enough", the forecast engine can return to the approach described earlier for scenario one.

In a third scenario, the user does not know their route and they are moving. In this scenario, Forecast Engine Service 358 searches a small area ahead, in which the customer may navigate. In one example, less than 500 m, high fidelity, with no zoom in or out. The distance ahead to be considered describes the refresh rate, as does the frequency of the API request. For vehicles, the current road ahead and any roads that could be selected are also taken into account, in one example. For aviation, the user additionally needs a bubble around the UAS, and the use of DOP and #sat (LOS, NLOS, NA) to determine where the user can go and maintain their ODD, no-go areas, and fail-safe.

Figure 3E:
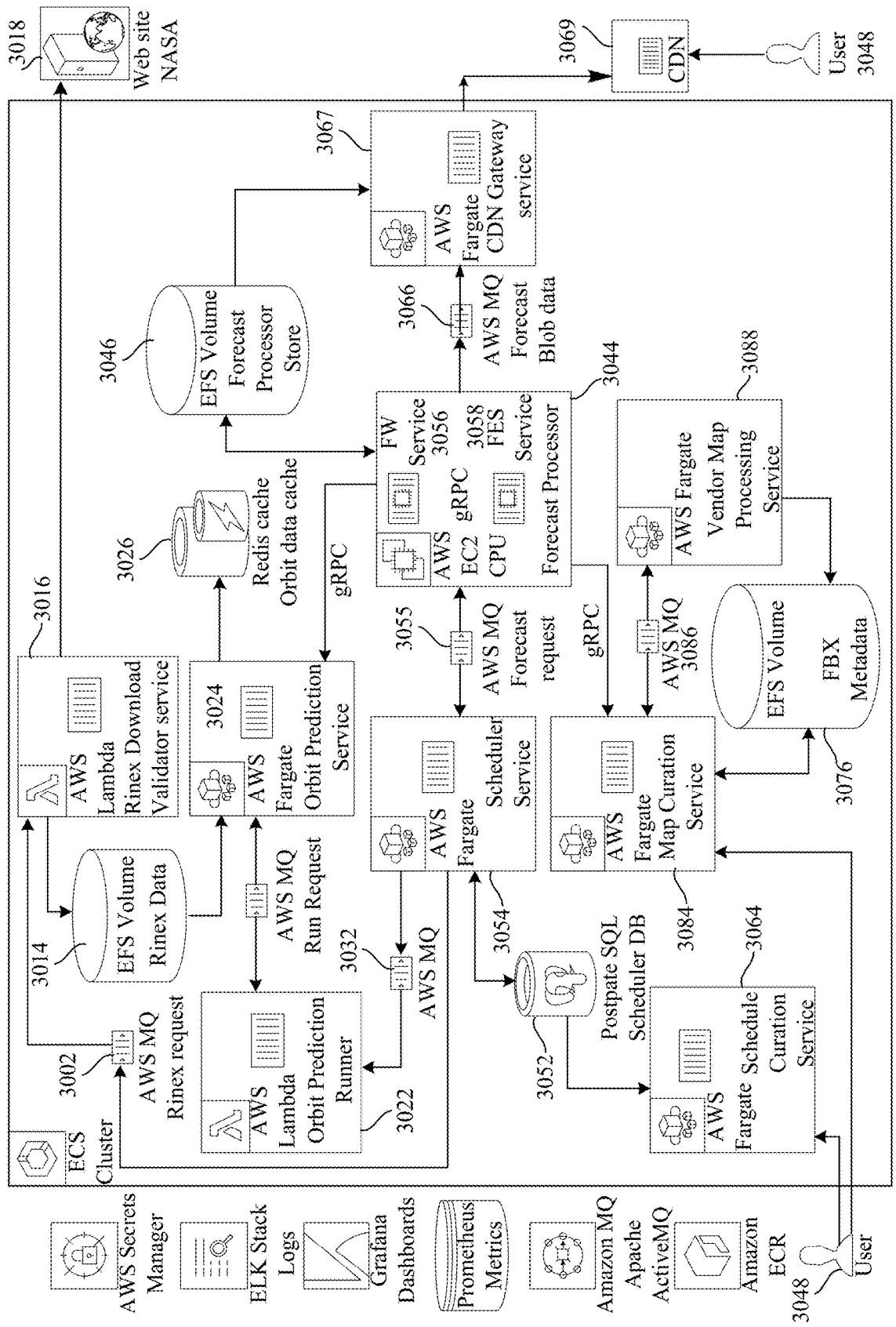
FIG. 3E illustrates an Amazon Web Services (AWS) Cloud implementation of the disclosed architecture, showing a detailed block diagram of the components and protocols of system architecture.

FIG. 3E illustrates an Amazon Web Services (AWS) Cloud implementation of the architecture, with hosted message broker service Amazon (AWS) MQ for ActiveMQ service deployed. FIG. 3E shows a detailed block diagram of the components and protocols of system architecture 300, chosen for the AWS cloud to reflect the architecture choices described relative to FIG. 3A. By default, the services are deployed in Fargate mode (AWS serverless compute engine), except for services dependent on GPU resources deployed on instance containers of type EC2/GPU.

The service APIs are described in the interface design language (IDL) Protocol Buffer Definition Language, and therefore communication is performed by the RPC gRPC protocol using the HTPP/2 transport. In addition to gRPC's request-response model, services will use a message broker for their asynchronous exchanges. The solution chosen is the hosted Amazon MQ for ActiveMQ service, which is compatible with Apache ActiveMQ, which can be deployed in on-premises infrastructure. Incoming requests in HTTP/2 are translated to HTTP/1.1 and therefore cannot reach gRPC endpoints, because support for gRPC is limited in AWS services. In one example, AWS Application Load Balancers do not fully support HTTP/2, but this limitation does not exist for inter-service calls inside the virtual private cloud (VPC). Cluster level and load balancer level gRPC health checks are supported.

Map curation service (MCS) 3084 sends requests for digital terrain model (DTM) and shape files to vendor map processing service (VMPS) 3088 via AWS MQ 3086. MCS 3084 allows upload of new vendor maps and initiates VMPS 3088 to convert them to FBX and associated metadata and store them in FBX meta store 3076 for retrieval by forecast engine services (FES) 3058. MCS 3084 can allow access to the maps that have been uploaded to it through gRPC interface, and allow for upload of vendor data pushed through VMPS 3088. VMPS 3088 accepts messages from VMPS message queue 3086, a pipeline that can process incoming vendor map data and produce FBX tiles along with the tiles' corresponding metadata, including VOP data.

Continuing the description of the block diagram, scheduler curation service 3064 can allow the user to curate which forecasts to run at which time. The curation can reside in PostgreSQL scheduler DB 3052 which can be used by scheduler service (SS) 3054 to push new forecast jobs via AWS MQ forecast request 3055.

An example ActiveMQ JSON message as published by the SS 3054 to FWS 3056 is listed next.

```
{
  "job_id": 1,
  "tile_id": 1,
  "start": 1272844800,
  "end": 1272844820,
  "time_resolution_s": 1,
  "level": 1,
  "elevation_cutoff_d": 0,
  "forecasts": {
    "los": 1,
    "azel": 1,
    "pdop": [
      "all",
      "gps",
      "gps+glonass"
    ],
  }
}
```

Scheduler service 3054 can also schedule the running of orbit prediction runner 3022 to cache a new 24-hour orbit in advance via AWS MQ 3032.

RINEX download validator service 3016 receives RINEX automatically downloaded from NASA web site 3018. The downloaded RINEX data is the daily full constellation published data for the GPS, GLONASS, Galileo and BeiDou constellations. Downloaded RINEX files can be stored in EFS volume RINEX data 3014 so that they are accessible by orbit prediction service (OPS) 3024. A verification process can be required after download. If the file fails to be verified another IGS station's RINEX data could be download and verified in its place. Note that IGS stations provide continuous tracking using high accuracy receivers and have data transmission facilities allowing for rapid data transmission to the data centers. OPS 3024 and CDNG service 3067 utilize in-memory caches. The AWS Cloud implementation can use either Memcached or Redis, which are both available as managed services in AWS.

Orbit prediction service (OPS) 3024 predicts forward locations of satellites and caches data in Redis orbit data cache 3026 and orbit prediction runner (OPR) 3022 caches a new 24-hour orbit in advance. Scheduler service 3054 can request orbit predictions via AWS MQ 3032. An example OPR message 3032 is listed next, as an ActiveMQ JSON message as published by the SS 3054 to the OPR 3022.

```
{
  "job_id": 1,
  "start": 1272844800,
  "end": 1272844820,
  "time_resolution_s": 1
}
```

A full 24-hour prediction for all constellations can be approximately 300 MB of protocol buffer data and take approximately twelve minutes to compute. OPR 3022 is a small ActiveMQ subscriber that listens for new jobs and then calls the gRPC interface to initiate an orbit prediction, in one implementation of the disclosed technology. OPS 3024 gRPC/protobufs format is listed below.

Further continuing the description of the AWS cloud implementation shown in FIG. 3E, forecast worker service (FWS) 3056 accepts a message from AWS MQ forecast request message queue 3055, initiates a forecast and then waits for the success or error response from forecast engine service (FES) 3058. Once the FES forecast is complete, FWS 3056 can check FWS message queue 3055 and if messages are queued, FWS 3056 can initiate another forecast with the new message data. FWS 3056 has a one-to-one mapping to FES 3058, gathering the data required by FES 3058 and interacting with the system.

Apache ActiveMQ supports large messages with type Blob, which contains metadata, including the message's location; large messages will be accessible via the EFS file system. CDN gateway (CDNG) 3067 receives messages via AWS MQ forecast blob data from forecast processor 3044. Each message represents a file to upload to CDN 369. CDNG 3067 can read the protocol buffer file from forecast processor service (FPS) 3044 and then call the CDN gRPC function to accept the file stream. AWS CloudWatch provides numerous metrics via Amazon MQ which is well integrated. The implementation of FES 3058 and FWS 3056 autoscaling groups is based on those metrics, such as a queue or topic size.

Forecast engine service (FES) 3058 can compute line of sight (LOS), azimuth and elevation and position dilution of precision (PDOP). LOS will be recorded for every satellite at every VOP. PDOP can be recorded for every VOP when the there is a change in LOS or every two minutes. Azimuth and elevation can be recorded on a forecast basis for every satellite when their values change. The term "temporal compression" describes this approach. To make it easier for a client to request data, the height element in their request is assumed to be zero for local ground level and then meters above that. The height used by FES 3058 is with reference to the WGS84 ellipsoid. Since local ground can vary from meter to meter a concept of "level" is required for grouping. The zero level is considered as ground and hence FES 3058 is required to indicate the level for which the current dataset is being generated.

AWS EFS storage service provides the storage volumes used by FES 3058, MCS 3084, Forecast Processor 3044, CDN Gateway service 3067 and the RINEX Download service 3016. AW EFS storage service allows file systems to be mounted in multiple regions, accessible to multiple instances at a time, with high TOPS and low latency. This approach to storage provides a common mechanism for the AWS cloud and on-premises infrastructures.

To monitor PNT-A services, the infrastructure will use the ELK stack, which refers to three open-source projects: Elasticsearch, Logstash, and Kibana. Often referred to as Elasticsearch, the ELK stack aggregates service logs, investigates logs, and creates dashboards and alerts for service and infrastructure monitoring. The AWS platform provides ELK stack through the AWS Elasticsearch Managed Service.

For metrics and custom service metrics aggregation and monitoring, the infrastructure uses the open-source Prometheus project. AWS provides Prometheus Metrics as a managed service. Prometheus collects the service containers' metrics in its time-series database and makes them available to the Grafana visualization application, with Prometheus and Grafana currently in use for Jenkins CI reporting.

Figure 4:
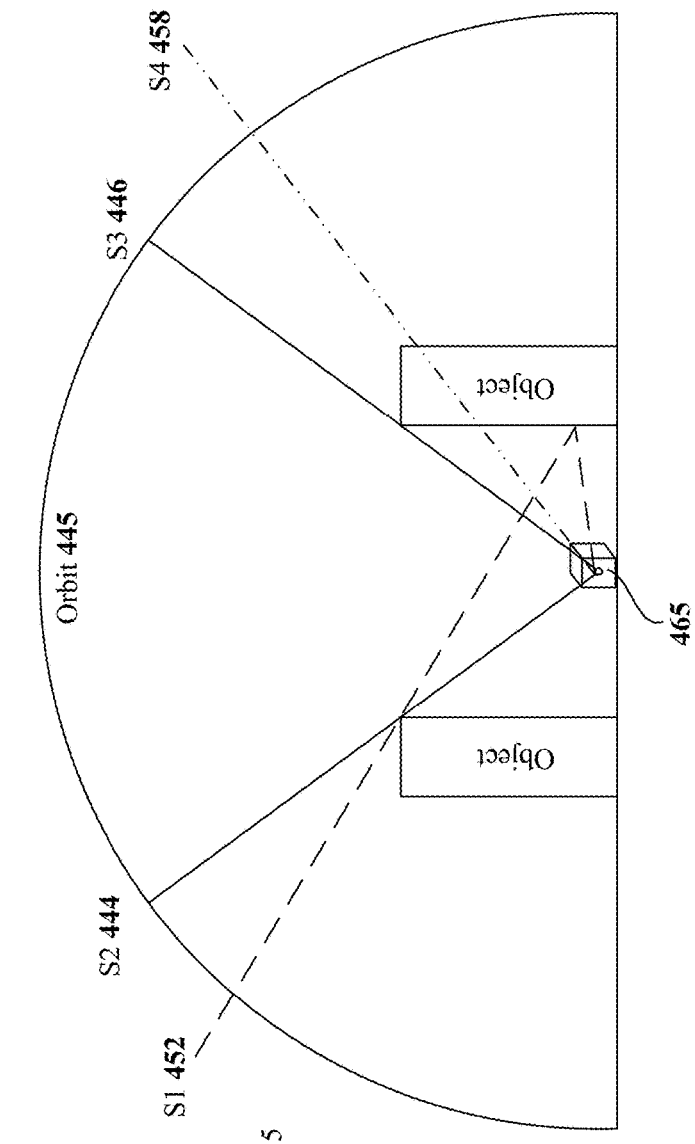
FIG. 4 shows an example 2D map orbit with GNSS satellites, and an example error calculation for a 2D point.

FIG. 4 illustrates a 2D map orbit with GNSS satellites, and an example error calculation for a 2D point. In a typical situation in an urban area, the reception of each satellite signal depends on the position of the receiver and the satellite with respect to each other. Satellites S2 444 and S3 446 are in line of sight (LOS) with 2D point 465. Satellite S4 458 is blocked and satellite S1 452 has non-line-of-sight (NLOS); that is, S1 452 utilizes multipath signals that reach the receiving antenna by two or more paths. Causes of multipath include atmospheric ducting, ionospheric reflection and refraction, and reflection from water bodies and terrestrial objects such as mountains and buildings. Positioning and navigation can be degraded in urban environments by multipath, and the error can increase considerably if not properly compensated. In situations where the line-of-sight (LOS) is obscured by surrounding buildings, the receiver may still be able to navigate by using the non-line-of-sight (NLOS) signal, which originates from single or multiple reflections/diffractions of the GNSS signal. The use of 3D models has been one of the preferred solutions to recreate the multipath environment as seen by a GNSS device. This solution brings the capability to generate a multipath signature that is representative of the position of the antenna in a specific time and space. For the given 2D point 365, a +/−3-meter error in the map data yields an error of 7.85 minutes in the determination of a GPS satellite being line-of-sight or not line of sight. Over a forecast period of 180 minutes this would provide a confidence interval of 96%.

Figure 5:
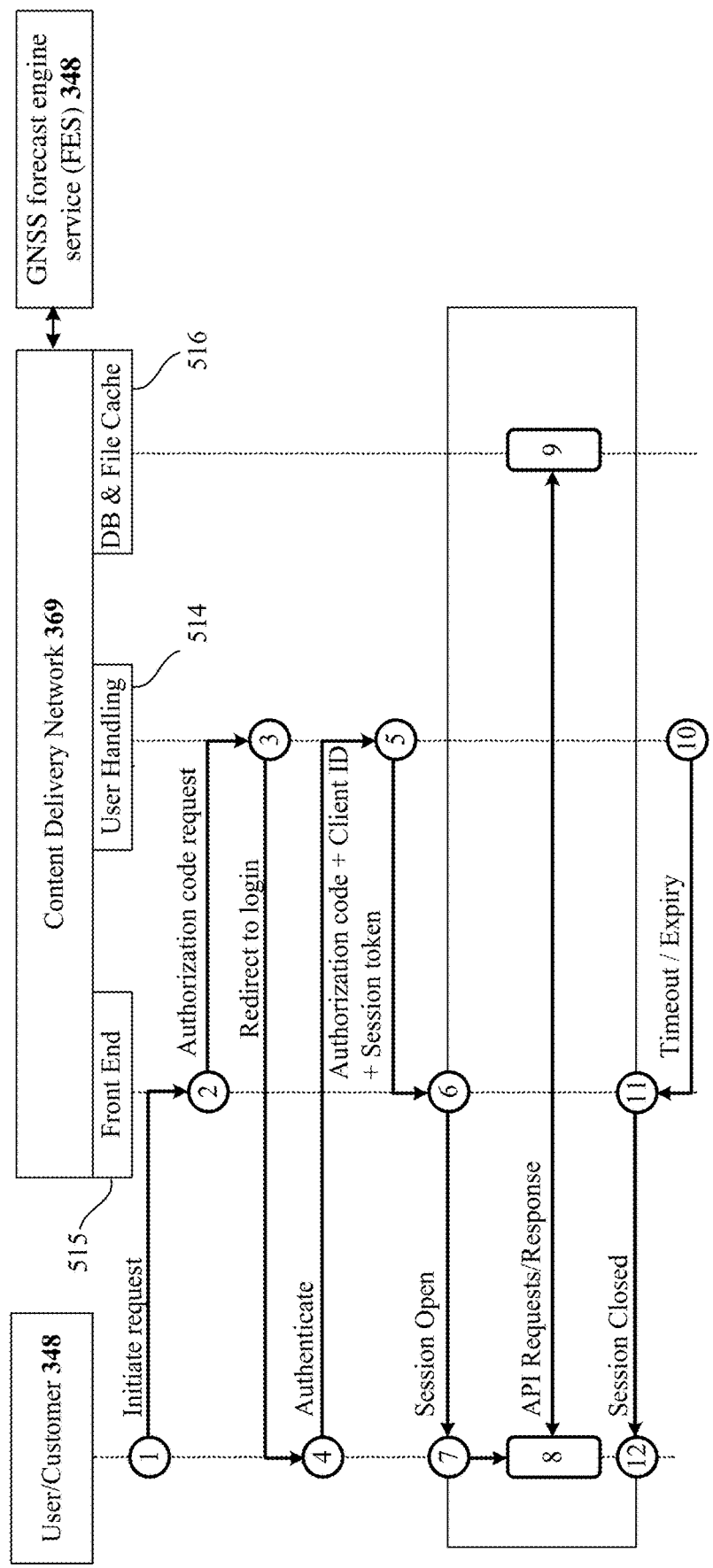
FIG. 5 shows message flow for session authentication between the user/customer 348, content delivery network (CDN) and GNSS Forecast engine service (FES) that provides forecasts to the CDN.

FIG. 5 shows message flow for session authentication between the user/customer 348, content delivery network (CDN) 369 and GNSS Forecast engine service (FES) 348 that provides forecasts to CDN 369. Devices use an auth API key for authentication and a set of API methods (device API) to download GNSS Forecast data for a particular space and time. Device API is utilized to process the request, selecting a set of cuboids from Spatial DB and providing links where these cuboids could be downloaded from CDN 369. Front end 512 delivers the user experience UX. User handling 514 handles requests for authorization for users. Once a session is open between customer 348 and CDN 369, DB and file cache 516 responds to API requests.

GNSS Forecast CDN 369 processes uploaded data in a queue in GNSS Forecast data processor, updates the metadata spatial database and replicates GNSS Forecast data based on cuboid position to appropriate CDN origin. After this occurs, the forecast data is available to devices for download. If a certain cuboid will be required, this will be delivered through the CDN Edge and cached there for later re-use.

Improving Receiver Performance

Figure 6A:
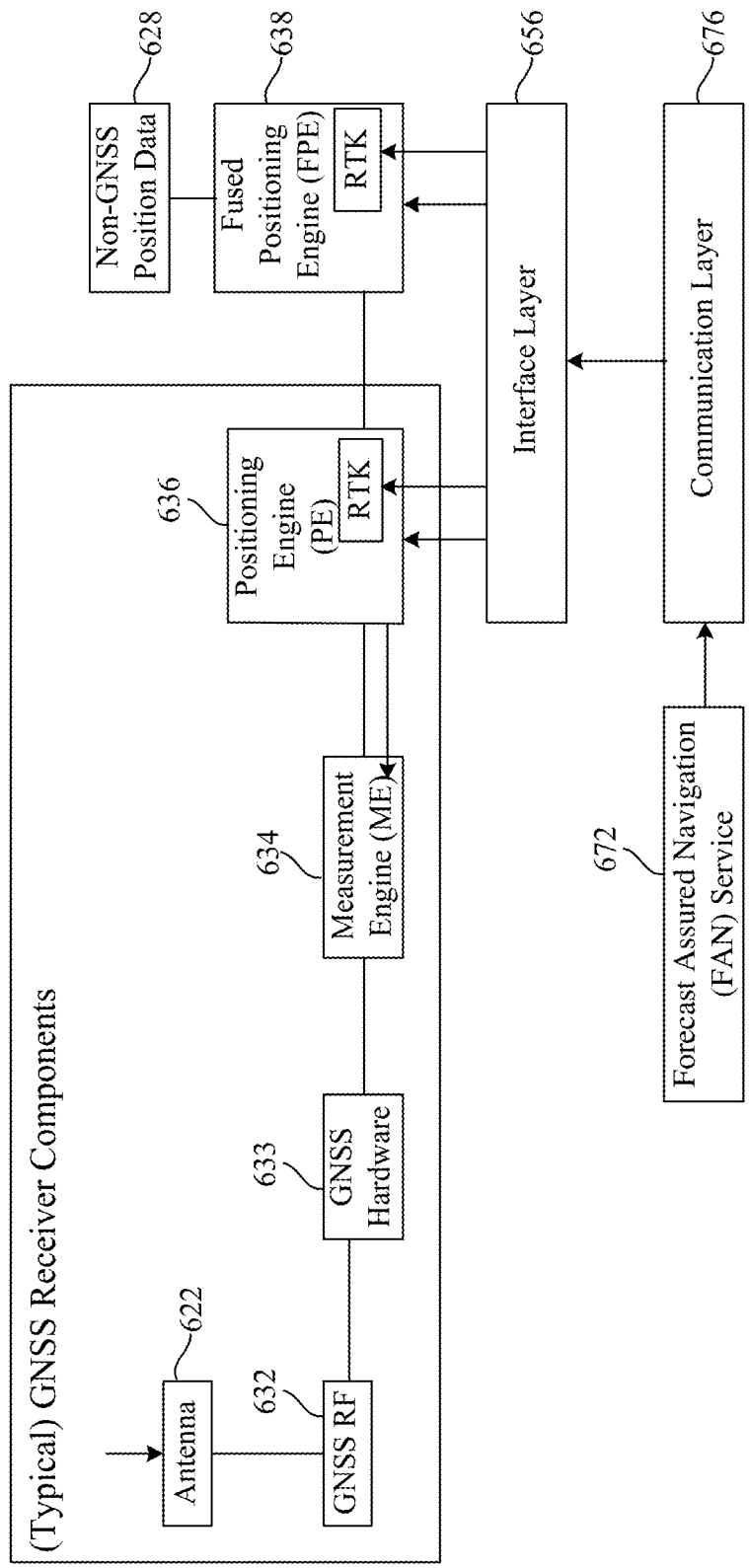
FIG. 6A shows the block diagram for a receiver, with the flow of data from the Forecast Assured Navigation (FAN) system to elements in the GNSS receiver.

FIG. 6A illustrates the block diagram for a receiver, showing the flow of data from Forecast Assured Navigation (FAN) to elements in the GNSS receiver. A typical GNSS receiver consists of a number of hardware and software components involved in reception, demodulation and decoding of satellite signals; and then the use of these to generate a positioning solution. Position, velocity and time, and additional items may be produced. Upon receipt of a GNSS Forecast, GNSS receiver searches for the IDs of visible satellite, acquires code delay and Doppler estimates, with rough alignment of code and carried, refines code and carrier alignment and completes pseudorange and data demodulation measurements. Typical GNSS receiver components for the disclosed technology include antenna 622, GNSS RF 632 and GNSS hardware 633 for receiving, acquiring and measuring GNSS signals. The direction of this is typically under control of the Measurement Engine (ME) 634 software. Positioning Engine (PE) 636 uses the data produced from ME 634 to compute the position of the device. Fused Positioning Engine (FPE) 638 may also use the measurement data from the ME 634, with non-GNSS position data 628 from other positioning services, to compute the position of the device, also referred to as a positioning solution. Antenna 622 captures GNSS signals and feeds them to GNSS RF 632, for use by GNSS hardware 633 for finding satellite signals and determining the satellite name and decoding the position of the satellite.

FAN service 672 passes the forecast from the FAN service via the communication layer 676, through the interface layer 656, directly to positioning engine (PE) 636 with RTK and fused positioning engine (FPE) 638 with RTK, in one implementation. The forecast includes the positions and augmentation services, enabling the determination of a precise position fix. The flow of the disclosed forecast data can be implemented differently way in a different embodiment. RTK systems use a ground-based reference station at a fixed, known location to process and transmit the error-corrected signal to a receiver in a moving vehicle. It is generally accurate to the centimeter level, and works in real time, but each reference station only has a range of 10-20 km.

In some cases, the disclosed GNSS Forecasts can be applied to improve GNSS positioning engine (PE) 636 performance. The PE 636 is the function that computes the position of the device. It receives GNSS signal measurements and satellite orbit data and may also receive other information, including the data generated by the prediction methods described in this document, and combines these to determine position. This procedure includes use of data and quality information provided by a Measurement Engine (ME) 634, as well as internally generated quality information, to determine how best to use and combine the available information, including satellite measurements. A GNSS PE 636 or receiver can use a GNSS Forecast to improve its performance, including integrity and reliability of the position solution, time to fix, positioning precision and also accuracy.

GNSS positioning engines and receivers are regularly determining what satellites to track and use as a part of their position and time calculations. With predicted information of the localized environmental impacts from buildings, vegetation, terrain and other sources of obstructions and multipath, the GNSS receiver can know in advance what GNSS satellites are better to use and hence improve the integrity and reliability of the position solution calculations. The GNSS Forecast data provides information on which satellites are visible—line of sight (LOS)—and which are not. Line of sight visibility is a good indicator of measurements that are likely to be less affected by signal multipath, or other errors and hence can be used in the PE 636 or FPE 638 with a greater weight than other satellites which are not line of sight.

For example, the GNSS PE 636 or FPE 638 may use the GNSS Forecast data as described next. The GNSS Forecast data is provided to the GNSS receiver PE 636 or FPE 638. Note that the FPE may be a different software entity outside the GNSS receiver, in which case the GNSS Forecast data may be provided to either, or both of the PE 636 and/or FPE 638. The GNSS Forecast data contains information on which satellites are line of sight and which are not line of sight, for a specified position and a specified time. At this point, the PE 636 and/or FPE 638 may determine to use this information to increase the confidence with which it uses the line of sight data, by comparison with the non-line of sight (NLOS) data. A typical method for this would be to adjust the relative weighting on the LOS versus NLOS measurements. This may be done by adjusting the individual satellite's estimated—a priori—standard deviation, or variance to reflect the difference between LOS and NLOS measurements. One method for this would be to increase (make larger) the standard deviation, or variance, of the NLOS measurements, and leave the standard deviation, or variance, of the LOS measurements at the value which had previously been determined by the GNSS PE 636 and/or FPE 638. It is also possible to perform the reverse—i.e. to decrease, or reduce the standard deviation, or variance, of the LOS measurements, but this has a potential to result in a position which may become heavily biased to the LOS measurements, which is not desirable.

The GNSS Forecast data may be provided for all satellites, based upon the environment in which the GNSS receiver is operating; or as information on individual satellite signals; or both. The use of GNSS Forecast will enable the receiver to apply "environmental multipliers" to measurement variances with increased confidence based upon the environment in which the GNSS receiver is operating; or as information on individual satellite signals; or both and provide a higher level of integrity in this aspect of the positioning process.

For example, the GNSS PE 636 and/or FPE 638 may use the GNSS Forecast data to adjust the standard deviation, or variance values of each satellite that is being measured, as described above. It may further use information in the GNSS Forecast for providing information on the local signal environment, or use the data provided to determine an estimate of the local signal environment, and apply a common effect to the standard deviation, or variance of all satellites. For example, the GNSS receiver may be operating in a dense urban environment, where the typical expectation is for worse GNSS signal reception, in which case the PE 636 or FPE 638 may apply a multiplier to all of the a priori standard deviations, or variances, to increase them all (make larger) by a factor which would reflect the worse signal environment, using the GNSS Forecast data to determine this. In a similar fashion, if the signal environment had been supplied as Rural, then it would be possible to use the multiplier to reduce (make smaller) the standard deviation, or variance values.

The GNSS Forecast will help the GNSS positioning engine 636 to improve its signal quality monitoring algorithms by providing information on which measurements are contaminated and how badly contaminated each measurement is. As described above, the environmental multiplier may be applied uniformly as a value to increase, or decrease the standard deviation, or variance on all satellites. The GNSS Forecast data is provided on a per satellite basis. It is therefore also possible to apply a multiplier on a per satellite basis, dependent upon data provided about this satellite signal at a specific location and a specified time. The multiplier may be a uniform one related to the set of LOS, versus the set of NLOS satellite observations, or it may differ on a per satellite basis, depending upon the level of signal contamination that is predicted for each satellite by the GNSS Forecast.

This information can then be used by the PE 636, for example to choose the most appropriate positioning algorithm to use; to de-weight or exclude measurements from the computation of the position solution to minimize the impact of multipath-induced errors in the position solution; and to improve the recovery from lead and lag events normally seen during dense urban driving. As described above, this can be performed by using the GNSS Forecast data to adjust the a priori signal standard deviation, or variance values. This adjustment to the relative weighting will then alter the position determination calculation, which can then improve the precision and accuracy of the resulting position, and hence improve performance in GNSS signal environments. The use of GNSS Forecast can also be used to improve the position solution integrity and reliability, by providing externally generated data to support decisions and calculations made by the GNSS receiver's PE 636.

In another case, the disclosed GNSS Forecasts can be applied to improve GNSS Measurement Engine (ME) 634 performance. A ME 634 is the function that interfaces with the GNSS receiver hardware 633 and performs a number of functions including: the search for, and acquisition of, satellite signals; the decoding of data transmitted by the satellites; tracking of multiple GNSS satellites and the generation of measurements from this data, including pseudorange (the estimated distance from the receiver to the satellite), Doppler frequency and carrier phase measurements and associated quality information such as signal level, or continuity of signal tracking. These data are supplied to the PE 636 and/or FPE 638, which use them in the position calculation. A GNSS ME 634 or receiver can use a GNSS Forecast to improve the performance (integrity and reliability of the position solution time to fix, positioning accuracy, etc.) as described above. GNSS ME 634 in a GNSS receiver is regularly determining what satellites to acquire, track and use as a part of their position and time calculations. With predicted impacts of the localized environmental (from buildings, vegetation, terrain and other sources of obstructions and multipath) the GNSS receiver's ME 634 will know in advance what GNSS satellites to use, how the satellite visibility will change depending upon the receiver's location and hence how to adjust their signal acquisition and tracking algorithms to make use of this information. Details of how this may be done are described next.

The GNSS Forecast data would help the GNSS ME 634 to improve its search strategy algorithm, its channel allocation and management algorithms to quickly acquire signals as they become visible or dismiss signals once they become obscured. The GNSS Forecast data provides information on each satellite's LOS, or NLOS status for a specific location and a specific time. This data may also be provided for another location and/or time, as requested by the GNSS receiver. Hence the GNSS ME can be provided with the GNSS Forecast information that will allow it to know where and when an individual satellite will be LOS, or NLOS. This information allows the ME 634 to do the following. (1) Reduce the time and frequency uncertainty on the LOS signals—or conversely increase the time and frequency uncertainty on the NLOS signals. This will allow the ME 634 to direct the GNSS receiver hardware on which satellites are available, and when, and the amount of resource to expend in acquiring them. (2) Adjust the amount of signal integration that is needed for an individual satellite—for example if the satellite is confirmed as NLOS, then it is likely that this is a lower signal strength and hence the signal integration time may be increased. (3) Note that, as the GNSS receiver PE 636 and/or FPE 638 may also know the route that the GNSS receiver is travelling, they can use the GNSS Forecast data to know in advance how to adjust the signal integration time to maintain signal reception—if the satellite signal transitions from LOS to NLOS, the signal integration time can be increased, whilst if the satellite signal transitions from NLOS to LOS, then the signal integration time can be reduced. This may also be required to avoid the potential for the signal to saturate, depending upon the magnitude of the change in signal level. This would improve the accuracy of the position solution especially in dense urban environments. The GNSS Forecast data would also be used to improve the robustness of the multipath indication algorithm by providing information on (a) which measurements are contaminated, and (b) how contaminated each measurement is. This can also be used to improve the position solution integrity and reliability, by providing externally generated data to support decisions and calculations made by the GNSS receiver's ME 634. The use of this data is described above.

In yet another case, the disclosed GNSS forecasts can be applied to improve GNSS Real-Time Kinematic (RTK) performance. RTK systems use a ground-based reference station at a fixed, known location to process and transmit the error-corrected signal to a receiver in a moving vehicle. The provision of GNSS forecast data can be used to improve the efficiency and reliability of ambiguity resolution, which is required to generate the highest precision GNSS carrier phase measurement-based positioning solution. With predicted impacts of the localized environmental (from buildings, vegetation, terrain, and other sources of obstructions and multipath) the RTK solution can know in advance what GNSS satellites to use and how the satellite visibility will change depending upon the receiver's location. This information can be used to aid in (1) detection of cycle slips, and (2) determine which satellite measurements are the most reliable, both for position calculation and also in the ambiguity resolution process, for example which should be used as primary satellites in an ambiguity resolution process. This can be used to improve the time to fix, accuracy, stability and integrity of the RTK positioning solution. For example, satellites which are forecast to be line of sight would be used in the first attempts to resolve integer ambiguities in an RTK solution—or to reduce the integer domain ambiguity search space, through application of techniques detailed above, related to the uncertainty of the observations, but now applied to the integer ambiguity, or phase measurement domain.

The disclosed GNSS Forecasts are also usable in a lab testing environment, also using the methods described above.

Figure 6B:
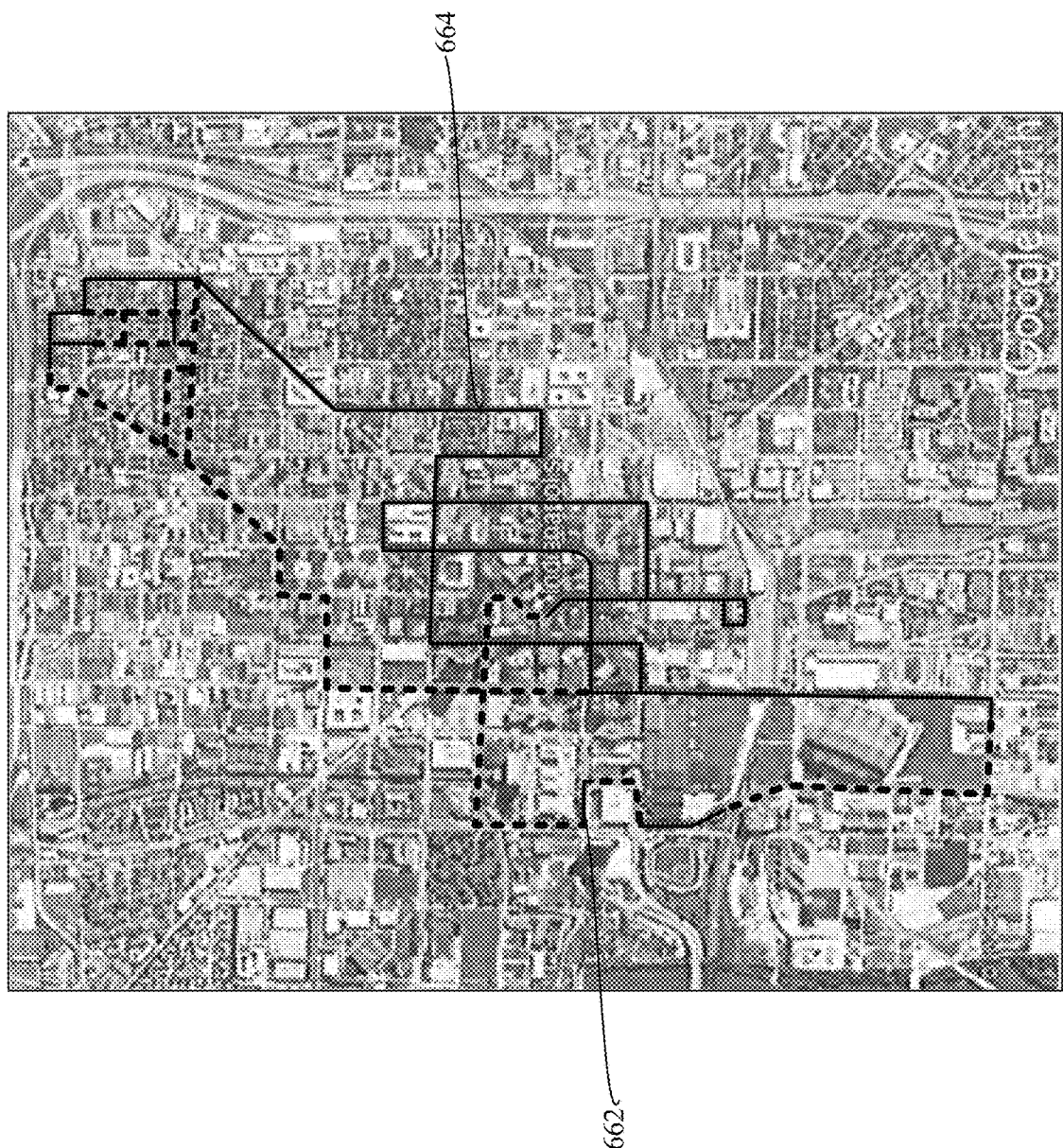
FIG. 6B illustrates an example result of utilizing the disclosed GNSS Forecast with RTK to improve performance.

FIG. 6B illustrates an example result of utilizing the disclosed GNSS Forecast with RTK to improve performance. The improved route is shown using a dotted line 662 as a more reliable path compared to the route shown using the solid lines 664.

A similar approach to that described above for PE position calculation, or RTK ambiguity resolution may also be applied to aid in Precise Point Positioning (PPP) time to converge the position solution.

Precise Time Synchronization of Distance-Separated Locations

The disclosed technology for GNSS Forecasts can improve time synchronization of distance-separated locations. One use of GNSS is to provide timing and synchronization to systems such as telecommunications networks. Unlike vehicles and consumer devices, these systems are typically at a fixed location and do not move. This makes it more straightforward for these systems to know where GNSS satellites are and the typical behavior, since the environment is mostly unchanging/static. However, when deploying a new system, a GNSS Forecast can aid in determining the best antenna placement. For existing installations, a GNSS Forecast can provide updates to changes in the environment like new buildings, signs, and other obstructions, which can be orders of magnitude larger, in terms of a comparison of the magnitude of the impact of these errors. It can also predict where multipath, and a resulting timing delay. may be present if the calculated position of the static object shifts unexpectedly due to a lack of sufficient line-of-sight satellites during a certain time of day or time period within a day.

The disclosed Forecast Assured Navigation (FAN) technology includes the methodology of testing multiple receivers and antennas as a function of location, altitude, and flight envelope. While testing of GNSS receivers/antennas in a simulated or lab environment has advanced greatly, when a component is being used in a life critical environment, such as flights carrying passengers or flights over people, it is advantageous to test the actual performance in a real-world scenario. A receiver that is being used on an Unmanned Aircraft (UA) faces unique challenges in that it is subject to altitude changes as well as acceleration, deceleration, velocity changes, turns, climbs, descents, rotations and vibration. The disclosed methodology allows a receiver under test to be evaluated under these real-world conditions. In one implementation, the disclosed technology includes the methodology of carrying multiple receivers on a purpose-built drone and being able to compare their performance to ground truth. This enables one to assure that the receiver/antenna will perform as expected when relied on for position, navigation and timing.

In yet another use case, the disclosed technology for GNSS Forecasts can be applied to GNSS receiver development. GNSS receiver developers can use GNSS Forecast to find locations that are challenging to GNSS operation. GNSS receiver developers could then test their receiver based on the real world or synthetic 3D environment of these locations. The use of the GNSS forecast data detailed above can be used to improve the GNSS performance by enabling adjustments to be made to the GNSS receiver ME 634, PE 636 and FPE 638 algorithms, for example the changes to the relative weighting, based upon changes to the individual satellites' standard deviation, or variance values.

Improving Sensor Function & Cellular Station Location and Antenna Placement

In yet another case, GNSS Forecasts can be applied to improve sensor function. In Automotive applications, the GNSS sensor is often assigned the lowest priority within the positioning engine and primarily used to sanity-check the solution for absolute position. This is true for both lane level positioning applications and navigation applications. Due to the effects of multipath acting on an unknown number of the GNSS signals received, its position accuracy and integrity can be negatively affected. GNSS Forecasts can aid the GNSS engine in predicting which GNSS signals are line of sight and which are affected by multipath, therefore allowing to receiver to lessen its error bounds and increase its integrity. As a result, the positioning engine (PE) 638 can know when it can assign GNSS a higher priority to improve overall absolute positioning accuracy.

Another use case example includes applying the disclosed GNSS Forecast technology to determine cellular base station locations and configurations. One of the most critical parts of wireless communication networks is the time and synchronization of the network and devices to ensure proper transmission and handoff between base stations. One of the most common methods of achieving synchronization and timing is the use of GPS/GNSS at the cellular base station. Hence choosing the best location for a cellular base station and configuration includes ensuring good GPS/GNSS coverage and antenna placement. The disclosed GNSS Forecast can be used to help choose the cellular base station location and antenna placement.

Jamming or Spoofing of GNSS Signals

Disclosed GNSS Forecasts can be applied to identify spoofing attempts, to determine jamming or spoofing of GNSS signals, to improve GNSS integrity and to improve anti spoofing. A comparison of measurements against predicted signal availability, often for multiple satellites and constellations, can improve interference and spoofing detection and mitigation. An obscured satellite, even if received via multiple order multipath, will typically have a lower signal strength. A satellite signal received at normal or just below expected strength, when the satellite is known to be obscured, is an indicator of spoofing. The assumption is that the spoof checking is an integral real-time constant check, instead of a one-off activity. Note, that if the receiver is already in a spoofed position, and the spoofer happens to also use the disclosed Forecast Assured Navigation service or has a similar mechanism to provide only line of sight satellite signals, this can aid the spoofer. Starting from a known trusted (correct) location, the receiver constantly corrects its navigation position using additional aids, and enhanced with the disclosed GNSS Forecast, to assure that spoofing is not happening.

In one implementation, a disclosed method of determining jamming or spoofing of GNSS signals includes receiving a GNSS Forecast and covering a time and location of present operation of a vehicle, including a reliability measure for respective GNSS signals received from a plurality of satellites at the location. The disclosed method also includes comparing received GNSS signals received from the plurality of satellites to the GNSS Forecast, and rejecting outliers detected by the comparing and rejecting the GNSS signals from the satellites as jammed or spoofed. In one example, a received signal with a strength level significantly higher than expected may indicate that the signal is from a satellite source that is likely to be a spoofing source. Additionally, a signal may be rejected because the satellite is known to be obscured from the GNSS receiver and therefore must be a false signal.

Autonomous Ground-Based Vehicles

The disclosed technology for Forecast Assured Navigation (FAN) generate GNSS Forecasts for navigation. GNSS Forecasts provide a predicted GNSS availability and performance for an area and time, which is usable in advance or in real-time for any vehicle or system using GNSS. As setup, the positioning requirement for the drive can be selected. Before a planned journey and/or in real time, a vehicle sends its location and intended routing request to the cloud service. The service provides a GNSS heat map, also referred to as a Point Cloud, which is then used to determine the quality of GNSS coverage along the route and nearby areas. For example, a vehicle may need a specific level of GNSS performance to have safe automated lane control. The vehicle may use a GNSS Forecast to determine if the vehicle will have adequate GNSS signals on the road ahead. If so, the vehicle will be able to continue operation and lane level control. Alternatively, if GNSS is forecasted to not be adequate, the vehicle may change its automation mode, rely on other sensors, return control to the driver or trigger return of control to the human.

Level 2 to Level 5 Autonomous Vehicle Operation requires knowledge of the vehicle's Precise Position. In Lane Level Accurate Positioning, the accuracy requirement is commonly defined as 0.3 Meters Horizontal Position and having 99.99% certainty in that Position. It is Mission Critical that the vehicle's Positioning Engine retains that level of accuracy throughout its journey. In one example, if a DOP is 2.0 is required for lane level accuracy of 0.5 m, FAN can predict where and when the required DOP will be available to safely utilize the desired autonomous driving (AD) features.

In one example use case, an autonomous ground-based vehicle is traveling and wants to know the expected GNSS signals on its route of travel. The vehicle connects to a cloud service to request the GNSS signal predictions along its route. The cloud service processes the request from its distributed architecture to get the appropriate forecast information for the vehicle and transmits it to the vehicle. The cloud architecture interfaces with a GNSS Forecast engine service that gathers satellite data, environmental data, and maps to process with various algorithms to provide a prediction and then publishes the prediction on a cloud architecture.

The disclosed GNSS Forecast can also be used to improve fleet management. Fleet management commonly uses GNSS as the primary sensor for location tracking. In an urban environment, real-time metrics, and guidance such as estimated arrival time and taking the most fuel-efficient route are adversely affected if the vehicle is placed in the incorrect lane or side of the intersection. GNSS Forecasts can allow the tracking algorithm to prioritize high confidence GNSS locations and reject low confidence results to improve overall vehicle tracking accuracy, and can also use this information to alert the driver to double check their guidance and follow local road signs if a low confidence area is ahead. Similarly, asset tracking for shipping containers, construction equipment, rail cars, and other expensive assets that are large enough to justify GNSS tracking rather than just RFID. GPS is used to track assets in transit. Reliability of the signals through use of the disclosed GNSS Forecasts can enable the identification of areas of concern, due to poor GPS performance, such as knowing where cargo containers need to be placed in a cargo port.

Path Planning

The disclosed technology for GNSS Forecasts can be applied to path planning for ground-based vehicles, in another use case. Autonomous and automated vehicles use a variety of sensors to determine the relative position of the vehicle to its surroundings, sometimes called localization. GNSS is typically the primary method of determining absolute position and time with respect to the surface of the earth, or geodesic reference, and time (Universal Coordinated Time (UTC)). The reliance of the vehicle on GNSS makes it very important or critical to the operation of the vehicle. GNSS Receiver performance can be enhanced using RTK (RTK, PPP, & RTK+PPP), WAAS, SBAS, GBAS, and RAIM technologies and services. While these techniques improve the performance of GNSS, none of them provide geospatial awareness information about the localized environmental impacts on the GNSS signals from buildings, vegetation, terrain, and other sources of obstructions and multipath.

Using a GNSS Forecast, a vehicle can plan its path/route to ensure that it has the best GNSS signals available and know where and when its performance will be impacted. The system can make trade-offs between GNSS performance and other sensors and system that can augment or bridge gaps in GNSS coverage. The system can make trade-offs between driving modes; for example, the system can use a GNSS Forecast to determine a path that has the highest utilization of autonomous or automated vehicle operation versus fastest route, shortest route, or economic route. This is not limited to on-road vehicles like cars and trucks. This can be used in mining to determine where best to operate machinery based on GNSS Forecast and the time of day. In one example, mining on one part of the mine where signals are good at 9 am versus another part of the mine at 10 pm. The GNSS Forecast can also be used to determine the impact of the change in the environment due to blasting/mining.

GNSS environments for any vehicle at ground level or low altitudes are highly dynamic. Traversing complex GNSS environments only minutes ahead or behind the planned time of travel can have a major impact on the GNSS performance. A vehicle traversing through an intersection in a dense urban environment ten minutes earlier can result in 'okay' or safe GNSS signals rather than poor signals.

Aviation Use Cases

In one aviation use case, a drone flying needs to know the expected GNSS signals on its route of travel, or area of operation, for safe navigation. This is especially important for Beyond Line of Sight of the pilot (BLOS), including package delivery or inspection. In order to determine if safe navigation using GNSS is possible, a prediction of the signal strength can be used to determine the best flight path (including altitudes), take-off and landing areas, areas to hover or loiter, risk-ratio of the flight, if areas of poor GNSS can be traversed using mitigation techniques and for how long. In some cases a drone may use certified avionics, like those certified using Federal Aviation Administration (FAA) Technical Standard Order (TSO)-C199 for Traffic Awareness Beacon System (TABS). The certification requires the system to achieve specific levels of positioning performance, like section A1.2.6.3 requires 30 meters horizontal position error with a HDOP of 2.5 or less. The disclosed GNSS Forecast solution can be used to determine if the flight path or area in which a drone is going to be flown in the future will have the required DOP, resulting position accuracy, and compliance in operation. Similar positioning requirements exist within FAA remote identification rules.

In order to access a GNSS prediction or forecast, the drone, flight planning software, ground control software, Unmanned Service Supplier (USS), or Unmanned Traffic Management (UTM) system connects to a cloud service to request the GNSS signal predictions along the intended route, area or operation, or an area where a route needs to be determined. The cloud service processes the request from its distributed architecture to get the appropriate forecast information for the drone and supporting systems, and transmits it to the drone and supporting systems. The cloud architecture interfaces with a GNSS Forecast Engine that gathers satellite data, environmental data, and maps to process with various algorithms to provide a prediction and then publishes the prediction on a cloud architecture. The drone is then able to determine the GNSS signal quality along its route and determine if the route can be flown safely.

In another aviation use case, GNSS Forecasts can be applied to flight planning and operation. GNSS is typically the primary or only way for aircraft to determine their global position. In order for the aircraft to navigate, an aircraft may use GNSS to comply to performance-based navigation requirements, report its position using Remote ID or ADS-B, communicate position as a part of air traffic control or unmanned traffic management, detect and avoid other aircraft, avoid obstacles, take-off, land, and even have stable flight. Therefore, it is critical for aircraft to predict the performance of GNSS when planning for a flight and use the same information in flight when making real-time decisions. For manned aircraft, Wide Area Augmentation System (WAAS) and RAIM (Receiver Autonomous Integrity Monitoring) can be used for many of these needs, but that assumes the GNSS receiver has an unobstructed view of the sky with no impacts of single obscuration or multipath. Moreover, these techniques may not meet the accuracy needed for an Unmanned Aerial System (UAS) or Urban Advanced Air Mobility (AAM) system or be geographically specific enough. Moreover, while these techniques improve the performance of GNSS, none of them provide information about the localized environmental impacts on the GNSS signals from buildings, vegetation, terrain, and other sources of obstructions and multipath.

Unmanned Traffic Management (UTM), including the Unmanned Service Supplier, can use the disclosed GNSS Forecast as a part of determining a route, the drone's total system error, performance monitoring of flights, how it allocates airspace, route authentication and route surveillance. UTM can also use the forecast in real-time to monitor the performance of its navigation system and use the forecast for any real-time changes in flight paths. For example, if a change of flight path is made, the UTM could ensure it does not fly into an area that would degrade its ability to fly.

The disclosed GNSS Forecast can also be provided as a Supplemental Data Service Provider (SDSP) as a part of an UTM.

The disclosed GNSS Forecast can also be used to determine the navigation capabilities and requirements of the airspace. For example, a GNSS Forecast can be used to dynamically create geofenced areas and ensure their enforceability. A GNSS Forecast can be determined to determine what type of RNAV/RNP requirements are applicable for a flight. A GNSS Forecast can be used to create static or dynamic flight corridors.

The disclosed GNSS Forecast can be used to select locations for, flight paths to/from, and certify vertiports for electric vertical takeoff and landing (eVTOL) and Advanced Air Mobility aircraft/services.

The disclosed GNSS Forecast can be used to determine areas of consistently high or low risk over long time periods. For example, a GNSS Forecast could be done over a month-long period to determine areas where GNSS signals are available 99.9999% of the time. These areas could be classified as low risk for flights. Whereas areas that do not meet those criteria could be classified as dynamic, high risk, and therefore either flights are not allowed in those areas, or a discreet forecast is needed for the exact time and location of the flight to determine GNSS performance.

The disclosed Forecast Assured Navigation (FAN) technology also includes the methodology of collecting and recording for playback network connectivity as a function of location, altitude and flight envelope, via a GNSS signal record and playback system such as Spirent GSS6400 product. Network Connectivity is the primary or only way for Unmanned Aircraft (UA) or Unmanned Aircraft System (UAS) to report their global position. In order for the UA to navigate, comply to performance-based navigation requirements, report its position (using Remote ID or ADS-B), communicating position as a part of air traffic control or unmanned traffic management, correctly gather data, deliver packages, avoid other aircraft, avoid obstacles, take-off, land, and even have stable flight. An aircraft may use Network Connectivity to communicate to USS (UAS Service Supplier), UTM (UAS Traffic Management), and Operator and also be used for command and control (C2) especially when operated BVLOS (Beyond Visual Line of Sight). Therefore, it is critical for aircraft to know in advance the performance of Network Connectivity when planning for a flight. For terrestrial vehicles, the cell tower antennas are designed to ensure adequate ground coverage. This is not the case as a UAS gains altitude and may be operating off of a side lobe, resulting in over-propagation and having many more interference effects.

An aircraft mission/flight planning system can use a Network Connectivity Record and Playback application to ensure that adequate connectivity is available for a flight, type of operation, type of airspace, and type of aircraft. Moreover, an UAS Traffic Management (UTM) system can use a Network Connectivity Record and Playback as a part of determining total system error and performance monitoring of flights and how it allocates routes and airspace. When a flight path is made the UAS could ensure it does not fly into an area that would degrade its ability to fly, perform, or meet the requirements of the airspace. Network Connectivity Record and Playback can also be used to dynamically create geofenced areas and ensure their enforceability.

In one case, technology for record and playback network connectivity can be used for part 135 certification. Another use case includes the application of record and playback network connectivity for UA route approval. A third case includes the application of record and playback network connectivity for UA type certification. Another case utilizes the application of record and playback network connectivity for vertiport certification. Yet another case includes the application of record and playback network connectivity for remote ID certification. Also included are the disclosed application of record and playback network connectivity for receiver/antenna selection, and the application of record and playback network connectivity for forecasting model validation.

Broadband Service Coverage Over Time

For visualizing broadband service coverage over time, one implementation of a disclosed method includes providing for display an interface that accepts input, and receiving the input specifying a point location for a broadband service antenna and visualization parameters, including a time range to depict. The method also includes accessing a 3D map of an area in an urban environment surrounding the location, including structure solids that obscure lines of sight from the location, and computing requested visualization over time, including ray casting or tracing between point location and satellites over the time range. Also included is initializing a 3D map visualization, overlaying the point location on the 3D map for a selected time and overlaying first and second rays from the point location towards at least some satellites overhead at the selected time, visually encoding the first rays with a first code to indicate a clear line of sight and overlay the encoded first rays on the 3D map, and visually encoding the second rays with a second code to indicate a blocked line of sight, showing at least a segment from the point location to a face of a blocking solid that blocks a line of sight. The disclosed method further includes combining the 3D map visualization with a playback animation control for the time range, including a current time represented by the overlaid first and second rays and third segments, overlaying the playback animation control with an indication of line of sight visibility at the point location over the time range, and providing for display the 3D map visualization combined with the playback animation control, including the overlaid first and second rays and third segments and the overlaid indication of line of sight visibility. The received input specifies satellite constellation(s) to depict. The method includes ray casting or tracing between additional locations, along a surface of a structure on which the broadband service antenna is mounted, and overlaying third segments along the surface of the structure and visually encoding the third segments with a third code to indicate lines of sight availability along the additional locations on the third segments. The method can include showing the segment extending a second ray skyward from a far side of the blocking solid. In some cases, the method also includes ray casting or tracing between additional locations, on at least part of a face of a structure on which the broadband service antenna is mounted, and overlaying visual encoding of the face of the structure with a third code to indicate lines of sight availability along the additional locations on the face.

Visualizations that illustrate route planning and evaluation examples that utilize DOP forecasts for GNSS navigation are described next.

Visualizations

As an alternative to distributing forecast data to and via the content delivery network (CDN) service 158, the data can be used to render disclosed visualizations of the forecast. GNSS signals change in urban environments, as is viewable via a map, by altitude and over time. Users can search for a route with "good" GNSS coverage, using the disclosed GNSS Forecasts described herein. Users can visualize GNSS performance around a known route and adjust if needed.

Figure 7A:
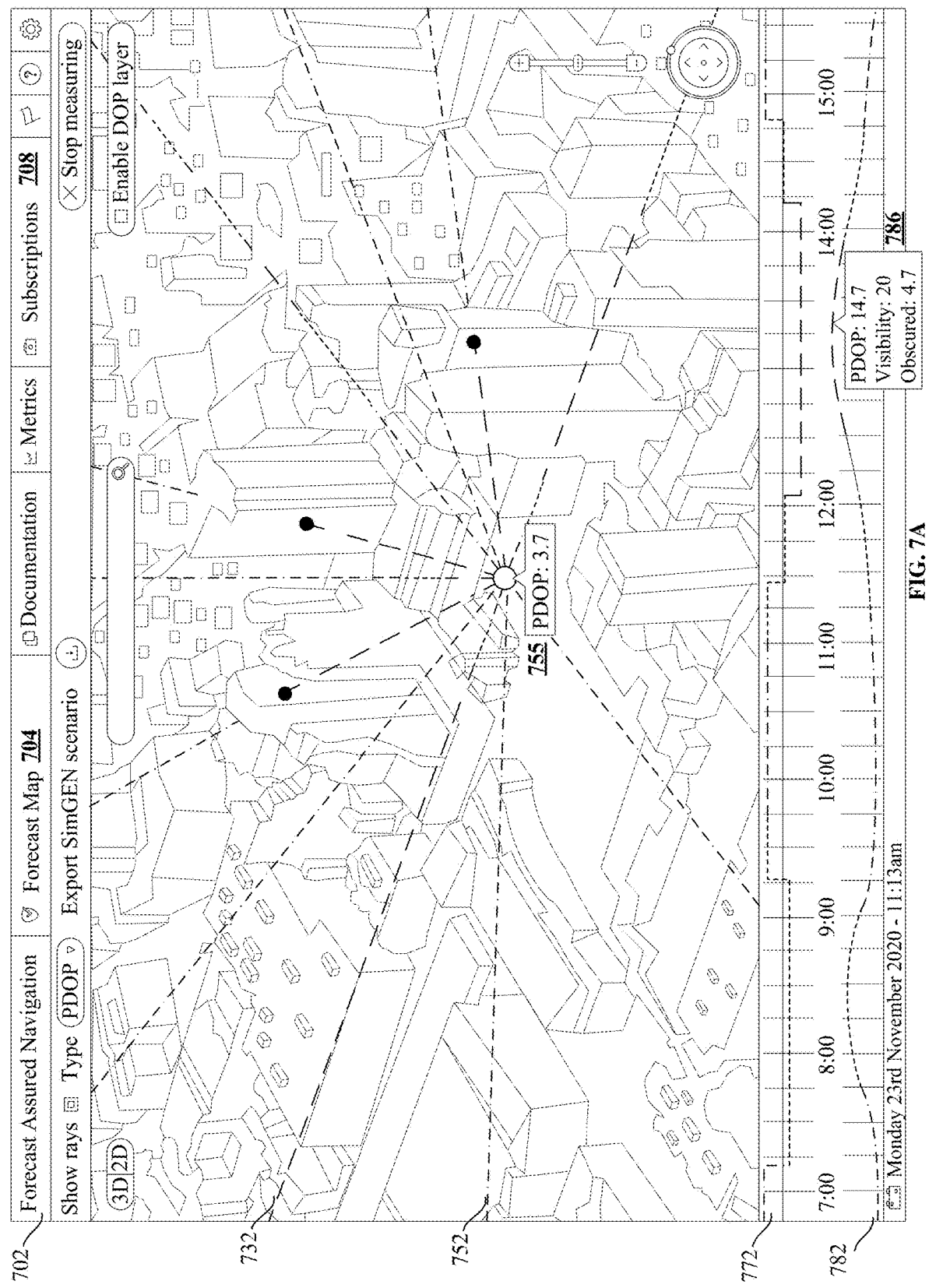
FIG. 7A illustrates one example of the disclosed Forecast Assured Navigation (FAN) user interface.

FIG. 7A illustrates one example of the disclosed Forecast Assured Navigation (FAN) user interface (UI). A browser-based UI operator's view of the system is driven by the FAN data retrieved from the scheduler curation service 364, map curation service (MCS) 384 and logging and event service (LES) 372. FAN UI 702 shows a snapshot in time that illustrates where buildings occlude line of sight, via the lines that shift from an alternating dot and dash pattern that shows LOS to long dashed lines that show NLOS, with PDOP 3.7 at the receiver 755. LOS satellite signals are depicted with an alternating dot and dash pattern 752 and NLOS satellite signals are depicted using long dashes 732. A signal coming from a satellite in the sky is depicted as LOS before the signal encounters a building that blocks the signal. The UI displays the shift to NLOS long dashes pattern between the building and the receiver 755, as shown in FIG. 7A. The disclosed FAN user interface 702 also depicts a count of satellites that are visible over time. Satellite count 772 is graphed over time with the alternating dot and dash pattern for higher counts of satellites visible, and with the long dash pattern to illustrate fewer visible satellites at other times along the timeline. FAN user interface 702 further depicts a graph of DOP changes over time 782 for the receiver, via the disclosed timeline visualization shown near the bottom of the UI. A point in time can also be selected to view the PDOP, visibility and obscuration 786. Higher PDOP values are depicted with an alternating dot and dash pattern and lower PDOP values are depicted using long dashes, in this example implementation. The disclosed FAN UI can utilize a variety of graphs and patterns in another implementation. For example, forecast maps 704 and forecast subscriptions 708 can be accessed via UI 702.

Users can access the forecast data via a visualization in a UX, and can change perspective, using rotate, pan and zoom features. A PDOP 2D layer displays the heatmap at a given altitude as a heatmap slice and users can utilize a slider on the UX to move the layer up and down in altitude. Additionally disclosed, users can view the data in 3D space using a PDOP 3D heat cloud that shows the heatmap in 3D, and the timeline can display the PDOP changing over time and illustrate how time impacts the heatmap.

In addition to PDOP, geometrical DOP, horizontal DOP, vertical DOP and time DOP can be computed and displayed in the forecast data, via the FAN UI. These values can be computed for a combination of satellite navigation systems, i.e., as a "multi-GNSS DOP", which refers to the combination of more than one satellite system. The values can alternatively be provided for each individual constellation, including GPS, GLONASS, Galileo and BeiDou, for example. In addition to DOP, other items which can be calculated and displayed include the number of visible LOS satellites and the number of not visible NLOS satellites. The level of multipath in an area can be estimated or mathematically analyzed, including general level of multipath in an area, level of multipath on a multi-GNSS constellation basis, level of multipath on a per GNSS constellation basis, and level of multipath on a per satellite basis. Predicted position errors and relative predicted position errors can also be calculated and displayed. As well as computing the values, the display of these can also be altered. For example, each value, or type of value can use its own, individual color palette and way of display. This can be automated, or manually chosen. The display elements can be context sensitive, depending upon the type of question that is being asked in the request. The displayed items can be focused to respond to particular issues, such as worst area, best area, relative performance spatially in 2D, vertically in 3D, and temporally to show changes over time.

Figure 7B:
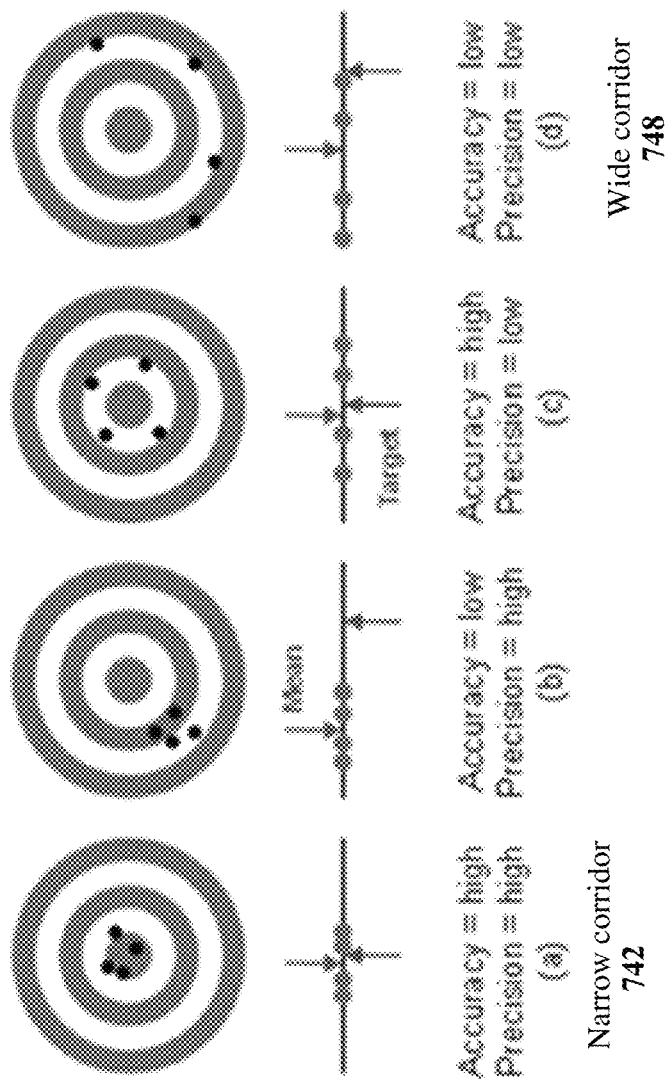
FIG. 7B illustrates the relationship between accuracy and precision for target satellite locations, for evaluating and visualizing navigation corridors.

FIG. 7B illustrates the relationship between accuracy and precision for target satellite locations, for visualizing and evaluating navigation corridors. When a satellite location is accurate and the precision is high, as shown in (a) 742, there is less uncertainty in the location of the vehicle. Alternatively, when the accuracy is low and the precision is low as shown in (d) 748, a forecast trajectory would be less reliable, which can be indicated by showing a wide corridor.

GNSS Forecast can be utilized to predict where and when satellite navigation meets the technical requirements for a specific use case. In one example, real-time integrity improvement of a navigation sub-system is achieved via real-time use of the GNSS Forecast to look approximately 1 KM ahead of the vehicle to determine what GNSS is available, what precision is possible, if mitigation is sufficient, and what level of autonomy can be maintained. Then, if needed, the system can change autonomous mode or provide additional time for disengagement to the driver.

Figure 8A:
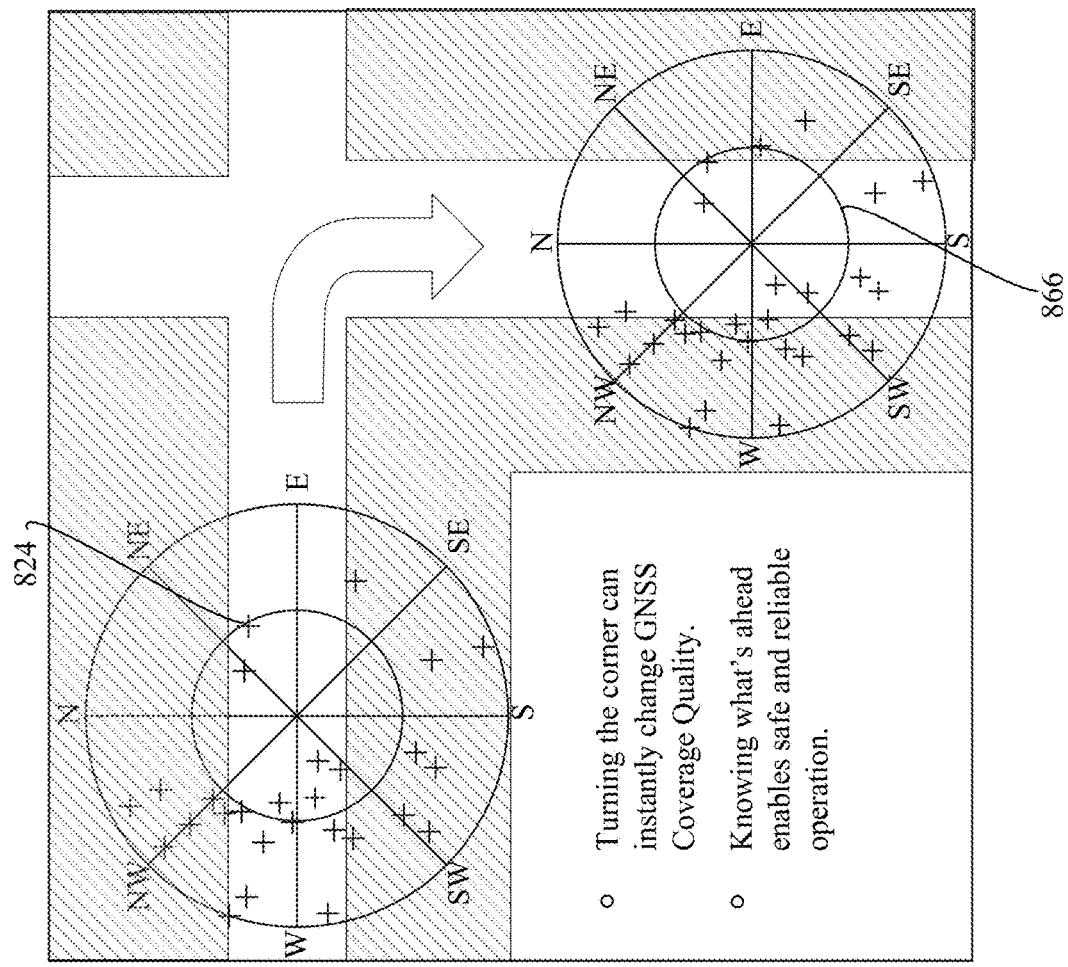
FIG. 8A illustrates the effect of turning a geometric corner in an urban environment on the number of LOS satellites within a target area.

FIG. 8A illustrates the effect of turning a geometric corner in an urban environment on the number of LOS satellites within a target area. Turning the corner can immediately change GNSS coverage quality. For example, for a receiver traveling West to East, with buildings depicted as shaded areas in the drawing, six satellites are LOS 824, as depicted by +s in the white target area of the path. After the receiver turns the corner to travel North to South, only three satellites are LOS 866 in the white target area of the path in the urban environment shown. The disclosed FAN enables the receiver to know in advance to expect to use different satellites after turning the corner in an urban canyon. As an example of the effects illustrated in FIG. 8A, a GNSS Forecast can predict the LOS satellites. However, a specific receiver and antenna may not track all of the satellites due to their design and performance. In one example, an implementation may filter out satellites with a specific signal to noise ratio. Characterizing the way each receiver chooses to track satellites compared to the predicted satellites enables a performance prediction for specific receivers.

The disclosed Forecast Assured Navigation (FAN) Forecasts can also be applied to improve vehicle-to-vehicle communication (V2X). Critical roadway infrastructure such as smart intersections are often tasked with advanced traffic flow management to optimize timing of traffic lights and decrease congestion. Lane level accurate vehicle position is therefore provided by the vehicle to the traffic management system infrastructure (V2X). The FAN Forecast can improve the integrity of the vehicle's position, such as in a turn lane, and therefore improve the system's performance.

Figure 8B:
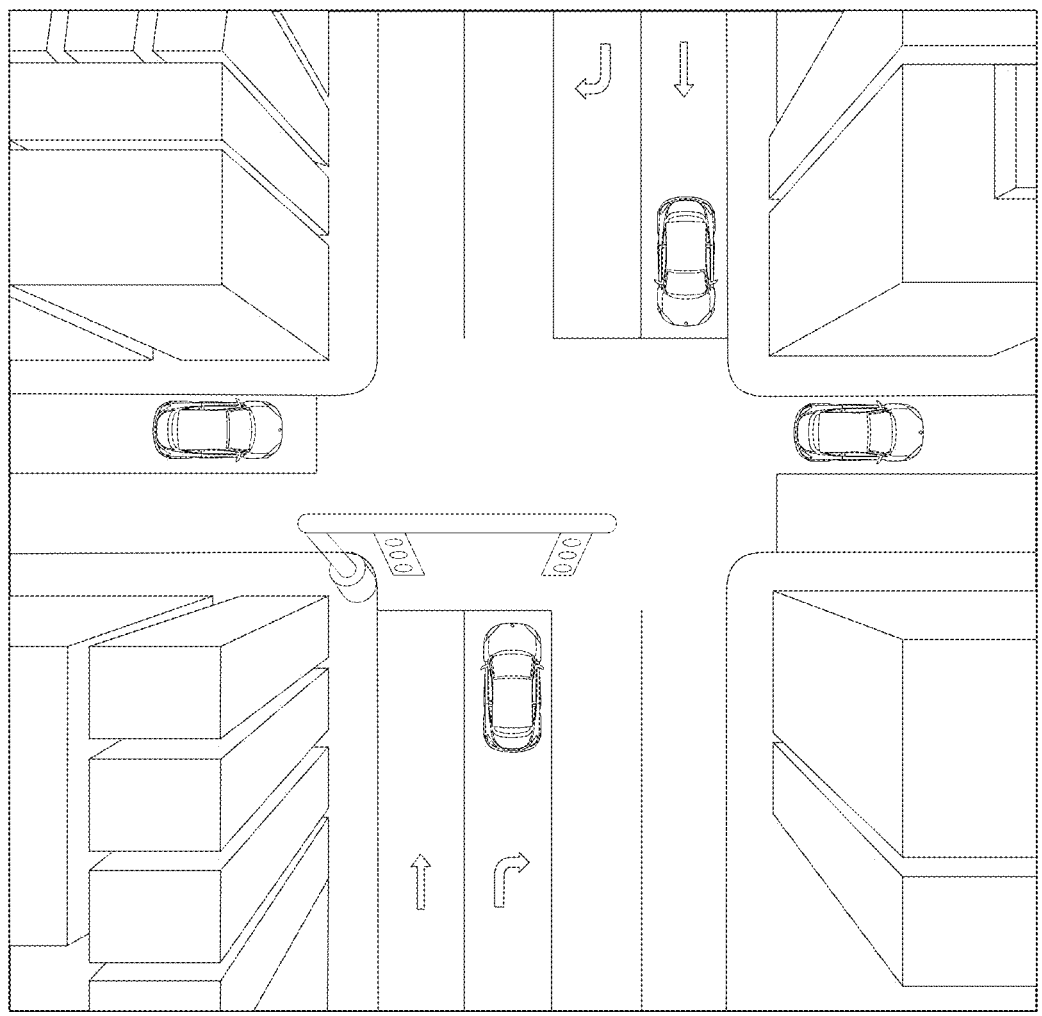
FIG. 8B shows an example urban roadway for utilizing FAN Forecasts for a smart intersection, illustrating the need for accurate GNSS Forecasts, pictorially.

FIG. 8B shows an example urban roadway for utilizing FAN Forecasts for a smart intersection, illustrating the need for accurate GNSS Forecasts, pictorially. Vehicle 844 can use the disclosed real-time GNSS Forecast that considers the number of LOS satellites, to improve measurement and positioning estimation.

GNSS forecasts can also be applied for city infrastructure planning. The ability of GNSS Forecast to predict GNSS signals' integrity could be used to plan city infrastructure. For the city in situ with all infrastructure in place, GNSS Forecast can be used to work out areas where GNSS signals suffer from impairments. This information can then be used to identify the locations for installing relevant sensors in order to mitigate these adverse effects. If the user has the ability to update the 3D map used in a GNSS Forecast, it can be used for city infrastructure planning during re-development. GNSS Forecast can be used to predict the effects of the new infrastructure on GNSS signals integrity and design the infrastructure for optimum GNSS signals integrity in the scenarios listed next: (a) Design potential GNSS interference sources to be interoperable with GNSS capabilities; (b) Design infrastructure to have a lower number of disturbances to areas which are relying on GNSS signals to function; (c) Design the infrastructure for vehicles to travel in optimum GNSS integrity; (d) Find locations at which to install relevant sensors, for situations in which GNSS signal degradations due to infrastructure are unavoidable.

FIG. 9A through FIG. 9F illustrate use of the disclosed visualization UX that enables route planning and evaluation by users. In one use case, the customer is searching for a route that has sufficient GNSS performance for safe navigation when operating within the receiver's design domain, using GNSS Forecast data. The customer starts with the 3D/2D map with the PDOP layer enabled, to view locations with good/bad GNSS coverage on the map. The customer can then drop pins to define a route that meets their requirements for GNSS performance. In the example illustrated in FIG. 9A through FIG. 9F, a user enters a route to check what the GNSS performance for the route is, and to adjust the route, if needed, using the GNSS Forecast data displayed as a heat map.

Figure 9A:
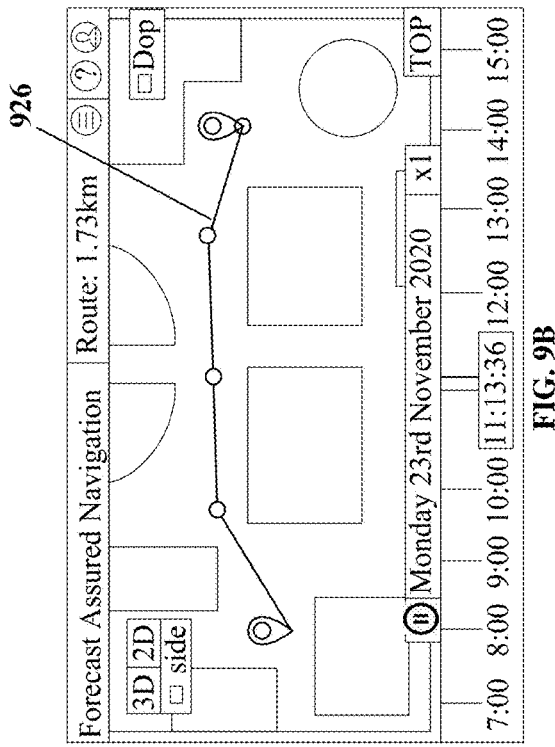
FIG. 9A shows the entry of a proposed route via the route button or by importing of a KML file for expressing geographic annotation and visualization, by selecting the "create a route" feature.

FIG. 9A illustrates the "create a route" feature with entry of a route by selecting the route button or by importing of a Keyhole Markup Language (KML) file, an XML notation for expressing geographic annotation and visualization. The interface accepts and receives input specifying an urban area for route planning and visualization parameters, including a time range and optionally an elevation range and satellite constellation(s) to depict.

Figure 9B:
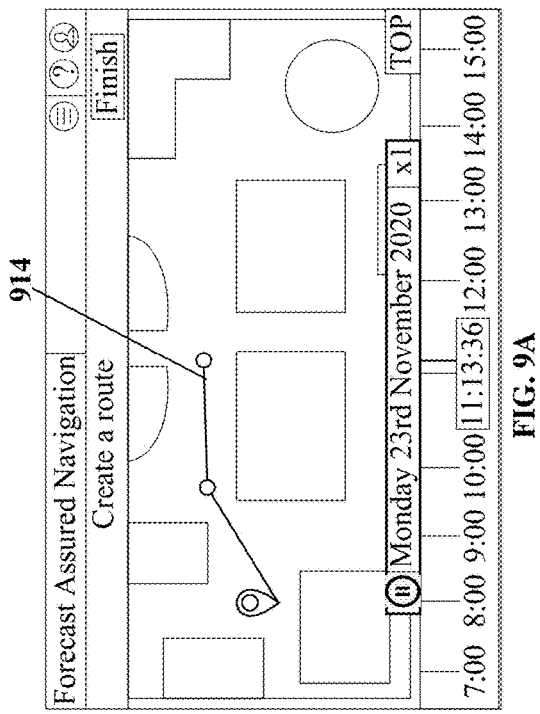
FIG. 9B shows the completed route before the user selects finish to display route information. The solid line illustrates the intended path/trajectory.

FIG. 9B shows the completed route 926, before the user selects the finish feature to display route information. The solid line illustrates the intended path/trajectory. The individual points are where the vehicle/receiver is located, and the window is the expected error allowance. The wider the window, the more uncertainty. If the uncertainty gets large then the "bubble" will be big and will intersect with buildings, making that path unfeasible.

Figure 9C:
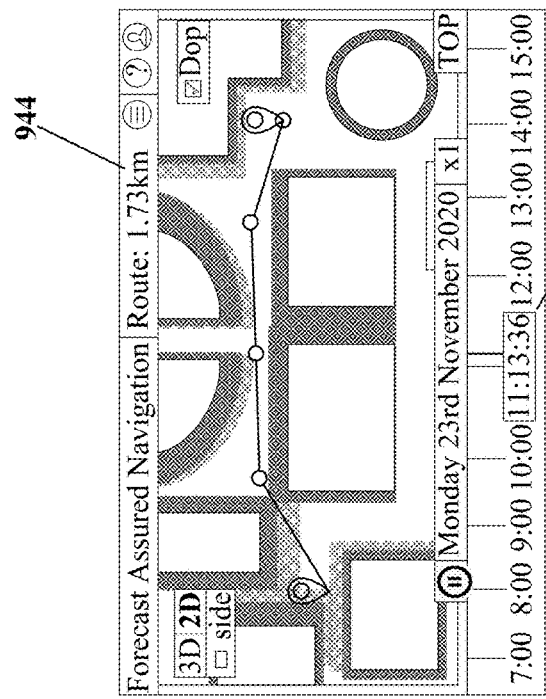
FIG. 9C shows the route length and the enabled DOP layer displays the GNSS forecast heat map and subsequent too-wide flight corridor, due to position accuracy requirements.

FIG. 9C displays the enabled PDOP layer with the GNSS forecast heat map. The route length is displayed as 1.73 km 944. Shading visually encodes line of sight visibility or dilution of precision at the point location over times and combines the 2D map visualization with a scrubbing slider 974 to control a time represented by the overlaid first and second rays and third segments, optionally overlaying the scrubbing slider control 974 with an aggregate indication of line-of-sight visibility or dilution of precision in the urban area for route planning, over times in a range spanned by the scrubbing slider.

Figure 9D:
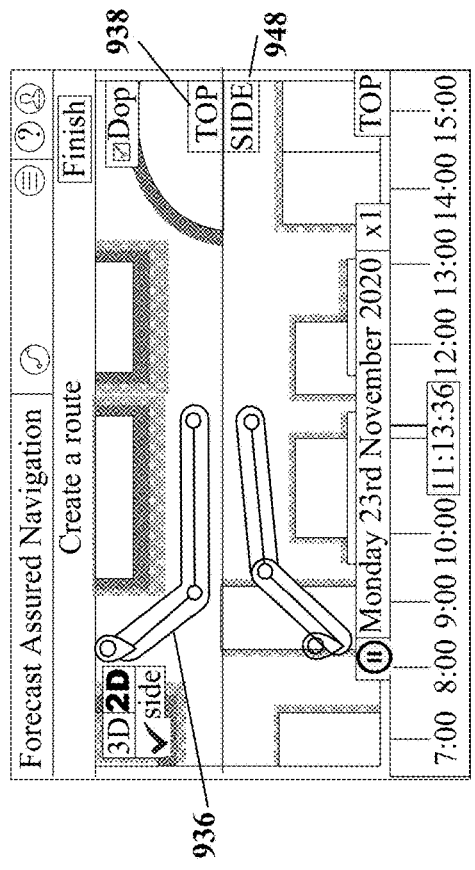
FIG. 9D shows the visualization interface with the DOP layer feature on, in 2D side view.
Figure 9E:
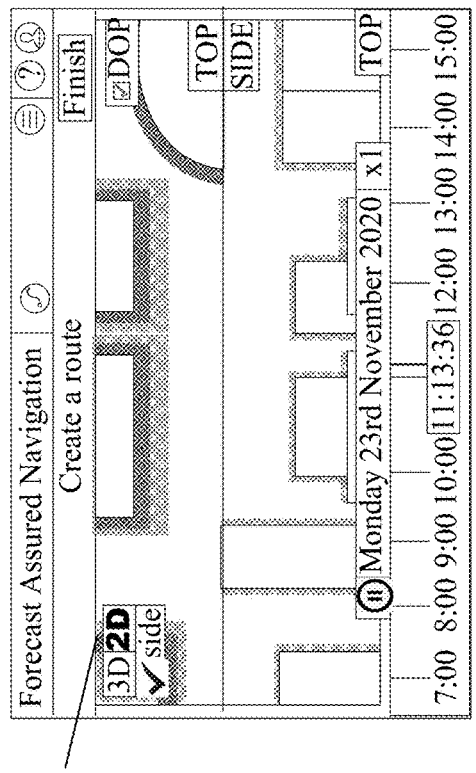
FIG. 9E shows the route map as it is entered, and the flight corridor is calculated and displayed alongside the route, in both top view and side view.

FIG. 9D shows the visualization interface with the DOP layer feature on, in 2D side view 932, overlaying shading on the 2D map for a selected time. FIG. 9E shows the route map 936 as it is entered, and the flight corridor is calculated and displayed alongside the route, in both top view 938 and side view 948.

Figure 9F:
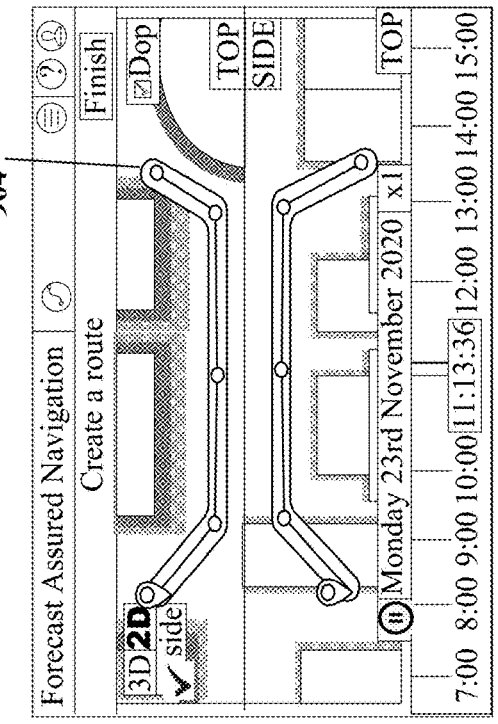
FIG. 9F shows the visualization UI with a completed route with the GNSS forecast data informing the route via the displayed heat map in which different DOP ranges are displayed in different shadings, to avoid degraded performance and ensure the tightest possible flight corridor.

FIG. 9F shows the completed route 964 with the GNSS forecast data informing the route via the displayed heat map in which different DOP ranges are displayed in different shadings. Consideration of DOP ranges helps to avoid degraded performance and ensure the tightest possible flight corridor.

Figure 9G:
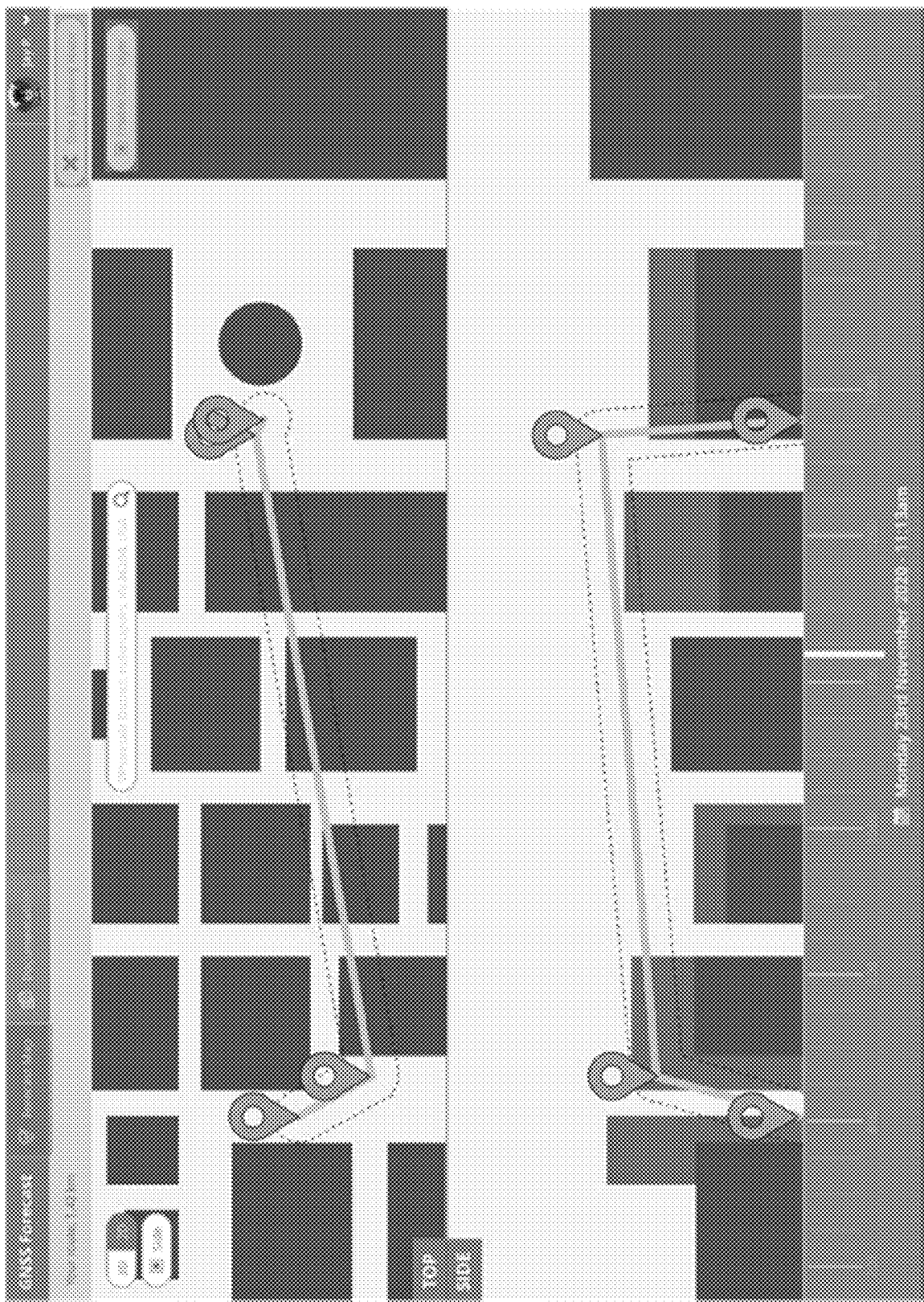
FIG. 9G shows a UI view of the visualization interface that allows users to plan a route by clicking on the map while the heat map is visible.

FIG. 9G shows another view of the visualization interface that enables users to plan a route by clicking on the map while the heat map is visible. The thin dotted line around the route shows the estimated flight corridor. The "bubble" around the corridor implies that the receiver will be anywhere in that position even though the path is illustrated in the dead center. That is, a wider corridor implies less accuracy, and therefore more uncertainty, and a narrow corridor signifies more accuracy, and therefore less uncertainty. For aviation, the customer can look at a top/side split view to adjust the altitudes of each segment of the flight, accessing a 3D map of the urban area, including structure solids that obscure lines of sight between cuboids in the area, and optionally for drones in the specified elevation range, and satellites overhead.

Figures 10A, 10B:
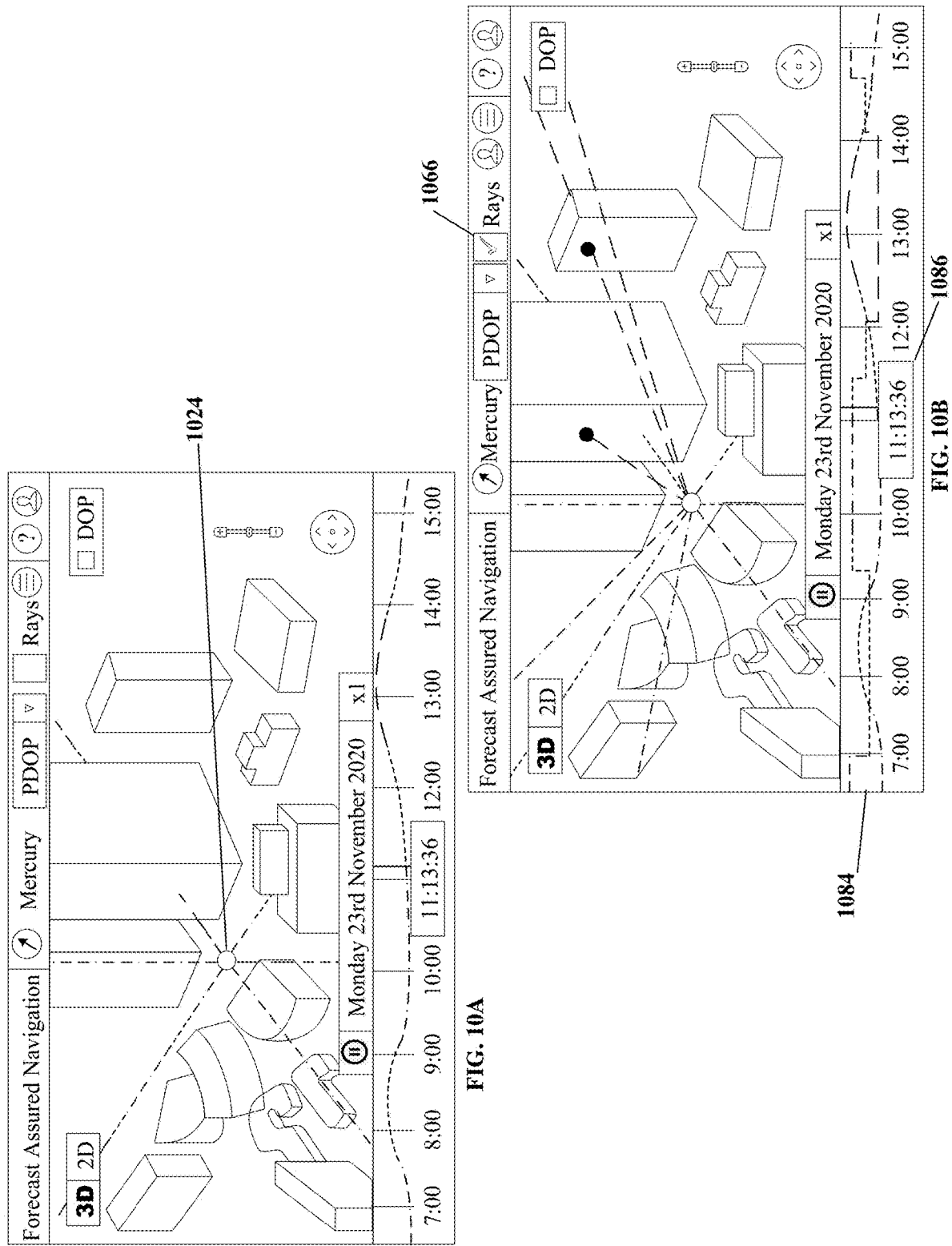
FIG. 10A shows a 3D visualization of the forecast interface displaying the GNSS Forecast DOP in measure mode for a location selected by the user.
FIG. 10B shows the 3D visualization UI with rays enabled for viewing individual lines of sight from reticule to satellites in orbit.

FIG. 10A shows a 3D visualization of the forecast interface displaying the GNSS Forecast DOP in measure mode, for a location selected by the user. The DOP values can also change over time on the timeline displayed at the bottom of the 3D UI display when the reticle 1024 is moved around on the map by a user.

FIG. 10B shows rays enabled 1066 for viewing individual lines of sight from reticle to satellites in orbit. Scrubbing slider 1086 can control a time represented by the overlaid first and second rays and third segments, optionally overlaying the scrubbing slider control 1086 with an aggregate indication of line-of-sight visibility or dilution of precision in the urban area for route planning, over times in a range spanned by the scrubbing slider. The timeline 1084 can be scrubbed to view the predicted PDOP at a particular time.

Figure 11:
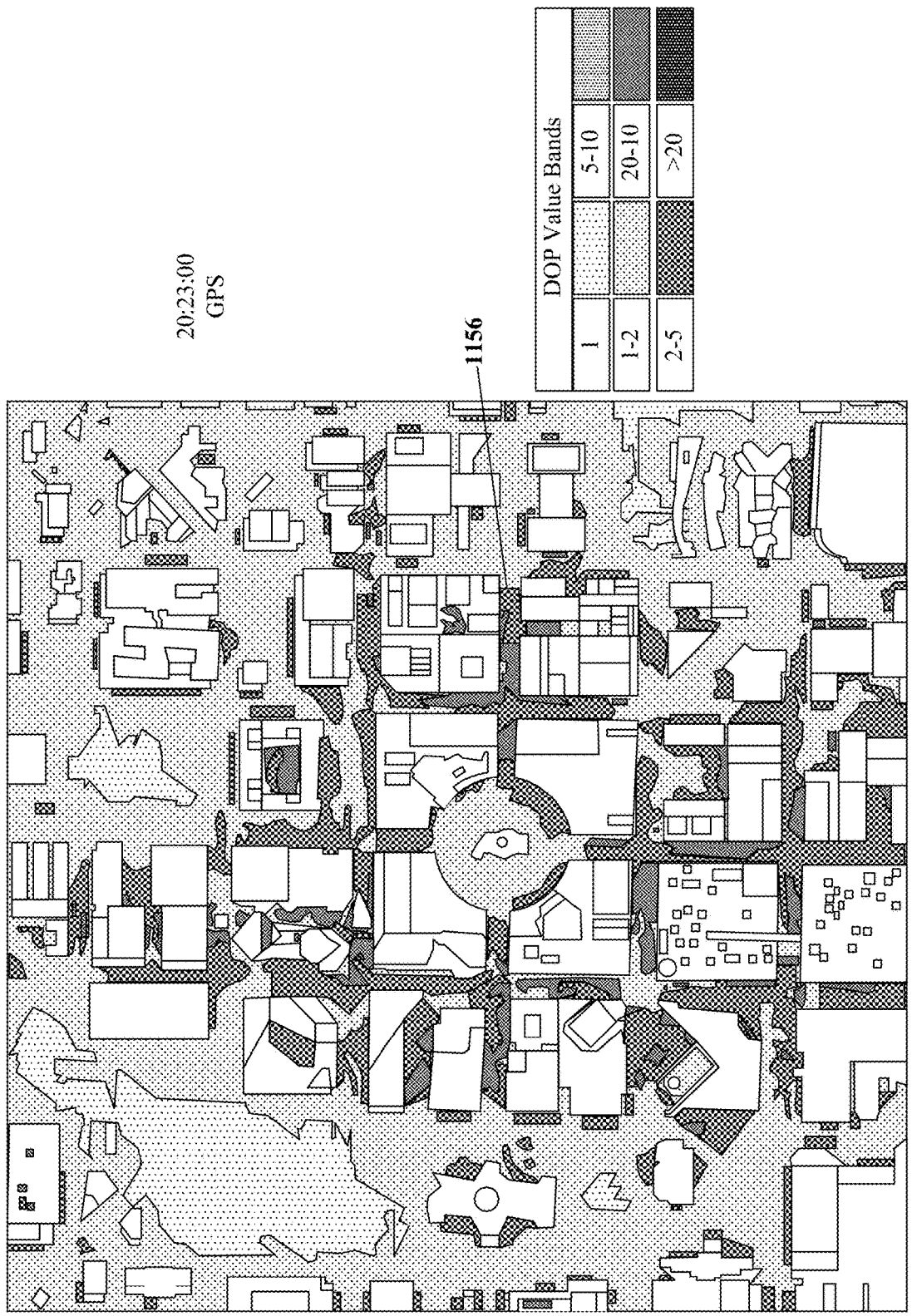
FIG. 11 displays the GNSS Forecast at 20:23:00 GPS at ground level.
Figure 12:
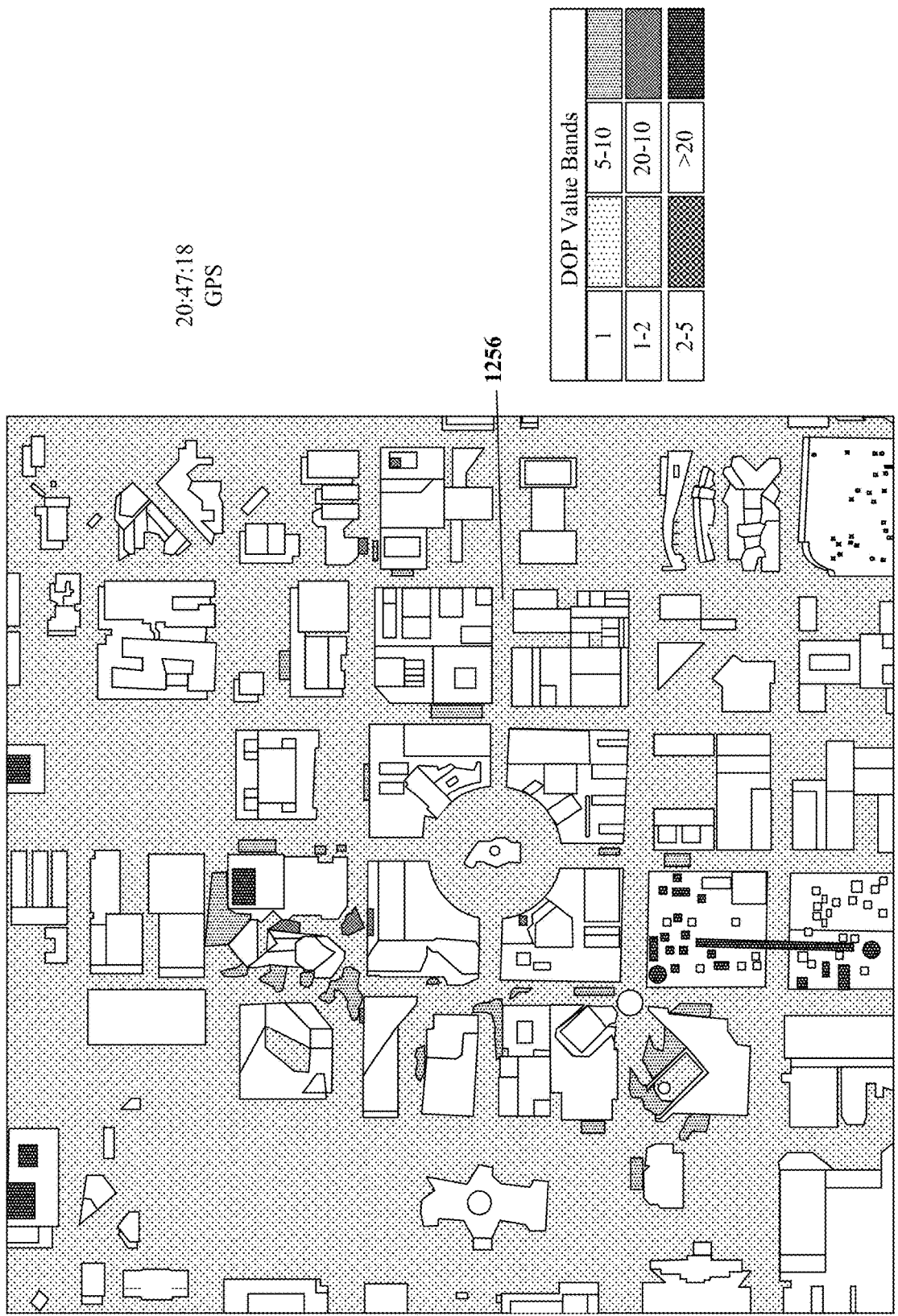
FIG. 12 displays the GNSS Forecast at 20:47:18 GPS at ground level.
Figure 13:
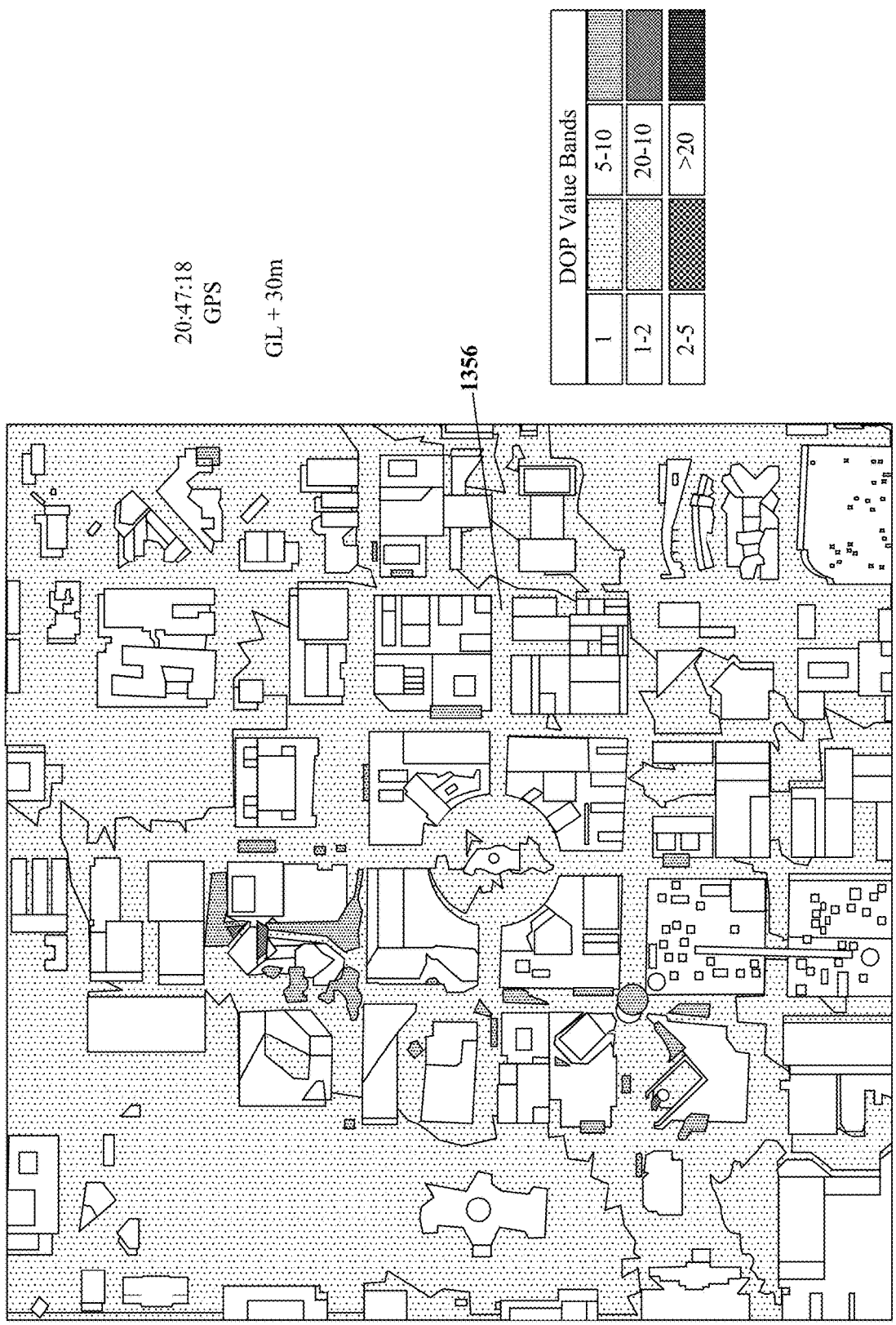
FIG. 13 displays the GNSS Forecast at 20:47:18 GPS at 30 meters above ground level.

FIG. 11, FIG. 12 and FIG. 13 illustrate a GNSS Forecast visualization for multiple instances of a 1 km×1 km grid selected to cover the center of the city of Indianapolis, at different sample times, and at multiple elevations. Six shadings encode six different DOP value bands in the visualizations.

FIG. 11 displays the GNSS Forecast at 20:23:00 GPS at ground level. Note that navigation in the city center 1156 is impacted, as illustrated by the high DOP values.

FIG. 12 displays the GNSS Forecast at 20:47:18 GPS at ground level. Note that navigation in the city center is less impacted only 24 minutes later, as illustrated by the lower DOP values shown in the visualization in the city center 1256.

FIG. 13 displays the GNSS Forecast at 20:47:18 GPS at 30 meters above ground level. Note that the graph of DOP value bands shows low DOP values in the downtown area 1356, which is accessible at the height of 30 meters above ground level.

GNSS Forecast maps show GNSS receiver calculation position compared to GNSS actual position. For multi-constellation receiver and forecast (with RTK) tests performed with the disclosed GPU-based system using commercial 3D mapping, initial performance results show 94-98 percent correlation with real world measurements. GNSS performance bands show distinctions between ideal, excellent, ok, moderate, poor and bad environments. Forecast predictions match real world performance, with poor and bad predictions corresponding to poor and bad positioning accuracy. The Forecast Assured Navigation (FAN) Forecast can be utilized for accurate prediction of GNSS-degraded environments.

Figure 14:
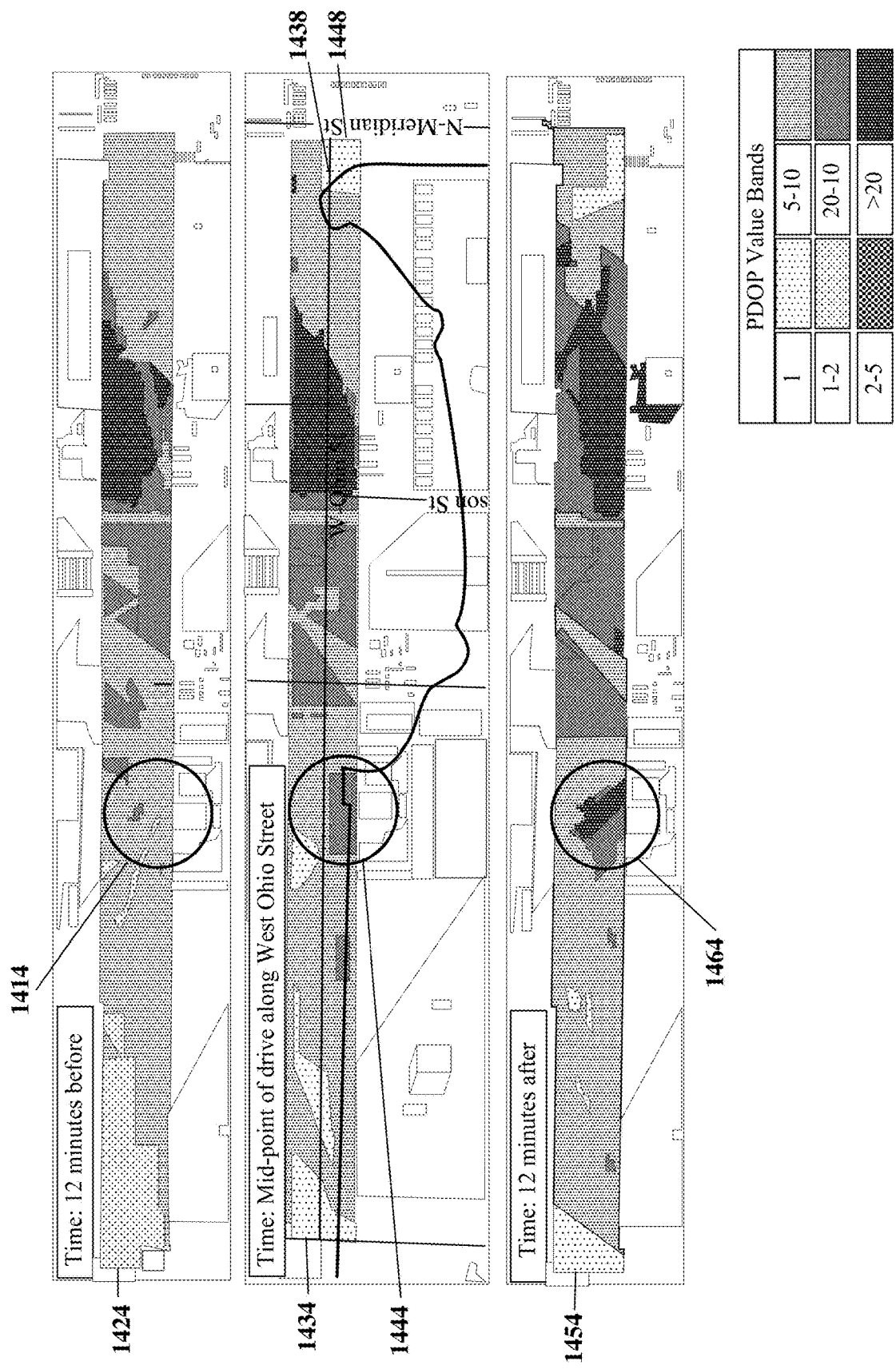
FIG. 14, FIG. 15 and FIG. 16 illustrate GNSS Forecast visualizations at three sequential times, separated by 12 minutes each.
Figure 15:
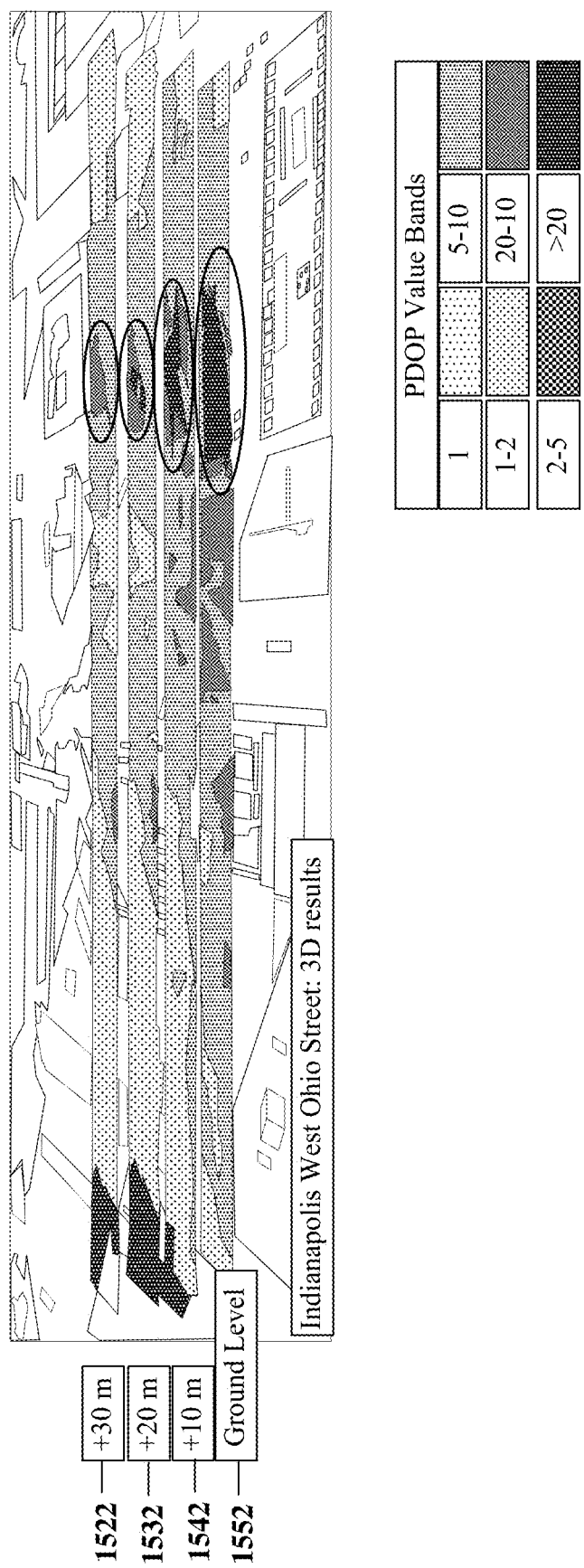
Figure 16:
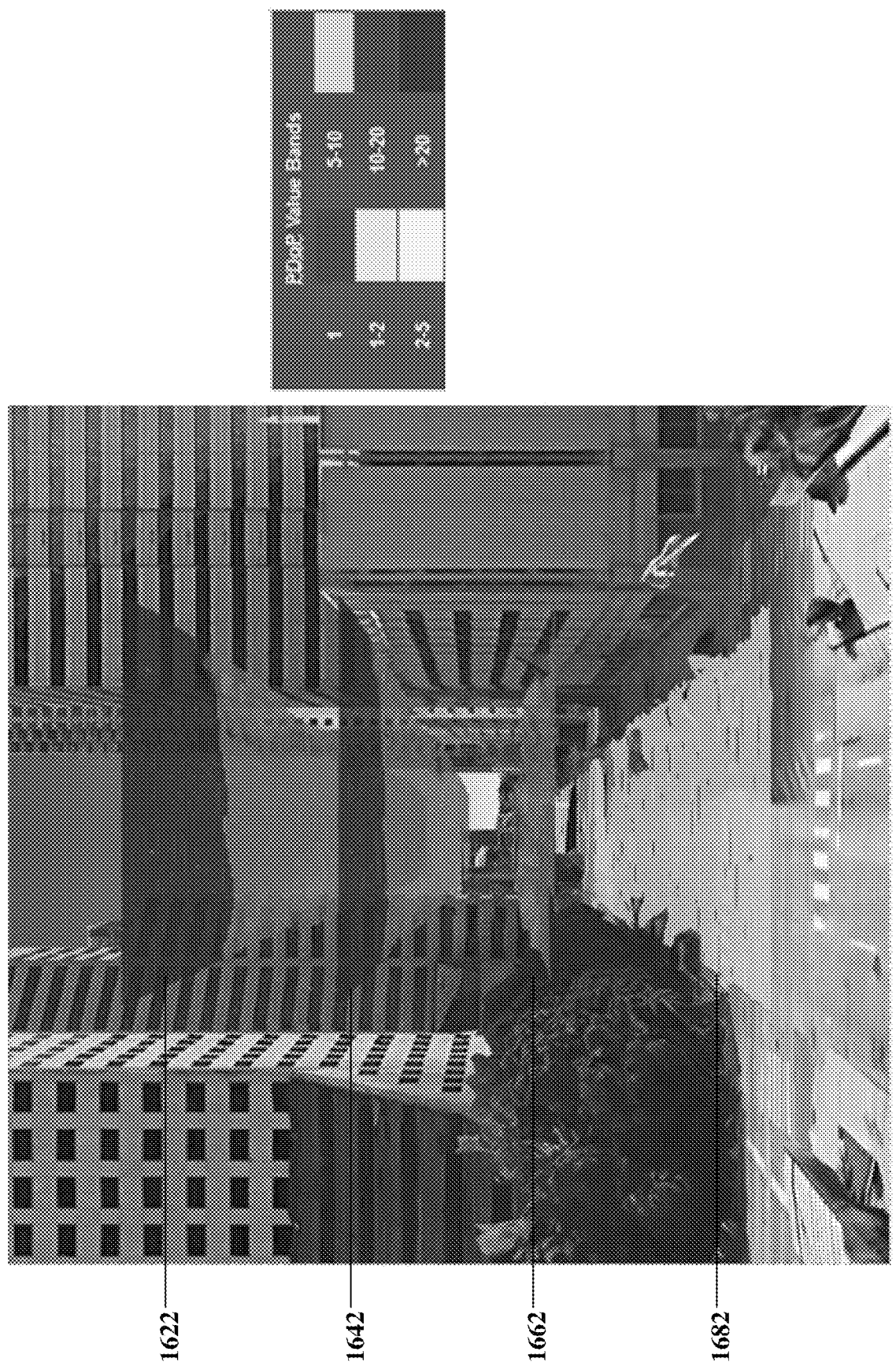

FIG. 14, FIG. 15 and FIG. 16 illustrate GNSS Forecast visualizations at three sequential times, separated by 12 minutes each. FIG. 14 depicts a route along West Ohio Street in the urban center of Indianapolis that shows where the receiver thinks it is, at 12 minutes before the mid-point time of the drive 1424, encoded with PDOP value bands. A second depiction shows the route at the mid-point time of the drive 1434, and a third depiction shows the PDOP along same route 12 minutes later in time for the mid-point of the drive 1454 along West Ohio Street. Path 1438 is the route that the receiver actually travelled, straight from left to right along the route. The three circled areas 1414, 1444, 1464 of FIG. 14 illustrate the correlation between the prediction via PDOP values and the receiver's performance. The PDOP values predict the degradation of the receiver's signals. The receiver's performance recovers when the PDOP value bands return to lower values 1448 during the mid-point of the drive 1454 along West Ohio Street. Disclosed FAN forecast predictions enable avoidance of pitfalls, by planning a different route, time, or altitude. The best route in/out of the area can be evaluated. Route issues can be mitigated, using the predictions to determine whether the user can operate without GNSS and for what time period.

FIG. 15 depicts 3D GNSS Forecast visualization results for West Ohio Street, Indianapolis, at four different altitude planes. The heat maps for ground level 1552, +10 m 1542, +20 m 1532 and +30 m 1522 show the relative PDOP graphs for those four altitudes. The area with high PDOP value band is larger at ground level, and gets smaller as the altitude increases. This supports the expectation of a lower DOP and a resulting higher accuracy of signal when the altitude rises above the level of the buildings in the urban landscape.

FIG. 16 depicts floating planes of signal strength for visualizing signal coverage over time. FIG. 16 shows a lateral view of 3D GNSS Forecast visualization results for West Ohio Street, Indianapolis, at four different altitude planes, with the four paths stacked at the same altitudes as those shown in FIG. 15. The four planes are ground level 1682, 10 meters above ground level 1662, 20 meters above ground level 1642 and 30 meters above ground level 1622. The rotation of perspective shows the effect of buildings in the urban corridor on PDOP values and the resulting receiver performance. At higher altitudes, the areas of degraded performance become smaller but do not disappear. FIG. 16 conveys a sense of where the planes for the route are located relative to the height of the buildings.

In one implementation, with floating planes of signal strength, a disclosed method of visualizing GNSS coverage over time for route planning, includes providing for display an interface that accepts input, receiving the input specifying at least one corridor through an urban area being traversed and visualization parameters, including elevation slices and a time range, and in some cases a flight plan through the corridor and satellite constellation(s), to depict. The method also includes accessing a 3D map of the urban area, including structure solids that block lines of sight between cuboids on the elevation slices along the corridor and satellites overhead, wherein the elevation slices are bounded planes in space between the structure solids and are parallel to a surface of the 3D map, and computing a requested visualization over time, including ray casting or tracing between the cuboids and satellites over time to calculate line of sight visibility or dilution of precision at the point location over the time range. The method further includes initializing a 3D map visualization, overlaying the elevation slices on an orthogonal projection from a viewpoint above a lowest elevation slice and below a highest elevation slice, wherein each elevation slice translucently encodes the line-of-sight visibility or dilution of precision for the cuboids on the elevation slice. In some implementations, the method includes overlaying flight plan segments through the corridor on the orthogonal projection and visually encoding the segments to indicate the line-of-sight visibility or dilution of precision along the route segments. The method also includes combining the 3D map visualization with a scrubbing slider to control a departure or arrival time depicted, and in some cases overlaying the scrubbing slider control with an indication of line-of-sight visibility or dilution of precision over the flight plan through the corridor at times in a range spanned by the scrubbing slider. The method further includes providing for display the 3D map visualization combined with the scrubbing slider control, including the overlaid elevation slices.

For visualizing signal strength via translucent clouds, in one implementation a disclosed method of visualizing GNSS coverage over time for flight planning includes providing for display an interface that accepts input, and receiving the input specifying at least one corridor through an urban area being traversed and visualization parameters, including an elevation range and a time range and in some cases a flight plan through the corridor and satellite constellation(s) to depict. The disclosed method also includes accessing a 3D map of the urban area, including structure solids that block lines of sight between cuboids in the elevation range along the corridor and satellites overhead, wherein the corridor and elevation range occupy space between the structure solids of the 3D map, and computing a requested visualization over time, including ray casting or tracing between the cuboids and satellites over time to calculate line of sight visibility or dilution of precision at the point location over the time range. The method further includes initializing a 3D map visualization overlaying a translucent cloud of values of points, of equal value surfaces on an orthogonal projection, wherein the values encode the line of sight visibility or dilution of precision for the cuboids in the translucent cloud. In some implementations, the method also includes overlaying flight plan segments on the orthogonal projection and visually encoding the segments to indicate the line of sight visibility or dilution of precision along the flight plan segments. The disclosed method also includes combining the 3D map visualization with a scrubbing slider to control a departure or arrival time depicted, and can include overlaying the scrubbing slider control with an indication of line of sight visibility or dilution of precision over a route through the translucent cloud at times in a range spanned by the scrubbing slider. The method further includes providing for display the 3D map visualization combined with the scrubbing slider control, including the overlaid elevation slices.

Figure 17:
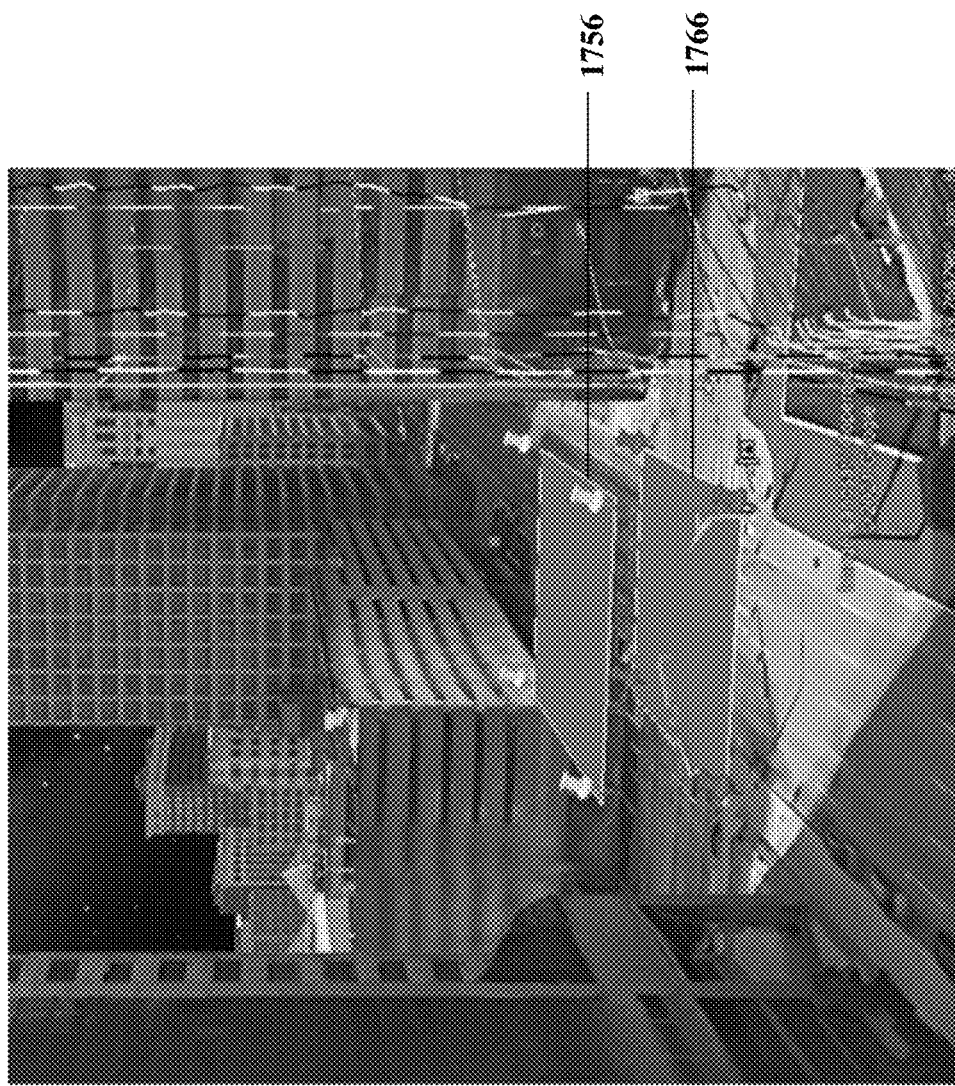
FIG. 17 illustrates an example of a customer request, with a four-point polygon and min/max heights.

FIG. 17 illustrates an example customer request with a four-point polygon 1756, 1766 and min/max heights. The pinned planes show the area covered by a map tile split into cuboids. A customer can pass through the area and request and receive back the set of GNSS Forecast cuboids for that area.

In an additional use case, an API view enables users to visualize GNSS Forecast data requested and received using the APIs. The developer can move the reticule around and view a dynamically updated display of the results of example API calls. Developers can also adjust API time window values via controls on the timeline, and can view a live response from the APIs to help debug calls to the APIs.

Simulation-Based Implementation

An implementation of a GNSS positioning assurance application has been developed for predicting and visualizing the influence of satellite geometry on the GNSS position error across a series of points in a given geospatial region. "Appendix A: Simulation-Based Trial Implementation" which is included in full herein for reference, provides a full description of the Simulation Implementation, with user interface, architectural overview, simulation orchestrator threading and simulation orchestrator. Appendix A also includes the UI and User Manual for Simulation-Based Implementation. The development of this simulation application was driven by the requirements for assured mission-planning for the autonomous vehicle industry. The disclosed application includes parallel execution of simulations allowing the simultaneous testing of multiple points, the ability for area and route assessments to be provided, and a high level of scalability, resulting in a more comprehensive test than existing mission-planning solutions. The completed application leverages up-to-date APIs and ray-casting to approximate signal obscuration caused by nearby structures and can also be used to highlight potential problem areas in mission routes. The application has been developed as a solution that can provide assurance to manufacturers, that the viability of areas and routes can be predicted before a journey is made. The application focuses on GPS signals and can inform users of the coverage quality of a given test scenario ahead of time. The applicant's proprietary software, SimGEN, usable to simulate the predicted orbits of GPS satellites, is used for receiver testing. The disclosed application harnesses multiple simulations to perform area tests for highlighting potential problem areas for CAV missions and routes.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

Some Particular Implementations

We describe some particular implementations and features usable for providing dilution of precision (DOP) forecasts and/or degree of confidence forecasts for GNSS navigation next.

In one implementation of a disclosed method of providing dilution of precision (DOP) forecasts for GNSS navigation for routing of vehicles or alerting humans in vehicles includes accessing a 3D map of an area including structure solids and generating cuboids in spaces not contained in the structure solids. The method also includes iteratively over time increments, calculating GNSS satellites visible from the cuboids using the 3D map and, using at least the calculated visibility, determining a DOP forecast for GNSS signals observable in the cuboids at the time increments. The method further includes compressing the calculated DOP forecast spatially and temporally, and distributing the compressed DOP forecast via a CDN, responsive to queries from requestors to an API of the CDN, whereby the requestors' systems can take into account the DOP forecast for routing the vehicles or alerting the humans in the vehicles to a predicted navigation impairment. In another implementation the disclosed method includes providing degree of confidence forecasts for GNSS navigation for routing of vehicles or alerting humans in vehicles includes accessing a 3D map of an area including structure solids and generating cuboids in spaces not contained in the structure solids. The disclosed method can also provide DOP forecasts for performance improvements and integrity improvements for navigation. In some implementations of the disclosed method, orbital predictions are also used when calculating the GNSS satellites visible from the cuboids, for visualizing when the field of view of a satellite's instrument passes over an area of interest.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

For some implementations of the disclosed method, the area is an urban environment, and the solid structures include buildings often floors or more. For other implementations, the area is an urban environment, and the solid structures include representations of buildings generated by extruding building cross-sections.

Some implementations of the disclosed method further include calculating the GNSS satellites visible by ray casting from the cuboids to forecast positions of the GNSS satellites using the 3D map. Other implementations further include calculating the GNSS satellites visible by ray tracing of transmissions from forecast positions of the GNSS satellites to the cuboids using the 3D map. Some implementations of the disclosed method also include calculating the GNSS satellites visible by ray casting using predicted shadow masks from the cuboids.

One implementation of the disclosed method further includes applying trigonometric triangulation factors when determining the GNSS navigation DOP forecast using the GNSS satellites visible by ray casting using predicted shadow masks from the cuboids.

Some implementations of the disclosed method further include calculating and distributing a degree of confidence measure with the dilution of precision forecasts.

Many implementations of the disclosed method further include forecasting a degree of multipathing, using ray casting or ray tracing between the satellites, reflective surfaces, and the cuboids, taking into account reflections and distributing the forecast degree of multipathing via the content delivery network.

Some implementations of the disclosed method further include forecasting multipathing of signals from particular satellites, using ray casting or ray tracing between the satellites, reflective surfaces, and the cuboids, and taking into account multipath reflections in the DOP forecasts.

Many implementations of the disclosed method further include forecasting multipathing of signals from particular satellites, using ray casting or ray tracing between the satellites, reflective surfaces, and the cuboids, and distributing information about the forecasting of signal from the particular satellites via the CDN.

One implementation of a disclosed method of relaying dilution of precision forecasts for GNSS navigation for routing of vehicles or alerting humans in vehicles includes receiving at a CDN, a compressed DOP forecast, wherein the compressed DOP forecast represents for cuboids in spaces not contained in structure solids represented on a 3D map of an area, iterative calculations over time increments, of GNSS satellites visible from the cuboids using the 3D map, incorporated into the DOP forecast for the cuboids at the time increments. The disclosed method also includes receiving at an API to the CDN queries from requestors, and responding to the queries by providing responsive parts of the DOP forecast whereby the requestors' systems can take into account the DOP forecast for routing the vehicles or alerting the humans in the vehicles to a predicted navigation impairment.

Some implementations of the disclosed method further include the CDN receiving and distributing a degree of confidence measure with the DOP forecasts responsive to the queries.

Many implementations of the disclosed methods further include, responsive to a first query to the API, providing a manifest of available files responsive to the first query, then receiving a second query that selects some or all of the available files, and then responding to the second query by providing the selected files containing the dilution of precision forecast.

For many implementations of the disclosed methods, the vehicles are wheeled vehicles, further including the 3D map including streets and limiting the cuboids to streets navigable by the wheeled vehicles.

One implementation of a disclosed method of obtaining and acting upon DOP forecasts for GNSS navigation for routing of vehicles or alerting humans in vehicles includes sending a request to an API to the CDN for a DOP forecast, the request specifying an area to which the request applies, wherein the compressed DOP forecast represents, for cuboids in spaces not contained in structure solids represented on a 3D map of an area, iterative calculations over time increments, of GNSS satellites visible from the cuboids using the 3D map, incorporated into the DOP forecast for the cuboids at the time increments. The disclosed method also includes receiving responsive parts of the dilution of precision forecast, and responsive to the DOP forecast, selecting a route to a destination that avoids subareas of impaired GNSS precision or alerting the humans in the vehicle to a predicted navigation impairment.

In some implementations of the disclosed methods, the vehicles are wheeled vehicles, that are autonomous capable, and that further have a driver onboard, further including using a navigation component onboard the vehicle: looking ahead along a path the vehicle is following, determining that a degraded GNSS navigation DOP will be encountered, and alerting the driver at least a predetermined time before the encounter.

In other implementations of the disclosed methods, the vehicles are flying taxis, autonomous capable, and that further have a pilot onboard. These methods further include using a navigation component onboard the autonomous taxi: looking ahead along a path the taxi is following, determining that a degraded GNSS navigation DOP will be encountered, and alerting the pilot at least a predetermined time before the encounter.

Some implementations of the disclosed methods that include forecasting multipathing of signals also combine the 3D map with one or more statistical multipath models from a version of ITU-R P.681-11, P.2145-2, or P.1407-7 that was effective on Jul. 1, 2020.

For some implementations of the disclosed methods, a single point that represents a cuboid is at a center of each cuboid.

Some implementations, for the disclosed methods in which the area includes a rural field with no obscurations, further include determining a size of the cuboids in the rural field to cover a ground area of between 1 by 1 meter and 1,000 by 1,000 meters. Different cuboid sizes are applied to different horizontally and/or vertically arranged volumes over the 3D map.

Other implementations, for the disclosed methods in which the area includes an urban canyon, further include determining a size of the cuboids in the urban canyon to cover a ground area of between 10 by 10 meters and 1 by 1 centimeters. Different cuboid sizes are applied to different horizontally and/or vertically arranged volumes over the 3D map.

Some implementations of the disclosed method include determining the size of the cuboid by applying least square estimation with successive n-order polynomials to compute residuals between the raw data and the n-order polynomial and selecting a correct cuboid size at which a higher, n+1 order polynomial fit does not reduce variance of the residuals by more than a predetermined amount.

Some implementations of the disclosed methods that include forecasting multipathing further include applying one or more radio frequency propagation algorithms to determine the GNSS satellite multipath at the future time in the specific locations. In some cases, the disclosed method also includes selecting a particular frequency propagation algorithm based on an environment presented in a volume of the 3D map, including pre-processing the 3D map determine obscurations and geometry in the volume.

One implementation of the disclosed method also includes applying a different frequency propagation algorithm to a rural field with no obscurations than to an urban canyon.

One implementation of a disclosed method of using environmental data (maps containing building locations, terrain, vegetation, and other obstacles) to determine at least one length of an interval for which to make a GNSS satellite obfuscation and/or multipath forecast over a future time horizon in specific locations includes segmenting the time horizon into intervals to provide a GNSS obscuration and/or multipath forecast for a time contained by each interval. The method also includes determining the length of the interval responsive to an environment presented in a volume of the 3D map, including pre-processing the 3D map determine obscurations and geometry in the volume, and providing a set of results and statistics for the interval over cuboids in at least part of the volume, wherein a particular cuboid is represented by a single point in space of the 3D map.

Some implementations of the disclosed method also include applying a different length of interval to a rural field with no obscurations than to an urban canyon. Some implementations further include applying a different length of interval to forecast for a GPS satellite constellation than for a GLONASS satellite constellation.

One implementation of a disclosed method of selecting among available 3D maps for GNSS Forecasts and predictions includes recording IQ data using a drive platform, simulating IQ data, and comparing the recorded and the simulated IQ data and assessing their correlation based on three or more of positioning solution, dilution of precision, satellite visibility, satellite's azimuth and elevation with respect to vehicle body frame, satellite's pseudorange residues and satellite signal to noise ratio. The method also includes selecting from among the available 3D maps for GNSS Forecasts and predictions based on the comparing and assessing.

One implementation of a disclosed method for pre-processing 2D map data to select a radio frequency propagation algorithms to use for a GNSS Forecast for a future time at specific locations includes determining categories including rural areas, suburban, urban, roads, tunnels, and overpasses from the 2D map data, and using the determined categories to select one or more radio frequency propagation algorithms to use for a GNSS Forecast for a future time at specific locations. Some implementations of the method also include combining the 2D map data with terrain contours and using information combined from the 2D map data and the terrain contours for determining the categories. Many disclosed implementations of the disclosed method further include using an amount of vegetation indicated for an area of the 2D map data combined with season and/or climate to determine a level of vegetation interference applicable to the radio frequency propagation algorithms.

One implementation of a disclosed method for pre-processing 3D map data to select a radio frequency propagation algorithms to use for a GNSS Forecast for a future time at specific locations includes determining categories including rural areas, suburban, urban, roads, tunnels, and overpasses from the 3D map data, and using the determined categories to select one or more radio frequency propagation algorithms to use for a GNSS Forecast for a future time at specific locations. Some implementations of the disclosed method further include using an amount of vegetation indicated for an area of the 2D map data combined with season and/or climate to determine a level of vegetation interference applicable to the radio frequency propagation algorithms. Another disclosed method combines processing of 2D map data with 3D map data described above.

One implementation of a disclosed method for providing a cloud based API for requesting GNSS Forecasts produced includes using the methods described above and returning selected GNSS Forecast data responsive to a request. Some implementations also include determining what cuboids of data from the selected GNSS Forecast data to return responsive to the request, and can further include receiving with the request a specification from which positioning, navigation and time information can be extracted for returning the selected GNSS Forecast data.

One implementation of a disclosed method of visualizing a GNSS Forecast according to any of the methods described above includes a heatmap that represents results of the GNSS Forecast.

One implementation of a disclosed method of improving accuracy of a GNSS receiver that has a non-directional antenna includes sending a request for predictive data for an area that includes the receiver to a CDN. Responsive to the query, the method also includes receiving data indicating predicted line-of-sight visibility from the receiver to individual satellites, and extracting from the data a prediction for a present or future location of the receiver and using the extracted data for satellite selection, for choosing some and ignoring other individual satellites.

Some implementations of the disclosed method further include using the data to exclude from satellite selection at least one individual satellite based on lack of line-of-sight visibility to the individual satellite.

Some implementations of the disclosed method also include receiving in the data, information regarding multipathing from the individual satellite using the multipathing information to exclude from satellite selection the individual satellite.

Some implementations of the disclosed method further include with the request a time range during which a path is being traversed by the receiver, receiving the data for the requested time range, and extracting from the data the prediction for a particular time.

One implementation of the disclosed method further includes receiving data regarding predicted signal strength for the area and extracting predicted characteristics of signals received from individual satellites, and comparing the signal characteristics data with measures of signals received from individual satellites and rejecting use of at least one individual satellite based on variance between predicted and actual received signals.

In one implementation of the disclosed method, the variance results from the predicted signal being weaker than the actual received signal for the individual satellite.

One implementation of a disclosed method of recognizing and rejecting spoofed GNSS signals received by a GNSS receiver that has a non-directional antenna includes the receiver sending a content delivery network, the CDN, a request for predictive data for an area that includes the receiver. Responsive to the query, the method also includes receiving data regarding line of sight visibility or expected signal strength for the receiver with respect to individual satellites over time, and the receiver comparing the data with measures of signals received from individual satellites and rejecting use of at least one individual satellite based on variance between predicted and actual received signals.

In one implementation of the disclosed method the variance results from the predicted signal being weaker than the actual received signal for the individual satellite.

One implementation of a disclosed method of producing performance baseline data for comparison of GNSS receiver outputs of visibility to disclosed GNSS forecasts includes receiving a GNSS Forecast covering a time and location of operation of a GNSS receiver, including a predicted reliability measure for respective GNSS signals received from a plurality of satellites at the location, and comparing received GNSS signals reported by the GNSS receiver as received from the plurality of satellites to the GNSS Forecast and assessing their correlation based on three or more of positioning solution, dilution of precision, satellite visibility, satellite's azimuth and elevation with respect to vehicle body frame, satellite's pseudorange residues and satellite signal to noise ratio. The method also includes further correlating variance between the predicted and received GNSS signals with environment variables to characterize performance of the GNSS receiver.

One implementation of a disclosed method of certifying performance of GNSS receivers includes receiving a GNSS Forecast covering a time and location of operation of a GNSS receiver, including a predicted reliability measure for respective GNSS signals received from a plurality of satellites at the location. The method also includes comparing received GNSS signals reported by the GNSS receiver as received from the plurality of satellites to the GNSS Forecast and assessing their correlation based on three or more of positioning solution, dilution of precision, satellite visibility, satellite's azimuth and elevation with respect to vehicle body frame, satellite's pseudorange residues and satellite signal to noise ratio. and based at least in part on the comparing, certifying performance of the GNSS receiver when the comparing shows a correlation between the forecast and received GNSS signals within a predetermined tolerance.

One implementation of a disclosed method of collecting and recording GNSS receiver performance including antenna performance as a function of location, altitude, and flight envelope includes flying an automated vessel reliant on GNSS-based navigation equipped with the GNSS receiver and the antenna over a controlled urban landscape with variation in acceleration, deceleration, velocity changes, turns, climbs, descents, rotations, and vibration and collecting data regarding performance of the GNSS receiver and data from inertial sensors. The method also includes analyzing the collected data to determine the impact of the variation in acceleration, deceleration, velocity changes, turns, climbs, descents, rotations, and vibration on the performance of the GNSS receiver in the controlled urban environment.

One implementation of the disclosed method further includes correlating the collected data environmental objects identified on a 3D map of the controlled urban landscape to determine impacts of combinations of the environmental objects and the variations in acceleration, deceleration, velocity changes, turns, climbs, descents, rotations, and vibration.

One implementation of a disclosed method of path planning using a GNSS Forecast includes requesting the GNSS Forecast of signal obscuration on behalf of a vehicle travelling in a region. The disclosed method also includes receiving the requested GNSS Forecast, and using the GNSS Forecast to plan a path or route that has GNSS signals available over the path or route that satisfy a predetermined criterium. For some implementations of the disclosed method, the planned path or route has GNSS signals available for most but not all of the path our route, further including in the planned path measures to bridge gaps in the GNSS signals available over the path or route. In some implementations of the disclosed method, the vehicle is a rolling autonomous or automated vehicle and the region includes buildings that obscure line-of-sight view from the vehicle to GNSS satellites. In other implementations, the vehicle is a flying autonomous or automated vehicle and the GNSS Forecast includes forecast 3D cuboids.

In one implementation of the disclosed method, the planned path or route has GNSS signals available for most but not all of the path or route, further including in the planned path measures to bridge gaps in the GNSS signals available over the path or route. For one implementation of the disclosed method, the vehicle is a rolling autonomous or automated vehicle, and the region includes buildings that obscure line-of-sight view from the vehicle to GNSS satellites. In another implementation of the disclosed method, the vehicle is a flying autonomous or automated vehicle and the GNSS Forecast includes forecast 3D cuboids. For many implementations of the disclosed method, the planned path or route has GNSS signals available for most but not all of the path or route, further including in the planned path measures to bridge gaps in the GNSS signals available over the path or route.

One implementation of a disclosed method used by a flight control system with GNSS Forecasts and planned paths or routes for a plurality of flying vehicles includes requesting the GNSS Forecast of signal obscuration on behalf of a flying autonomous or automated vehicle travelling in a region. The disclosed method also includes receiving the requested GNSS Forecast for obscuration of GNSS satellites from 3D cuboids, and using the GNSS Forecast to plan a path or route that has GNSS signals available over the path or route that satisfy predetermined criteria including accommodating real-time changes in flight paths without leaving space, that satisfies the predetermined criteria, whereby at least some real-time changes in flight paths that would not compromise a diverted flying vehicle's ability meet the requirements of flight control in an airspace. In one implementation, the GNSS Forecast is subject to geofenced areas established by a flight control authority and fed to an engine used to generate the GNSS Forecast. In some cases, the flight control authority updates the geofenced areas and the updates are provided to the engine and reflected in the GNSS Forecast.

Some implementations of the disclosed method further include receiving with the GNSS Forecast predictions of satellites visible to and decodable by a GNSS receiver, and selecting, by a GNSS receiver among the satellites predicted to be visible to and decodable by the GNSS receiver.

Drone designs capable of carrying large payload consisting of multiple GNSS receivers, GNSS record and playback system, video recording, and network connectivity system includes at least some features described in the foregoing specification. One implementation of a disclosed method of collecting and recording for playback GNSS signals as a function of location, altitude, and flight envelope includes flying a vessel equipped with a GNSS signal recorder over a controlled urban landscape and collecting data regarding actual signals received from individual satellites. The method also includes comparing the actual signals received to a GNSS Forecast covering a time and location of operation of a GNSS receiver, including a predicted reliability measure for respective GNSS signals received from the individual satellites. The disclosed method further includes updating a model used to generate the GNSS Forecast, and using the updated model to generate subsequent GNSS Forecasts. Some implementations of the disclosed method further include playing back and analyzing the data from the GNSS signal recorder and correlating the analyzed recording with the environment to determine impacts of ground based transceiver locations relative to environmental objects identified on a 3D map of the controlled urban landscape.

One implementation of a disclosed method of collecting and recording for playback GNSS signals as a function of location, altitude, and flight envelope includes flying a vessel equipped with a GNSS signal recorder over a controlled urban landscape and collecting data regarding actual signals received. The method also includes comparing the actual signals received to a GNSS Forecast covering a time and location of operation of a GNSS receiver, including a predicted reliability measure for respective GNSS signals received, and updating a calculation used by the flying vessel to determine its position based on the comparing.

Some implementations of a disclosed method of certifying performance of GNSS receivers used on a flying vessel include flying a vessel equipped with a GNSS signal recorder over a controlled urban landscape and collecting data regarding actual signals received, while collecting data regarding determination by a GNNS receiver onboard the vessel of the vessel's position. The disclosed method also includes comparing the actual signals received and the position determination to external sensor recordings of a path the flying vessel, and based at least in part on the comparing, certifying performance of the GNSS receiver when the comparing shows a correlation between the received GNSS signals and the predicted GNSS signals and between the determined position and the external sensor recordings of the path within a predetermined tolerance.

The disclosed technology uses environmental data (maps containing building locations, terrain, vegetation, and other obstacles) to determine GNSS satellite obscurations (line-of-sight, non-line-of-sight, out-of-view) at some time in the past, present, or future and for specific locations, referred to as a GNSS obscuration forecast.

The disclosed technology also uses environmental data (maps containing building locations, terrain, vegetation, and other obstacles) to determine GNSS satellite multipath at some time in the future and for specific locations, referred to as a GNSS multipath forecast.

The disclosed technology includes methodology and segmentation of 3D maps into cuboid locations to provide a GNSS obscuration forecast for that area/cuboid with a point/pixel inside that cuboid. It is inefficient to calculate every single point on the Earth and their GNSS obscurations or multipath, so, to provide the obscuration forecast, the disclosed technology segments the world into regions or areas labeled cuboids. Within the center of each cuboid is the point of measurement. Determining the size of the cuboid depends on the environment around it. In one example, for a rural field with no obscurations, the field can be segmented into 1 meter cubed cuboids; since there are no obstructions and the GNSS satellites are over 20,000 KM away, each of the cuboids would have similar results. Thus, scaling up the size of the cuboids to use larger cuboids will have little effect on the results. In contrast, for a second example, in an urban environment with a lot of buildings, a cuboid 1 meter from a building versus a cuboid 10 meters away will produce very different results. These examples illustrate the concept that the selection of a cuboid size is determined by the complexity and geometries of the 3D maps.

The disclosed technology considers the obscurations and geometry to determine what size the cuboids when processing a 3D map, and then provides a set of results and statistics for each cuboid and call that a point or pixel. Estimating the cuboid size can be implemented by plotting the successive cuboid's location versus the cuboid's point of measurement on the location of interest, using least square estimation to estimate a n-order polynomial that fits the plotted data, and computing the variance of the residual between the raw data and the polynomial. When the cuboid size is right for the area, higher order polynomial fit would not further reduce the variance of the residual.

Disclosed is a method of using environmental data (maps containing building locations, terrain, vegetation, and other obstacles) to determine at least one size of cuboids for which to make a GNSS satellite obfuscation and/or multipath forecast at a future time in locations of the cuboids, including segmenting a 3D map into cuboid locations to provide a GNSS obscuration and/or multipath forecast for that area/cuboid with a point/pixel inside that cuboid, determining the size of the cuboids responsive to an environment presented in a volume of the 3D map, including pre-processing the 3D map determine obscurations and geometry in the volume, and providing a set of results and statistics for the cuboids in at least part of the volume, wherein a particular cuboid is represented by a single point in space of the 3D map. In some cases, the volume includes a rural field with no obscurations, further determining the size of the cuboids in the rural field to cover a ground area of between 1 by 1 meters and 1,000 by 1,000 meters. Other implementations, in which the volume includes an urban canyon, further include determining the size of the cuboids in the urban canyon to cover a ground area of between 10 by 10 meters and 1 by 1 centimeters. In other cases, the range can be between 1 by 1 meter and 100 by 100 meters, between 1 by 1 meter and 10 by 10 meters, and 10 by 10 meters and 1000 by 1000 meters, or additional ranges. In some cases, different cuboid sizes are applied to different horizontally and/or vertically arranged volumes over the 3D map. Some disclosed methods further include determining the size of the cuboid size applying least square estimation with successive n-order polynomials to compute residuals between the raw data and the n-order polynomial and selecting a correct cuboid size at which a higher, n+1 order polynomial fit does not reduce variance of the residuals by more than a predetermined amount.

The disclosed technology includes representing a GNSS measurement as a point within a geometric point cloud. Each of the points calculated for a GNSS Forecast is based on a 3D map, satellite positions and the applicant's algorithms. The points are in the center of a cuboid and that cuboid is based on a latitude, longitude, altitude and time on the Earth and based on the 3D map used for the measurements. The points can collectively be named a GNSS Forecast point cloud.

The disclosed technology also includes methodology to apply one or more radio frequency propagation algorithms with environmental data to provide a prediction of GNSS in a cuboid, referred to as a "GNSS Forecast." The multiple algorithms that we can apply predict the amount of multipath. The determination of the environment may mean that any one algorithm is better than others for each area. For instance, a rural environment may have a different algorithm than urban.

Disclosed is methodology to determine the frequency or epoch of a GNSS Forecast. GNSS constellations have different periods (amount of time for the satellites to orbit the Earth), rate of change, and epochs for the satellites in the constellation to have the same locations (the location epoch). Combining the GNSS constellations results in a long location epoch, as it takes years for all the satellites to be in the same physical location. Based on the different epochs and the complexity of the environment, the difference in satellite obscuration and/or multipath may change more rapidly than in a less complex area. For example, an urban area with GPS might have a more frequent forecast than rural. In another example, an urban area with GPS might have a more frequent forecast than an urban area with GLONASS. Vehicle dynamics also play a role. In some cases, for a moving vehicle, multipath effect can be averaged out and fall into background noise.

The disclosed technology also includes methodology to combine, de-combine, and improve GNSS Forecasts for different GNSS system types, such as constellations and frequencies. The GNSS Forecast is computed for each GNSS constellation, satellite and frequency for each point in the point cloud. However, not every client uses all of the GNSS constellations. For example, a client with only have GPS L1 capabilities may want a forecast. When the client makes the request for the forecast, the system can determine what data to send from the point cloud and whether any of the data needs to be combined for each request. The more satellites the client is requesting, the more complex this process becomes. Moreover, this is straight forward when providing a simple line-of-sight (LOS) forecast versus a Dilution of Precision (DOP) prediction. A DOP is calculated based on the locations of the available satellites. If the user is using only GPS, the DOP is very different than if they are using GPS and GALILEO, as an example.

For GNSS Forecast data storage, manipulation and delivery, some disclosed implementations of the technology include methodology to store GNSS Forecasts and predictions and the interfaces and formats used to store a GNSS Forecast point clouds in a database. The disclosed technology includes methodology to improve and compress GNSS Forecasts and predictions, including the ways the GNSS Forecast point clouds are compressed to remove redundant information, the ways the GNSS Forecast point clouds are decompressed to provide each point in the point cloud and the results with redundancy. The methodology disclosed also includes the ways points in the point clouds are combined for storage and transmission efficiency.

The disclosed GNSS Forecast architecture for map manipulation, processing and interfaces includes disclosed methodology to interface a GNSS Forecast Engine to a mapping system. The system includes the interfaces and formats used to use a 3D map as an input to a GNSS Forecast Engine. As an example, the disclosed technology includes the format of maps, the format of objects, and ways to translate to object formats that each algorithm can be applied to. In one example, a 3D map gets processed into a format to which an ITU-R P2145-2 algorithm can be applied.

The disclosed technology includes methodology to select map data appropriate for GNSS Forecasts and predictions, to determine a best-fit map for GNSS Forecasts based on the fidelity of the map with the number of objects, types of objects, inclusion of building, terrain, vegetation, etc. This includes a method to determine the better map for GNSS Forecasts based on the accuracy of the map, matching of map types to algorithms such as the better map for urban multipath measurements versus the better map for terrain data and an obscuration measurement. In some cases, a comparison of real world collected IQ data against the simulated 3D environment can be used assess their correlation based on positioning solution, dilution of precision, satellite visibility, satellite's azimuth and elevation with respect to vehicle body frame, satellite's pseudo-range residues and satellite signal to noise ratio.

The disclosed technology also includes methodology to pre-process 2D map data to determine what radio frequency propagation algorithms to use for a GNSS Forecast. A 2D map has information that can indicate obscurations and multipath. Pre-processing to determine rural areas, suburban, urban, roads, tunnels, overpasses, etc. can be used to determine a general amount of obscurations and multipath in a region. That information can be used by a limited set of algorithms to provide a GNSS Forecast. 2D data combines with terrain data can provide a more enhanced determination of obscurations and multipath based on a 2D+terrain map. For instance, an area of vegetation on a flat terrain will be very different from mountainous terrain. The amount of vegetation can also be used to determine a level of "vegetation interference" by season and climate. For instance, an area of high vegetation in a growing season may have more obscurations and multipath than in winter, after the leaves fall off the plants. Road data can also help determine the amount of obscurations and multipath based on the road width, or type. For example, a rural road can typically be narrower than a highway. Moreover, overpasses and tunnels obstruct signals and can be included in the forecast. 2D maps also give an indication of complexity of the environment and can be used as an indicator of what size cuboid, or point cloud density, or 3D map model, is needed.

The disclosed technology further includes methodology to pre-process 3D map data to determine what radio frequency propagation algorithms to use for a GNSS Forecast.

Similar to 2D maps, 3D maps can be pre-processed to determine rural, suburban and urban areas, roads, tunnels, overpasses, etc. to provide a more detailed indication of obscurations and multipath in a region and determine what algorithms can be applied. 3D maps are then fed as "real" representations of the world into the ray-tracing and multipath algorithms to determine a very detailed prediction of obscurations and multipath—in some cases, an actual pseudo range correction or prediction. The disclosed technology includes considerations based on comparison of the pseudo-range correction/prediction between real world data and simulation.

The disclosed technology includes methodology to combine GNSS Forecasts from 2D and 3D maps into a combined prediction, combining 2D & 3D maps in locations in which there are overlaps with different or complimentary data.

GNSS Forecast client, and processing include disclosed methodology to interface a cloud architecture to clients for the purpose of requesting and providing a GNSS Forecast. This includes the interfaces and formats used by a GNSS Forecast application to connect to the GNSS Forecast CDN to request data; for example, the ways a client can request the GNSS Forecast for a given area and duration. Those skilled in the art will readily understand that forecasts distributed by CDN are cloud-based GNSS Forecasts.

The disclosed technology includes methodology to determine what cuboids of a GNSS Forecast to provide to a client based on region or area requested by a client. This includes the methodology and algorithms to determine what GNSS point cloud data to send to a client based on their request; for example, what is provided when the area requested does not line up with all the cuboids, and ways that partial cuboids can get computed in the CDN.

The disclosed technology includes methodology to receive positioning, navigation, and time information from a client for the purposes of providing a GNSS Forecast. The GNSS client may publish information back to the CDN and to the GNSS Forecast engine. This data can be used for forecasting or determining integrity, which directly relates to the level of confidence that can be placed in the information provided by the on-board navigation system. Integrity risk, also referred to as the probability of misleading information, is defined as the probability that the navigation positioning error exceeds the alert limit and that the event is not detected. Loss of integrity can happen in one of two ways. Either an unsafe condition is not detected, or it is detected but the alert is not received by the user within the required TTA. The alert limit defines the largest position error, which results in a safe operation.

The disclosed technology includes GNSS Forecast visualization methodology to visualize a GNSS Forecast, including the ways that heatmaps, ray-tracing results, etc. get visualized and aligned with a 2D or 3D map.

Disclosed technology for GNSS Forecast CDN architecture, interfaces and query handling include interfaces and formats used to publish GNSS Forecasts to a Content Delivery Network (CDN) architecture. Also included is methodology to update, validate and remove GNSS Forecasts between the GNSS Forecast Engine and the CDN. The GNSS Forecast Engine creates GNSS Forecasts on a periodic basis for different regions. These forecasts are then published on a CDN to enable a client to request a forecast from anywhere in the world and receive a result with minimal delay. The GNSS Forecast Engine does not forecast the entire world and the entire forecast period (14 days) all at once. Instead, the world is split into smaller regions and smaller time periods, named chunks, to enable processing efficiency. As each chunk is created it is sent to the CDN and published. The existing chunk will need to either be removed or updated. Also disclosed is updating the point cloud, also referred to as updating the cuboid and point cloud foundation/structure. Methods to update, validate and remove GNSS Forecasts between the CDN and clients are also included in the disclosed technology.

In one implementation, a disclosed method of visualizing GNSS coverage over time for route planning, includes providing for display an interface that accepts input, and receiving the input specifying an urban area for route planning and visualization parameters, including a time range and optionally an elevation range and satellite constellation(s) to depict. The method also includes accessing a 3D map of the urban area, including structure solids that obscure lines of sight between cuboids in the area, and optionally for drones in the specified elevation range, and satellites overhead. The method further includes computing a requested visualization over time, including ray casting or tracing between the cuboids and satellites over time to calculate line of sight visibility or dilution of precision at the point location over time, initializing a 2D map visualization including overlaying shading on the 2D map for a selected time, wherein the shading visually encodes line of sight visibility or dilution of precision at the point location over times. The disclosed method also includes combining the 2D map visualization with a scrubbing slider to control a time represented by the overlaid first and second rays and third segments, optionally overlaying the scrubbing slider control with an aggregate indication of line-of-sight visibility or dilution of precision in the urban area for route planning, over times in a range spanned by the scrubbing slider. The aggregate indication can indicate that there is a bottleneck. The method includes providing for display the 2D map visualization combined with the scrubbing slider control, including the overlaid shading, and in some cases, the overlaid aggregate indication of line-of-sight visibility or dilution of precision.

In another implementation, a disclosed method of visualizing GNSS coverage over time includes providing for display an interface that accepts input, and receiving the input specifying a point location and visualization parameters, including a time range to depict, and optionally satellite constellation(s) to depict. The method also includes accessing a 3D map of an area in an urban environment surrounding the location, including structure solids that obscure lines of sight from the location, and computing a requested visualization over time. The method further includes ray casting or tracing between point location and satellites over time, ray casting or tracing between additional locations, along segments that intersect the point location, and the satellites over time, initializing a 3D map visualization, and overlaying the point location on the 3D map for a selected time and overlaying first and second rays from the point location towards at least some satellites overhead at the selected time. The disclosed method also includes visually encoding the first rays with a first code to indicate a clear line of sight and overlay the encoded first rays on the 3D map, and visually encoding the second rays with a second code to indicate a blocked line of sight, showing at least a segment from the point location to a face of a blocking solid that blocks a line of sight, and optionally showing the segment extending skyward from a far side of the blocking solid. In some implementations the method includes overlaying third segments intersecting the point location and in a plane generally parallel with a surface of the 3D map and visually encoding the third segments with a third code to indicate dilution of precision along the third segments. The disclosed method includes combining the 3D map visualization with a scrubbing slider to control a time represented by the overlaid first and second rays and third segments, overlaying the scrubbing slider control with an indication of line of sight visibility or dilution of precision at the point location over times in a range spanned by the scrubbing slider, and providing for display the 3D map visualization combined with the scrubbing slider control, including the overlaid first and second rays and third segments and the overlaid indication of line of sight visibility or dilution of precision.

In yet another implementation, a disclosed method of visualizing GNSS coverage over time for route planning includes providing for display an interface that accepts input, receiving the input specifying an urban area for route planning and visualization parameters, including a time range to depict, and accessing a 3D map of the urban area, including structure solids that obscure lines of sight between cuboids in the area and satellites overhead. The disclosed method also includes computing a requested visualization over time, including ray casting or tracing between the cuboids and satellites over time to calculate line of sight visibility or dilution of precision at the point location over time. The method further includes initializing a 2D map visualization including overlaying shading on the 2D map for a selected time, wherein the shading visually encodes line of sight visibility or dilution of precision at the point location over times, combining the 2D map visualization with a scrubbing slider to control a time represented by the overlaid first and second rays and third segments, and providing for display the 2D map visualization combined with the scrubbing slider control, including the overlaid shading. For some implementations, the input received includes an elevation range and satellite constellation(s). In some cases, the structure solids obscure lines of sight between cuboids in the area in the specified elevation range. Some implementations of the disclosed method further include overlaying the scrubbing slider control with an aggregate indication of LOS visibility or DOP in the urban area for route planning, over times in a range spanned by the scrubbing slider. In some implementations, the aggregate indication indicates a bottleneck. For some implementations of the disclosed method, the provided visualization further includes the overlaid aggregate indication of line of sight visibility or dilution of precision.

In another implementation, a disclosed method of visualizing GNSS coverage over time for route planning includes providing for display an interface that accepts input, and receiving the input specifying at least one corridor through an urban area being traversed and visualization parameters, including elevation slices and a time range to depict. The method also includes accessing a 3D map of the urban area, including structure solids that block lines of sight between cuboids on the elevation slices along the corridor and satellites overhead, wherein the elevation slices are bounded planes in space between the structure solids and are parallel to a surface of the 3D map. The disclosed method further includes computing a requested visualization over time, including ray casting or tracing between the cuboids and satellites over time to calculate line of sight visibility or dilution of precision at the point location over the time range. The method also includes initializing a 3D map visualization, overlaying the elevation slices on an orthogonal projection from a viewpoint above a lowest elevation slice and below a highest elevation slice, wherein each elevation slice translucently encodes the line-of-sight visibility or dilution of precision for the cuboids on the elevation slice, combining the 3D map visualization with a scrubbing slider to control a time depicted, and providing for display the 3D map visualization combined with the scrubbing slider control, including the overlaid elevation slices.

Some implementations of the disclosed method further include the received input specifying a flight plan through the corridor and satellite constellation(s) to depict. Some implementations of the disclosed method further include overlaying flight plan segments through the corridor on the orthogonal projection and visually encoding the segments to indicate the line-of-sight visibility or dilution of precision along the route segments. Some implementations of the disclosed method further include overlaying the scrubbing slider control with an indication of line-of-sight visibility or dilution of precision over the flight plan through the corridor at times in a range spanned by the scrubbing slider. For some implementations of the disclosed method, the time depicted is a departure time or an arrival time.

In one implementation, a disclosed method of visualizing GNSS coverage over time for flight planning includes providing for display an interface that accepts input and receiving the input specifying at least one corridor through an urban area being traversed and visualization parameters, including an elevation range and a time range through the corridor to depict. The method also includes accessing a 3D map of the urban area, including structure solids that block lines of sight between cuboids in the elevation range along the corridor and satellites overhead, wherein the corridor and elevation range occupy space between the structure solids of the 3D map, and computing a requested visualization over time, including ray casting or tracing between the cuboids and satellites over time to calculate line of sight visibility or dilution of precision at the point location over the time range. The disclosed method further includes initializing a 3D map visualization, overlaying a translucent cloud of values on an orthogonal projection, wherein the values encode the line of sight visibility or dilution of precision for the cuboids in the translucent cloud, combining the 3D map visualization with a scrubbing slider to control a time depicted, and providing for display the 3D map visualization combined with the scrubbing slider control, including the overlaid elevation slices.

Some implementations of the disclosed method also include the received input specifying a flight plan through the corridor and satellite constellation(s). Some implementations of the disclosed method further include values of points, of equal value surfaces. Some implementations of the disclosed method also include overlaying flight plan segments on the orthogonal projection and visually encoding the segments to indicate the line of sight visibility or dilution of precision along the flight plan segments. For some implementations of the disclosed method, the time depicted is a departure time or an arrival time. Some implementations of the disclosed method also include overlaying the scrubbing slider control with an indication of line-of-sight visibility or dilution of precision over a route through the translucent cloud at times in a range spanned by the scrubbing slider.

One implementation of a disclosed method of improved utilization of a GNSS signal to provide a precise time synchronization among of a first location with a second location that are separated by at least hundreds of miles includes using a GNSS Forecast produced by the methods described above to select a location for a GNSS signal receiving antenna used at the first location to receive and decode the GNSS signal to provide a precise time synchronization. Some implementations of the disclosed method include tuning a GNSS receiver coupled to the antenna to reject multipath signals and use a LOS signal for the precise time synchronization.

One implementation of a disclosed method of visualizing GNSS coverage over time for a selected route includes providing for display an interface that accepts input and receiving the input specifying at least one route through an urban area for visualization and visualization parameters, including a time range to depict. The method also includes accessing a 3D map of the urban area, including structure solids that obscure lines of sight between cuboids along the route and satellites overhead, and computing a requested visualization over time, including ray casting or tracing between the cuboids and satellites over time to calculate line of sight visibility or dilution of precision at the point location over time. The disclosed method further includes initializing a 2D map visualization including overlaying shading on the 2D map for a selected time, wherein the shading visually encodes line of sight visibility or dilution of precision along the route for the selected time, combining the 2D map visualization with a scrubbing slider to control a start time represented by the overlaid shading, and providing for display the 2D map visualization combined with the scrubbing slider control, including the overlaid shading. Some implementations of the disclosed method also include the input specifying flight profile elevations along the route and satellite constellation(s) to depict. For some implementations of the disclosed method, the structure solids obscure lines of sight between cuboids along the route at the specified elevations. Some implementations of the disclosed method further include overlaying the scrubbing slider control with an aggregate indication of line of sight visibility or dilution of precision in the urban area while traveling the route, over times in a range spanned by the scrubbing slider. For some implementations of the disclosed method, aggregate indication indicates a bottleneck. Some implementations of the disclosed method also include the overlaid aggregate indication of line of sight visibility or dilution of precision. For some implementations of the disclosed method, the selected time is a departure time or an arrival time.

One implementation of a disclosed method of visualizing GNSS coverage of a flight plan over time includes providing for display an interface that accepts input, and receiving the input specifying at least one flight plan through corridor of an urban area being traversed and visualization parameters, including a time range to depict. The method also includes accessing a 3D map of the urban area, including structure solids that block lines of sight between cuboids in the elevation range along the corridor and satellites overhead, wherein the flight plan and corridor occupy space between or above the structure solids of the 3D map. The method further includes computing a requested visualization over time, including ray casting or tracing between the cuboids and satellites over time to calculate line of sight visibility or dilution of precision at the point location over the time range, and initializing a 3D map visualization. The disclosed method also includes overlaying flight plan segments on the orthogonal projection and visually encoding the segments to indicate the line-of-sight visibility or dilution of precision along the flight plan segments, combining the 3D map visualization with a scrubbing slider to control a time depicted. overlaying the scrubbing slider control with an indication of line-of-sight visibility or dilution of precision over the flight plan at times in a range spanned by the scrubbing slider, and providing for display the 3D map visualization combined with the scrubbing slider control, including the overlaid flight plan segments and the overlaid indication of line-of-sight visibility or dilution of precision over the flight plan. Some implementations of the disclosed method further include the input specifying satellite constellation(s) to depict. For some implementations of the disclosed method, the time depicted is a departure time or an arrival time.

One implementation of a disclosed method of navigation using a GNSS Forecast produced by the methods described herein includes requesting the GNSS Forecast on behalf of a rolling vehicle travelling in a region, receiving the requested GNSS Forecast, using the GNSS Forecast to determine that the rolling vehicle will not have adequate GNSS signals on a segment of road ahead to rely on the GNSS signal to continue autonomous routing and signaling a driver of the rolling vehicle to take over manual control.

One implementation of a disclosed method of fleet management with improved feedback location tracking data from fleet vehicles using GNSS receivers includes receiving a GNSS Forecast produced by the methods described herein and covering times and locations of operation of the fleet vehicles. The method also includes receiving location data from operation of the fleet vehicles, and combining the GNSS Forecast data with the received location data for respective fleet vehicles to accept reliable location reports and mark as questionable location reports corresponding to a forecast of low reliability. Some implementations of the disclosed method further include alerting a driver in one of the fleet vehicles when the fleet vehicle is in a location corresponding to the forecast of low reliability.

One implementation of a disclosed method of selecting how to integrate fusion sensors to determine a location of a rolling vehicle includes receiving a GNSS Forecast produced by the methods described above and covering a time and location of present operation of the rolling vehicle, including a reliability measure for a GNSS signal received at the location. The method also includes using the reliability measure to determine respective weight given to a GNSS receiver and other fusion sensors. Some implementations of the disclosed method also include that the reliability measure of the GNSS signal at the location is below a predetermined threshold and relying primarily on one or more alternative sensors among the fusion sensors.

One implementation of a disclosed method of determining cellular base station locations and configurations includes receiving a GNSS Forecast, produced by any of the methods described above, for a time horizon and a plurality of potential cellular base station locations, including a reliability measure for the GNSS signal received at the potential locations, and using, at least in part, the reliability measure for the potential locations when selecting among the potential locations.

One implementation of a disclosed method of operation of vehicle to infrastructure traffic management includes traffic management infrastructure receiving from a plurality of rolling vehicles data calculated by GNSS receivers of the rolling vessels with receiver types of respective GNSS receivers. The method also includes the traffic management infrastructure using a GNSS Forecast produced by the methods disclosed herein and covering a present time and location, including a reliability measure for respective GNSS signals received from a plurality of satellites at the location, to adjust the received data and using the adjusted received data for the traffic management. Some implementations of the disclosed method also include using the GNSS Forecast to adjust the received data to produce lane level accuracy of positions of the rolling vehicles.

An implementation of a disclosed method of determining roadside infrastructure locations and configurations includes receiving a GNSS Forecast produced by the methods disclosed herein for a time horizon and along a road, including a reliability measure for the GNSS signal received along the road, and using, at least in part, the reliability measure for positions on the road to determine locations along the road as candidates for roadside infrastructure including sensors and/or reference transmitters to compensate for the GNSS signals at the candidate locations.

A tangible non-transitory computer readable storage medium loaded with computer program instructions that, when executed on processors, cause the processors to implement the methods described above.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of path planning using a GNSS Forecast, including:
   requesting the GNSS Forecast of signal obscuration on behalf of a vehicle travelling in a region;
   receiving the requested GNSS Forecast;
   wherein the GNSS Forecast depends on whether lines-of-sight from the vehicle to GNSS satellites will be blocked by surrounding structures during a certain time frame for which the lines of sight are predicted; and
   using the GNSS Forecast to plan a path or route in response to the GNSS Forecast based on how many line-of-sight signals will be available over the path or route during the certain time frame.

2. The method of claim 1, wherein the planned path or route will not have GNSS signals available for all of the path or route, further including in the planned path measures to bridge gaps in the GNSS signals available over the path or route.

3. The method of claim 1, wherein the vehicle is a flying autonomous or automated vehicle and the GNSS Forecast includes forecast 3D cuboids.

4. The method of claim 3, wherein the planned path or route will not have GNSS signals available for all of the path or route, further including in the planned path measures to bridge gaps in the GNSS signals available over the path or route.

5. A method used by a flight control system with GNSS Forecasts and planned paths or routes for a plurality of flying vehicles, including:
   requesting the GNSS Forecast of signal obscuration on behalf of a flying autonomous or automated vehicle travelling in a region;
   receiving the requested GNSS Forecast for obscuration of GNSS satellites from 3D cuboids;
   wherein the GNSS Forecast depends on whether lines-of-sight from the vehicle to GNSS satellites will be blocked by surrounding structures during a certain time frame for which the lines of site are predicted; and
   using the GNSS Forecast to plan a path or route in response to the GNSS Forecast of line-of-sight signals available over the path or route that satisfy predetermined criteria including space to accommodate real-time changes in flight paths, varying from the planned path or route, without compromising a diverted flying vehicle's ability meet requirements of flight control in an airspace.

6. The method of claim 5, wherein the GNSS Forecast is subject to geofenced areas established by a flight control authority and fed to an engine used to generate the GNSS Forecast.

7. The method of claim 6, wherein the flight control authority updates the geofenced areas and the updates are provided to the engine and reflected in the GNSS Forecast.

8. The method of claim 7, further including:
   receiving with the GNSS Forecast, predictions of satellites visible to and decodable by a GNSS receiver; and
   selecting, by a GNSS receiver among the satellites predicted to be visible to and decodable by the GNSS receiver.

9. A method of collecting and recording for playback GNSS signals as a function of location, altitude, and flight envelope, including:
   flying a vessel equipped with a GNSS signal recorder over a controlled urban landscape and collecting data regarding actual signals received from individual satellites;
   comparing the actual signals received to a GNSS Forecast covering a time and location of operation of a GNSS receiver, including a predicted reliability measure for respective GNSS signals received from the individual satellites;
   wherein the GNSS Forecast depends on whether lines-of-sight from the vehicle to GNSS satellites will be blocked by surrounding structures during a certain time frame for which the lines of site are predicted;
   updating a model used to generate the GNSS Forecast; and
   using the updated model to generate subsequent GNSS Forecasts.

10. The method of claim 9, further including playing back and analyzing the data from the GNSS signal recorder and correlating the analyzed recording with an environment in which the recording was made to determine impacts of ground based transceiver locations relative to environmental objects identified on a 3D map of the controlled urban landscape.

11. A method of certifying performance of GNSS receivers used on a flying vessel, including:
   flying a vessel equipped with a GNSS signal recorder over a controlled urban landscape and collecting data regarding actual signals received, while collecting data regarding determination by a GNSS receiver onboard the vessel of position of the vessel;

comparing the actual signals received and the determined position to external sensor recordings of a path of the flying vessel; and based at least in part on the comparing, certifying performance of the GNSS receiver when the comparing shows a correlation between the received GNSS signals and predicted GNSS signals and between the determined position and the external sensor recordings of the path within a predetermined tolerance;

wherein the predicted GNSS signals include prediction whether lines-of-sight from the vehicle to GNSS satellites will be blocked by surrounding structures during a certain time frame for which the lines of site are predicted.

12. A non-transitory computer readable storage medium loaded with program instructions that, when executed on processors, cause the processors to become operable to perform a method as set out in claim 1.

13. A non-transitory computer readable storage medium loaded with program instructions that, when executed on processors, cause the processors to become operable to perform a method as set out in claim 5.

14. A non-transitory computer readable storage medium loaded with program instructions that, when executed on processors, cause the processors to become operable to perform a method as set out in claim 9.

15. A non-transitory computer readable storage medium loaded with program instructions that, when executed on processors, cause the processors to become operable to perform a method as set out in claim 11.

16. A system comprising one or more computing devices with processors, memory coupled to the processors and program instructions from the non-transitory computer readable storage medium of claim 12 loaded into the memory, configured to perform a method as set out in claim 12.

17. A system comprising one or more computing devices with processors, memory coupled to the processors and program instructions from the non-transitory computer readable storage medium of claim 13 loaded into the memory, configured to perform a method as set out in claim 13.

18. A system comprising one or more computing devices with processors, memory coupled to the processors and program instructions from the non-transitory computer readable storage medium of claim 14 loaded into the memory, configured to perform a method as set out in claim 14.

19. A system comprising one or more computing devices with processors, memory coupled to the processors and program instructions from the non-transitory computer readable storage medium of claim 15 loaded into the memory, configured to perform a method as set out in claim 15.

* * * * *